US011962561B2

(12) United States Patent
Lukas et al.

(10) Patent No.: US 11,962,561 B2
(45) Date of Patent: *Apr. 16, 2024

(54) IMMERSIVE MESSAGE MANAGEMENT

(71) Applicants: DEBORAH A. LAMBERT AS TRUSTEE OF THE DEBORAH A. LAMBERT IRREVOCABLE TRUST FOR MARK LAMBERT, Hoffman Estates, IL (US); Whitehead Investments, LLC, Hoffman Estates, IL (US)

(72) Inventors: Erik N. Lukas, San Francisco, CA (US); Gregory O. Peet, Monrovia, CA (US); Mark Lambert, Tarpon Springs, FL (US)

(73) Assignees: DEBORAH A. LAMBERT AS TRUSTEE OF THE DEBORAH A. LAMBERT IRREVOCABLE TRUST FOR MARK LAMBERT, Tarpon Springs, FL (US); WHITEHEAD INVESTMENTS, LLC, Tarpon Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,277

(22) Filed: Jun. 22, 2022

(65) Prior Publication Data

US 2022/0377041 A1 Nov. 24, 2022

Related U.S. Application Data

(63) Continuation-in-part of application No. 17/521,631, filed on Nov. 8, 2021, now Pat. No. 11,606,327, (Continued)

(51) Int. Cl.
*H04L 51/42* (2022.01)
*G06F 3/0488* (2022.01)
*H04M 1/72436* (2021.01)

(52) U.S. Cl.
CPC ............ *H04L 51/42* (2022.05); *G06F 3/0488* (2013.01); *H04M 1/72436* (2021.01); *H04M 2250/22* (2013.01)

(58) Field of Classification Search
None
See application file for complete search history.

(56) References Cited

U.S. PATENT DOCUMENTS 8,689,116 B2  4/2014 Guzman et al.
8,949,734 B2  2/2015 Stallings et al.
(Continued)

FOREIGN PATENT DOCUMENTS

AU  2013259637 A1  12/2014
EP  2584440 A1  4/2013
EP  2787426 A1  10/2014

OTHER PUBLICATIONS

Ferreira et al., "ARTHE: Experiencing Projected Augmented Reality with THings of the Everyday", Feb. 13, 2014, IEEE, 2013 IEEE 10th International Conference on Ubiquitous Intelligence and Computing and 2013 IEEE 10th International Conference on Autonomic and Trusted Computing (pp. 495-501) (Year: 2014).*

(Continued)

*Primary Examiner* — Davoud A Zand
(74) *Attorney, Agent, or Firm* — Perkins Coie LLP

(57) ABSTRACT

A system can cause display of a mixed reality interface including multiple graphical tiles in a particular chronological order. The system can detect a motion-based gesture of a user relative to the mixed reality interface while displaying the multiple graphical tiles, and correlate the motion-based gesture of the user to the display of the mixed reality (Continued)

interface to move a particular graphical tile to a new location among the multiple graphical tiles. In response to the motion-based gesture, the system can virtually displace another graphical tile of the multiple graphical tiles to accommodate the new location of the particular graphical tile and cause display, through the mixed reality interface, of the multiple graphical tiles arranged in a new order.

21 Claims, 63 Drawing Sheets

Related U.S. Application Data which is a continuation of application No. 16/840,080, filed on Apr. 3, 2020, now Pat. No. 11,171,907, which is a continuation of application No. 15/250,715, filed on Aug. 29, 2016, now Pat. No. 10,623,361.

(60) Provisional application No. 62/210,922, filed on Aug. 27, 2015.

(56) References Cited

U.S. PATENT DOCUMENTS

| | | | |
|---|---|---|---|
| 9,753,635 | B2 | 9/2017 | Heo et al. |
| 2008/0055269 | A1 | 3/2008 | Lemay et al. |
| 2008/0062141 | A1 | 3/2008 | Chandhri |
| 2008/0122796 | A1 | 5/2008 | Jobs et al. |
| 2008/0165136 | A1 | 7/2008 | Christie et al. |
| 2008/0168349 | A1 | 7/2008 | Lamiraux et al. |
| 2008/0174570 | A1 | 7/2008 | Jobs et al. |
| 2009/0005011 | A1 | 1/2009 | Christie et al. |
| 2009/0177981 | A1 | 7/2009 | Christie et al. |
| 2010/0137031 | A1* | 6/2010 | Griffin .................. G06F 3/0488 345/173 |
| 2010/0185989 | A1 | 7/2010 | Shiplacoff et al. |
| 2010/0211535 | A1* | 8/2010 | Rosenberger ........... G06F 16/48 706/20 |
| 2010/0309417 | A1 | 12/2010 | Kosugi et al. |
| 2011/0167380 | A1 | 7/2011 | Stallings et al. |
| 2012/0311508 | A1 | 12/2012 | Fleizach |
| 2013/0057588 | A1* | 3/2013 | Leonard ................ G06F 3/0486 345/660 |
| 2013/0227483 | A1 | 8/2013 | Thorsander et al. |
| 2014/0004834 | A1 | 1/2014 | Mian et al. |
| 2014/0143738 | A1 | 5/2014 | Underwood, IV et al. |
| 2014/0173457 | A1* | 6/2014 | Wang .................. G06F 3/04845 715/752 |
| 2014/0282151 | A1 | 9/2014 | Harvey |
| 2014/0282214 | A1* | 9/2014 | Shirzadi ................ G06F 3/0481 715/781 |
| 2014/0304651 | A1* | 10/2014 | Johansson ........... G06F 3/04883 715/810 |
| 2014/0313142 | A1 | 10/2014 | Yairi |
| 2014/0373057 | A1 | 12/2014 | Hoffert et al. |
| 2015/0145887 | A1* | 5/2015 | Forutanpour ....... G06F 3/04815 345/633 |
| 2015/0220238 | A1 | 8/2015 | Heo et al. |
| 2015/0350143 | A1 | 12/2015 | Yang et al. |
| 2015/0363481 | A1* | 12/2015 | Haynes .................. G06Q 10/10 707/748 |
| 2016/0357724 | A1 | 12/2016 | Stein et al. |
| 2017/0063767 | A1 | 3/2017 | Lukas et al. |
| 2020/0236381 | A1 | 7/2020 | Lukas et al. |

OTHER PUBLICATIONS

Abdulmotaleb et al., "Remote Rendering Based Second Life Mobile Client System to Control Smart Home Appliances," Sep. 1, 2011, 2011 IEEE International Conference on Virtual Environments, Human-Computer Interfaces and Measurement Systems Proceedings (pp. 1-4).

Ferreira , et al., "ARTHE: Experiencing Projected Augmented Reality with THings of the Everyday", 2013 IEEE 10th International Conference on Ubiquitous Intelligence and Computing and 2013 IEEE 10th International Conference on Autonomic and Trusted Computing, pp. 495-501.

International Search Report and Written Opinion PCT/US2016/049322 dated Nov. 24, 2016, pp. 1-10.

* cited by examiner

IMMERSIVE MESSAGE MANAGEMENT

CROSS-REFERENCE TO RELATED APPLICATIONS

This application a continuation-in-part of U.S. patent application Ser. No. 17/521,631, filed Nov. 8, 2021, which is a continuation application of U.S. patent application Ser. No. 16/840,080, now U.S. Pat. No. 11,171,907, filed Apr. 3, 2020, which is a continuation application of U.S. patent application Ser. No. 15/250,715, now U.S. Pat. No. 10,623, 361, filed Aug. 29, 2016, which claims priority to U.S. Provisional Patent Application Ser. No. 62/210,922, filed Aug. 27, 2015, which is incorporated herein by reference in its entirety.

FIELD OF THE INVENTION

The technique relates to user device interfaces and more specifically to horizontal timeline layouts for an email application, gesture-based organization and triaging of emails in the email application, and a quantified, direct manipulation design for emails in the email application.

BACKGROUND

Various modes of Internet communication are experiencing fast-paced growth and innovation. By contrast, the user's interaction with email and other electronic messages has remained all confined to browsing chronologically sorted lists displayed on a display screen of a computing device. The user experience in interacting with such email lists is not optimal, especially on mobile devices which typically have a form factor that is different from that of a desktop or a laptop.

SUMMARY OF THE INVENTION

The technology disclosed herein includes methods and systems for managing email on a user device. In some embodiments, a plurality of email tiles may be included in a vertical list. A plurality of vertical lists may be available to a user by gesture manipulation. The plurality of vertical lists may be organized in a horizontal timeline interface with each column representing a time period, and the emails may be managed individually or in bulk by gesture manipulation.

Embodiments of the present invention include systems and methods managing email on a user device. A first plurality of email tiles in a first vertical list may be displayed on a screen of the user device. The first plurality of email tiles in the first vertical list may be associated with a first time period. A motion-based gesture may be detected. The motion-based gesture may include at least one of a tap on a surface of the screen, a swipe across a surface of the screen, or an acceleration of the user device. In an embodiment, in response to detecting a first motion-based gesture, a second plurality of email tiles in a second vertical list associated with a second time period may be displayed. In an embodiment, in response to detecting a second motion-based gesture, one or more email management function may be performed.

BRIEF DESCRIPTION OF THE DRAWINGS

These and other objects, features, and characteristics may become more apparent to those skilled in the art from a study of the following Detailed Description in conjunction with the appended claims and drawings, all of which form a part of this specification. While the accompanying drawings include illustrations of various embodiments, the drawings are not intended to limit the claimed subject matter.

FIGS. 3A-3E show the ability to pick up email tiles individually for sorting into one of the interface's one or more triage corners, according to one embodiment;

FIGS. 4A-4F show the ability to select and pick up multiple email tiles at once for sorting into one of the interface's one or more triage corners, according to one embodiment;

FIGS. 10A-10F show the transition between a horizontal interface and a vertical interface of emails, according to one embodiment;

DETAILED DESCRIPTION

Discussed below are examples of a method, system and apparatus for organizing and interacting with email on a user device. In the following description, for the purposes of explanation, numerous specific details are set forth in order to provide a thorough understanding of the embodiments of the invention. One skilled in the art may recognize that the embodiments of the invention may be practiced without these specific details or with an equivalent arrangement. In other instances, well-known structures and devices are shown in block diagram form in order to avoid unnecessarily obscuring the embodiments of the invention.

Figure 1:
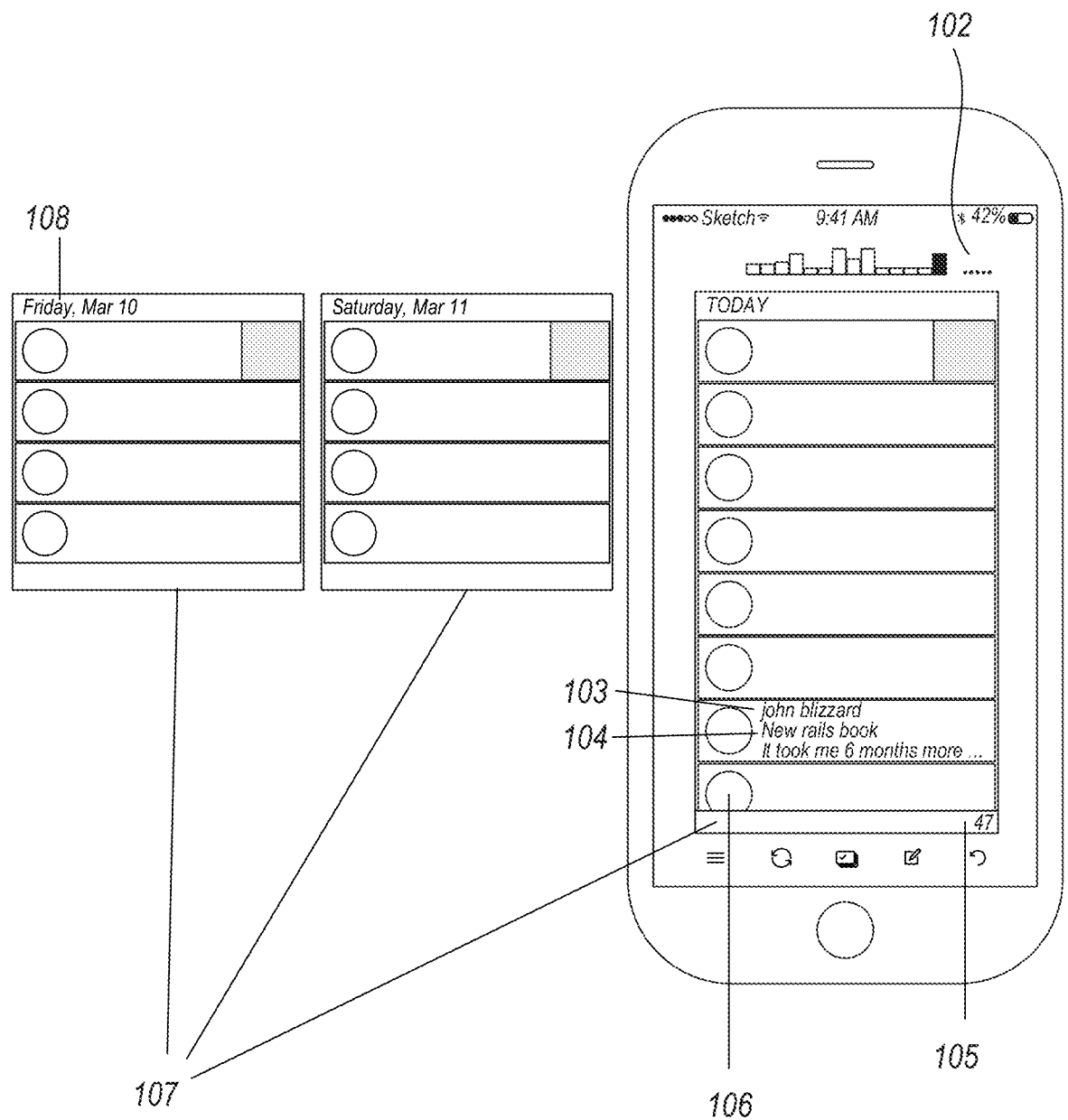
FIG. 1 shows the horizontal timeline interface, according to one embodiment.
Figure 2A:
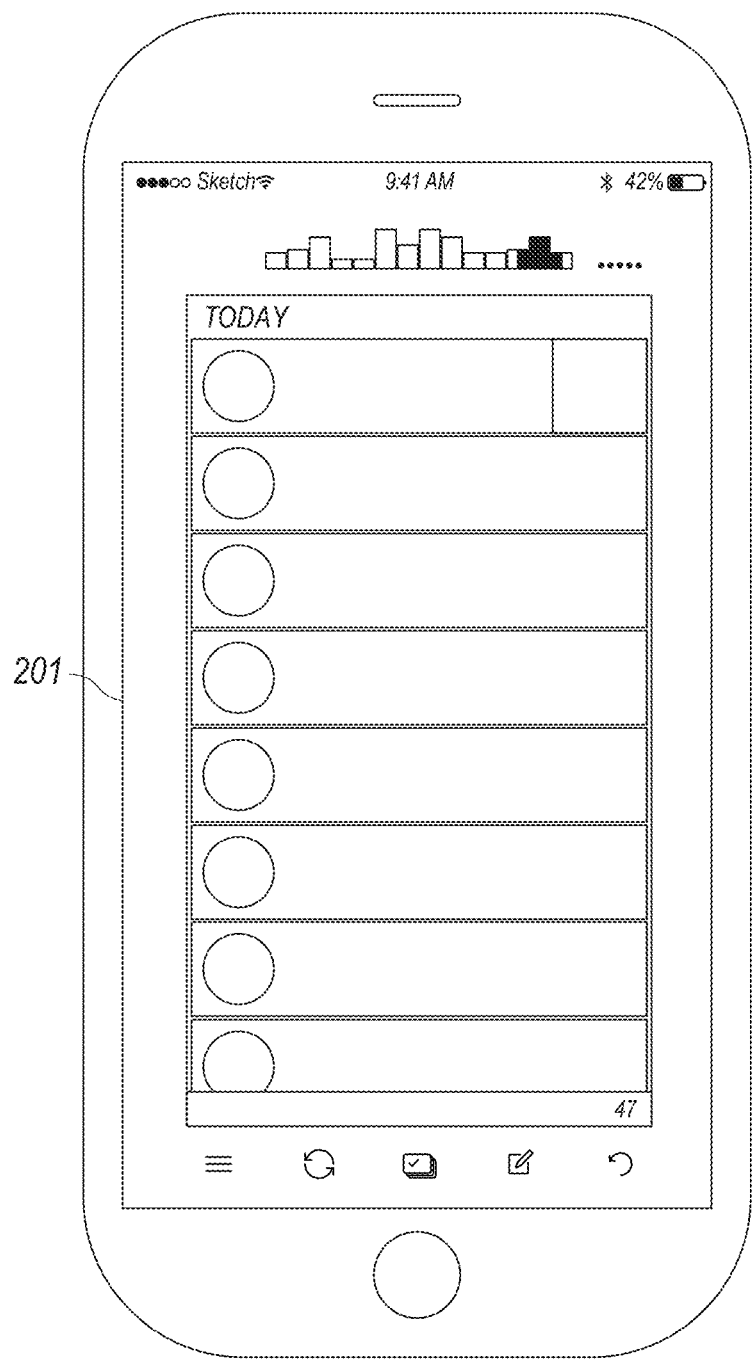
FIGS. 2A-2D show the ability to rearrange the index and visual order of emails within a single time period so a user may prioritize the emails according to importance for the user, according to one embodiment.
Figure 2B:
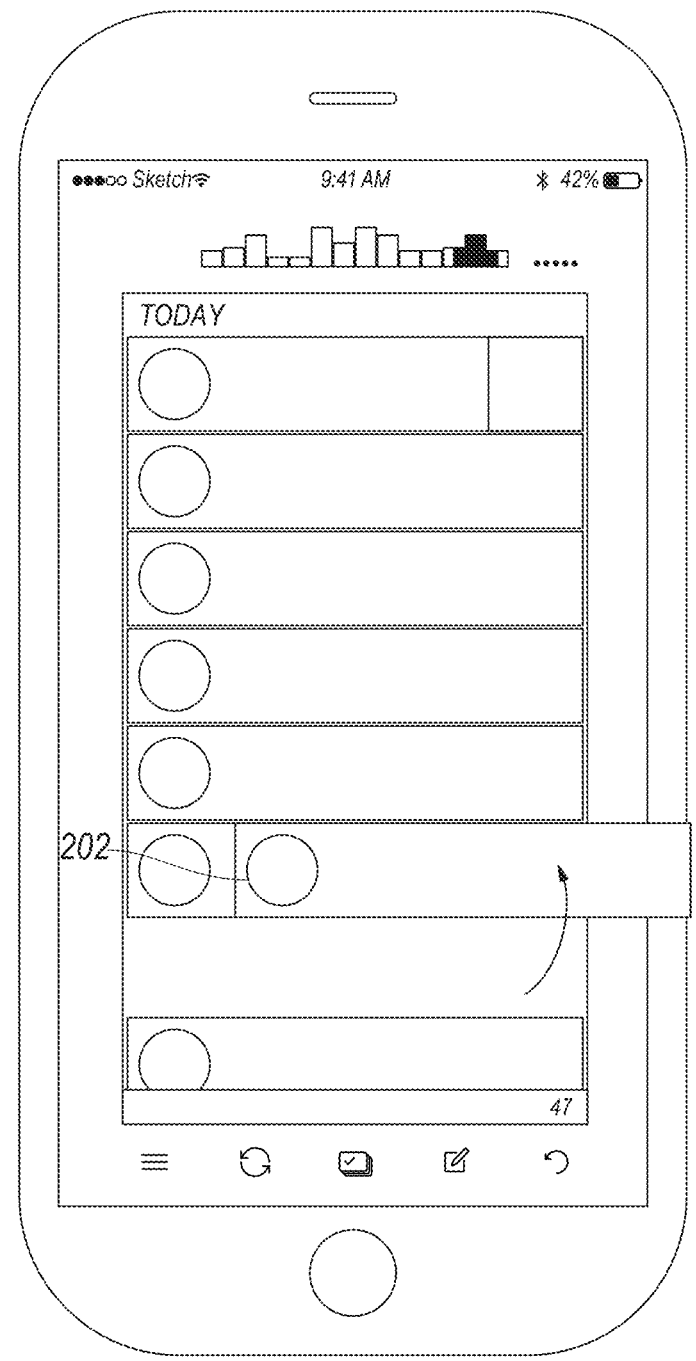
Figure 2C:
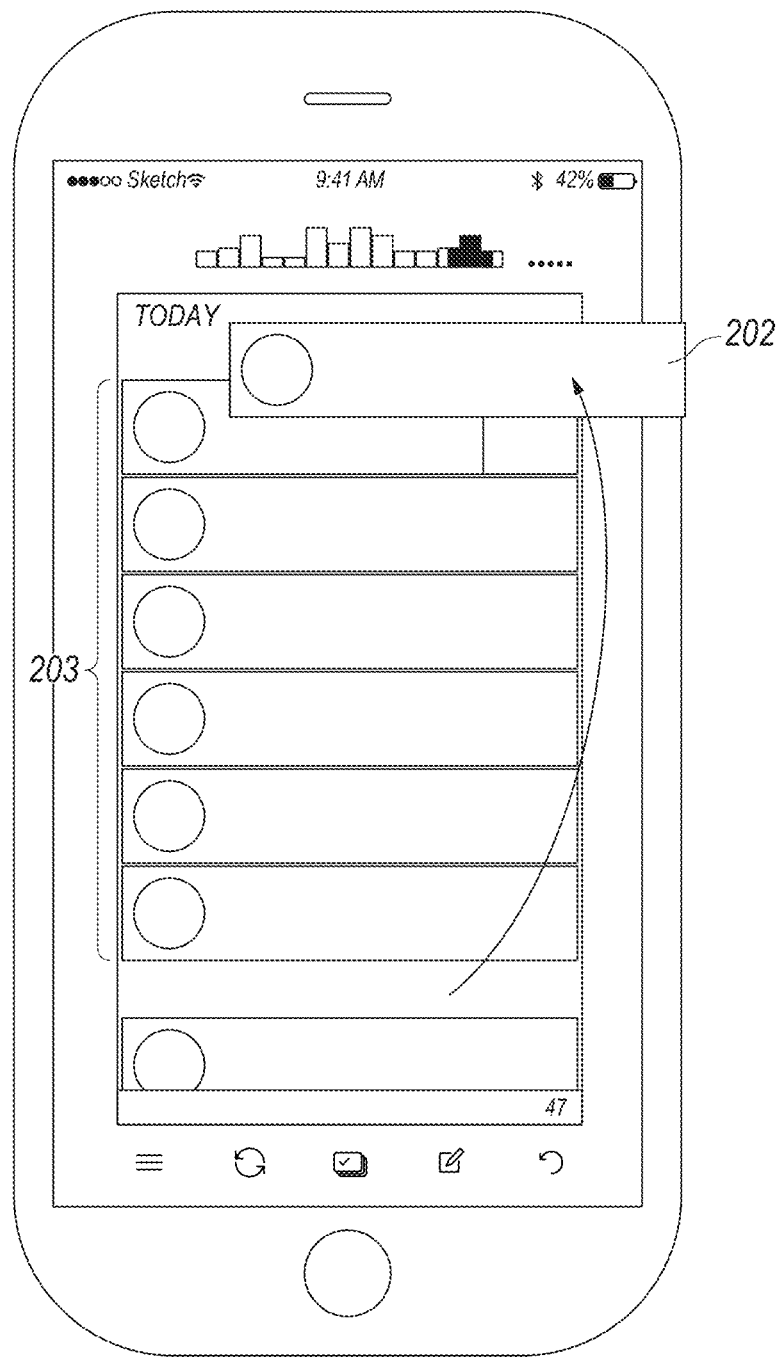
Figure 2D:
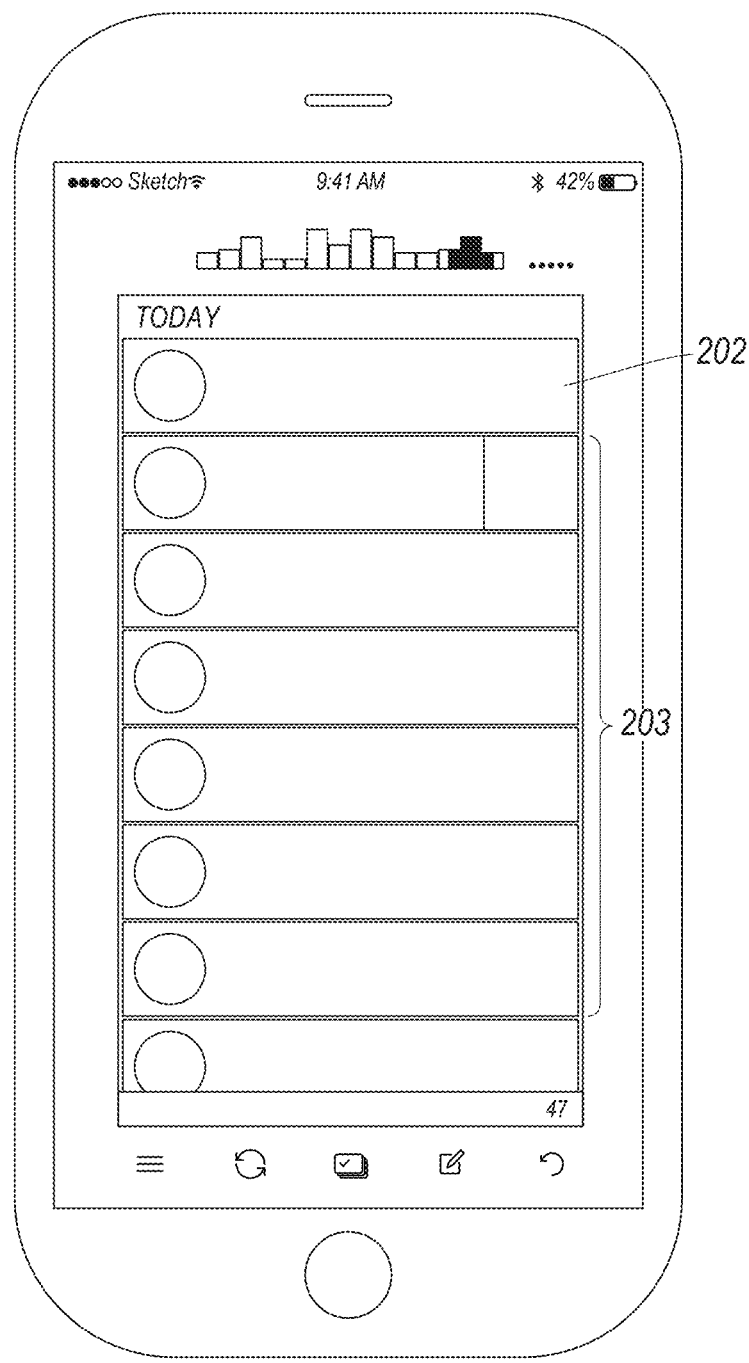
Figure 3A:
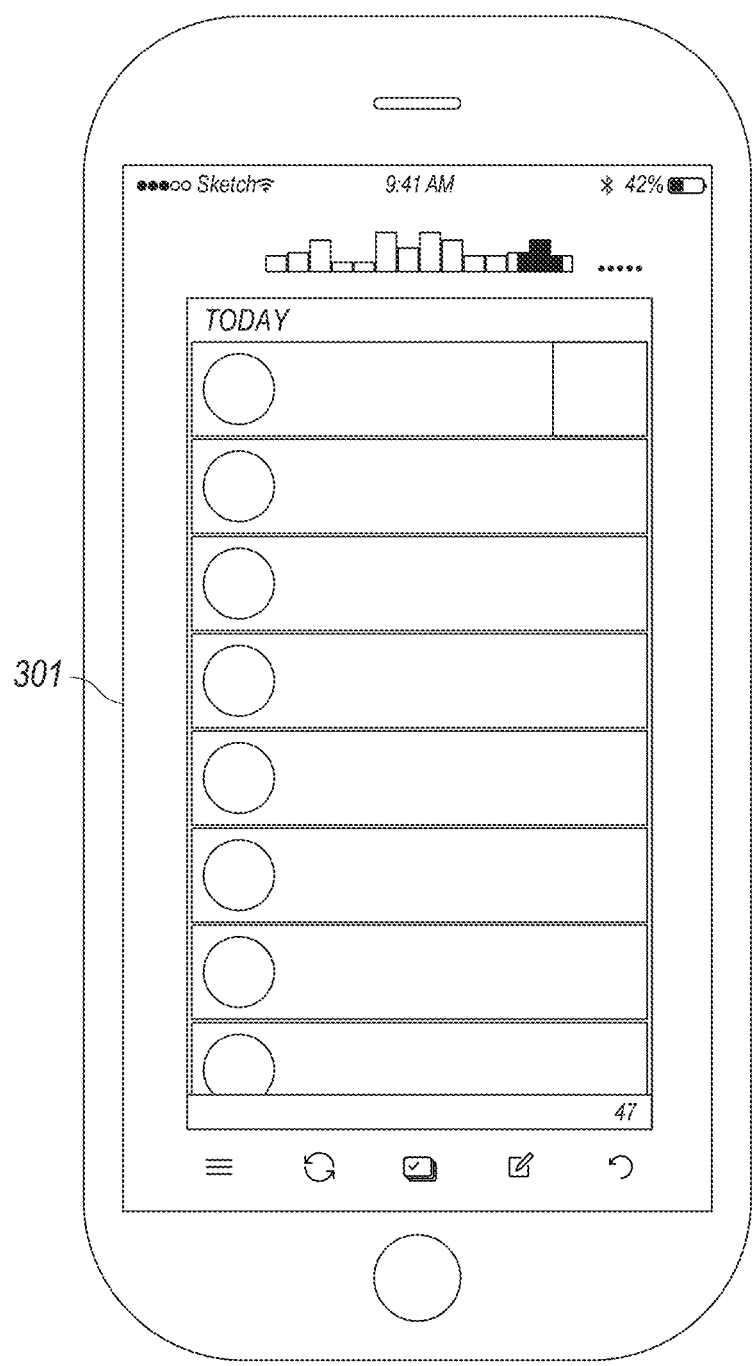
Figure 3B:
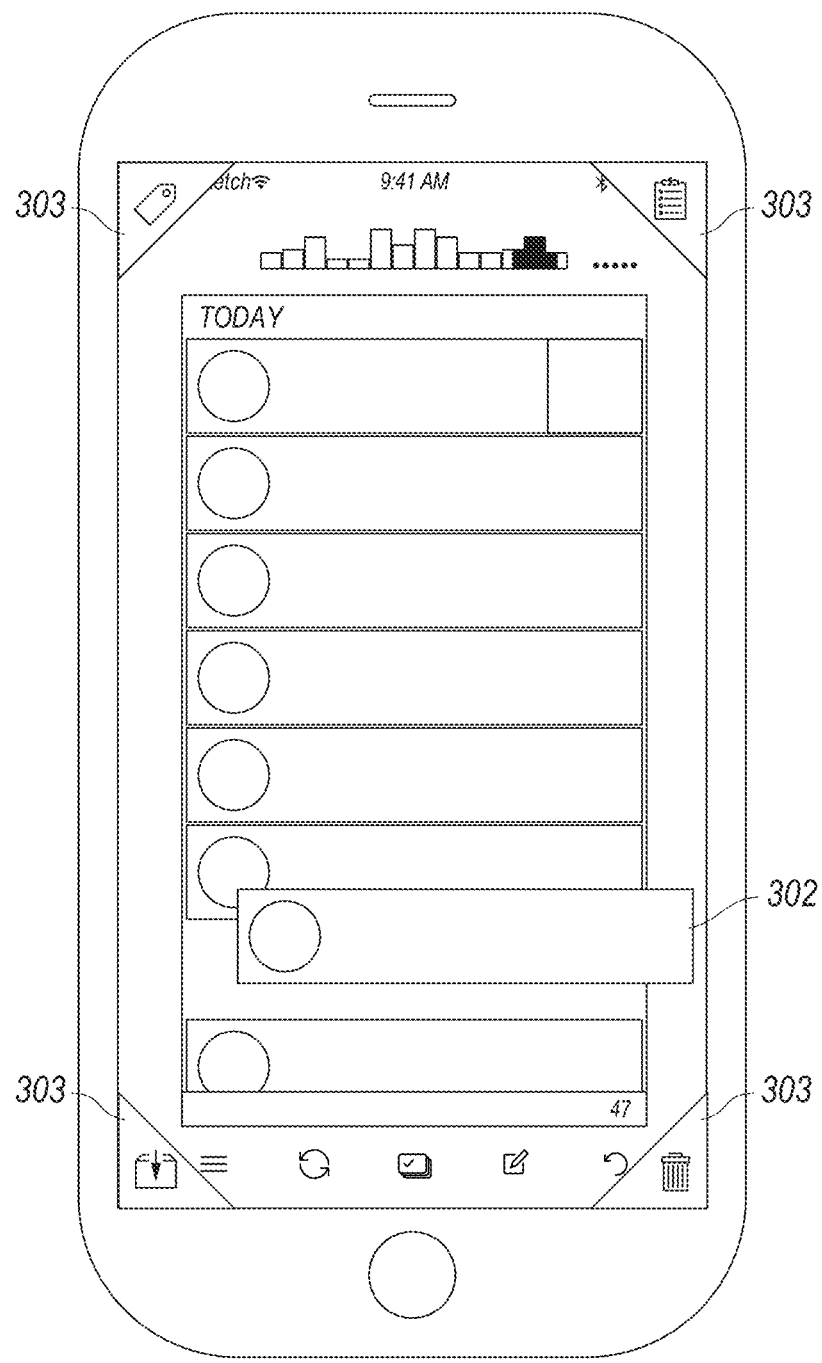
Figure 3C:
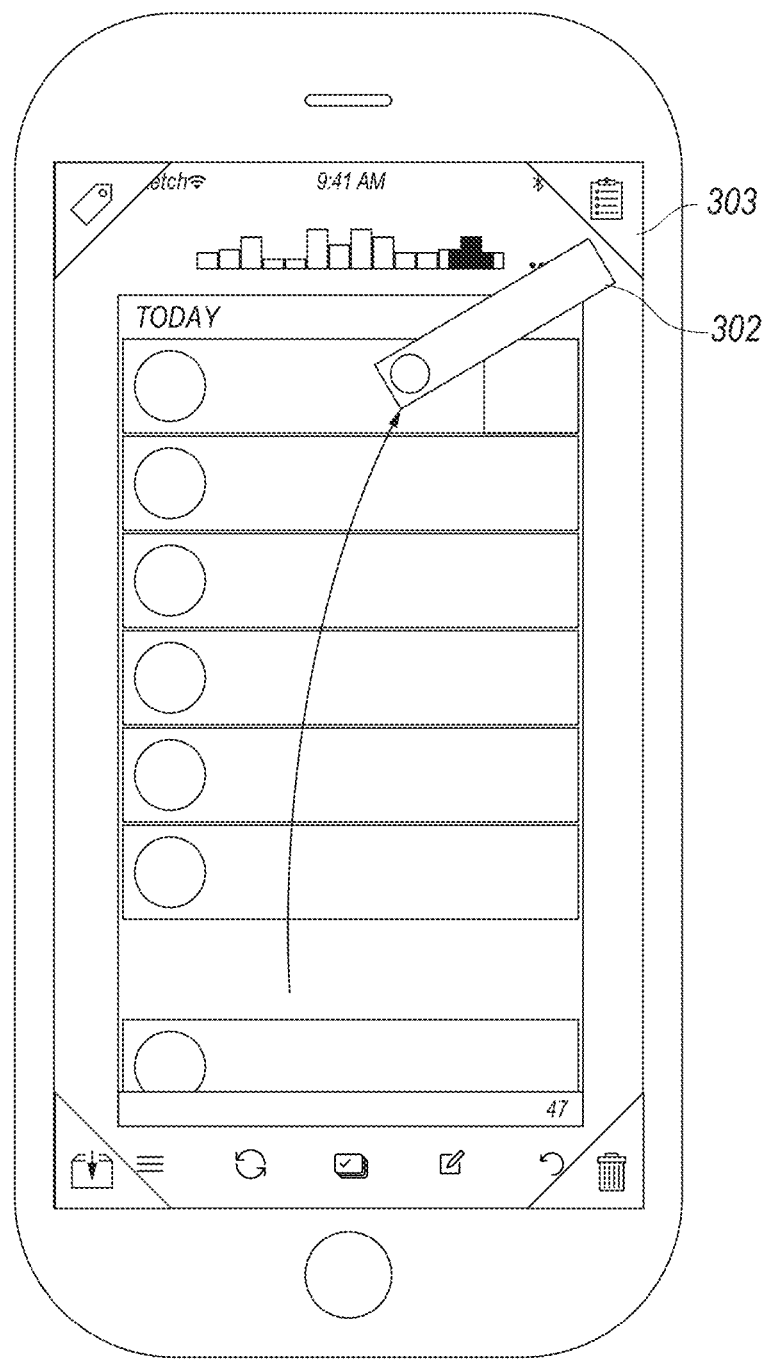
Figure 3D:
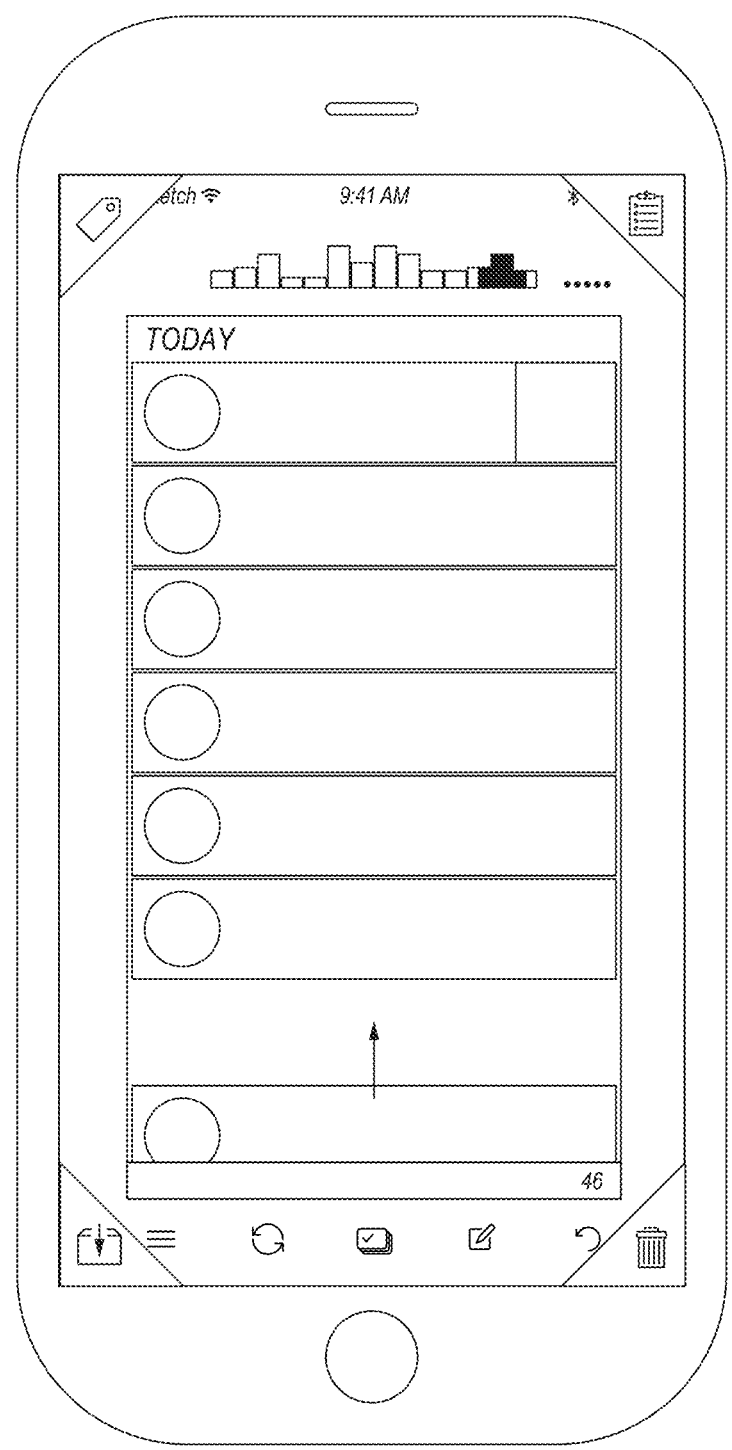
Figure 4A:
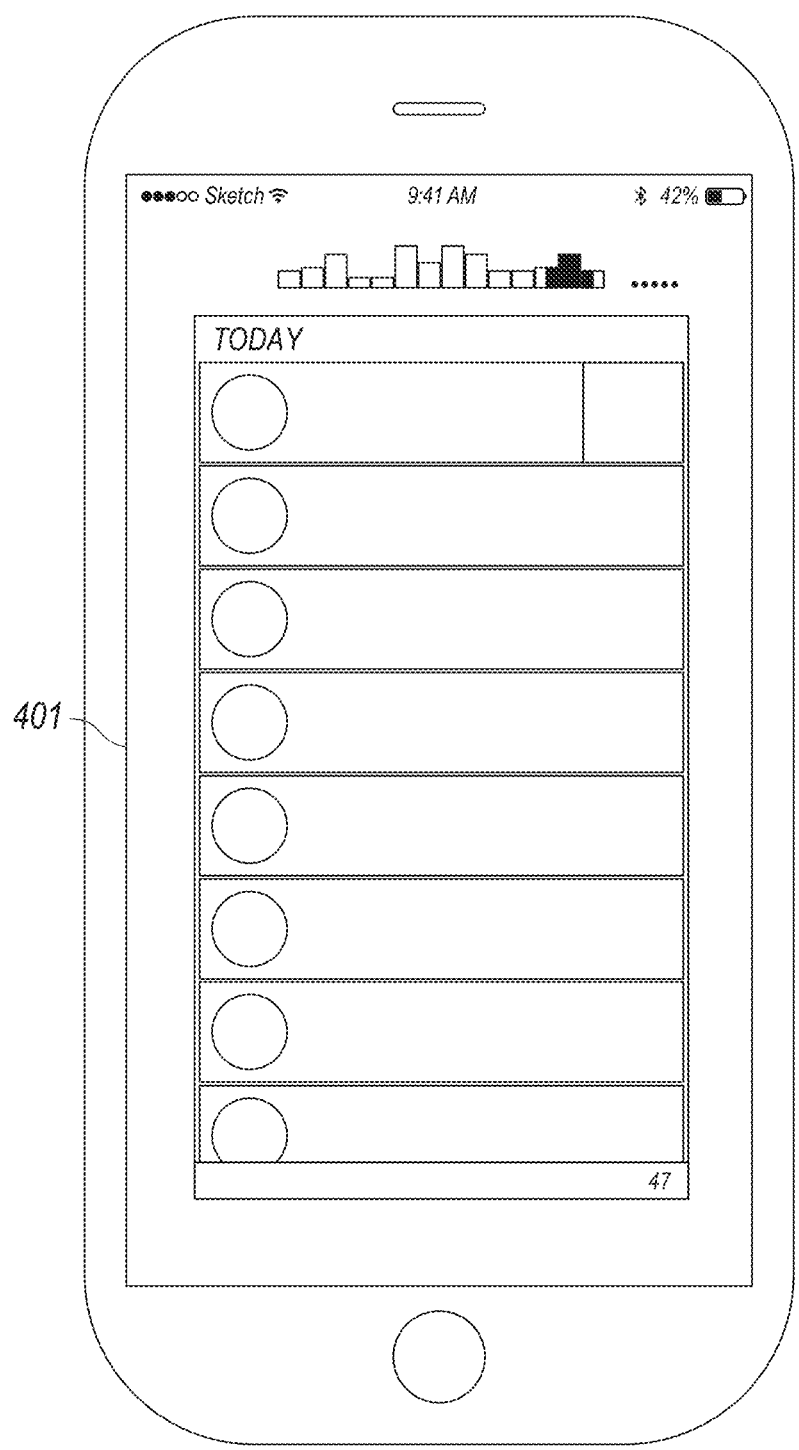
Figure 4B:
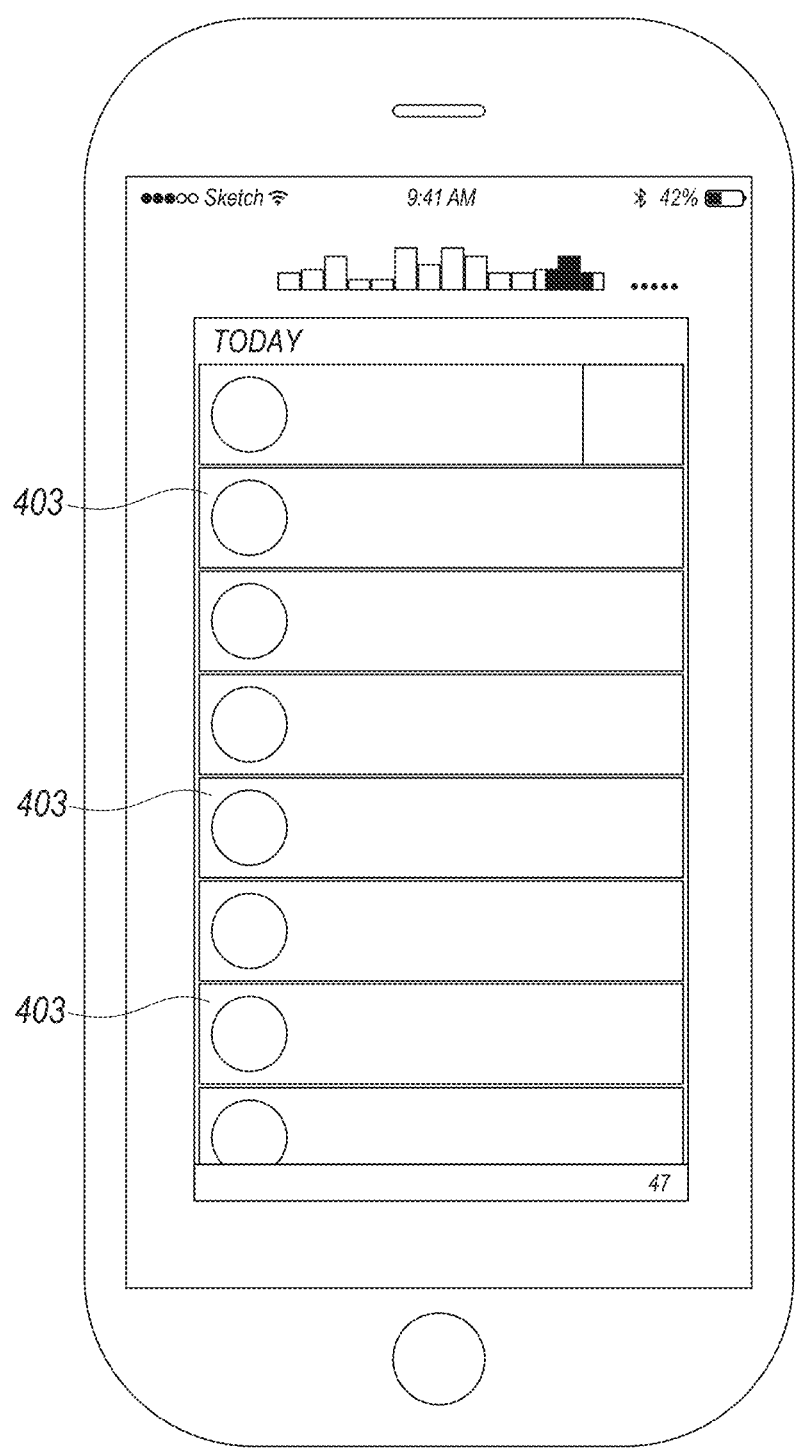
Figure 4C:
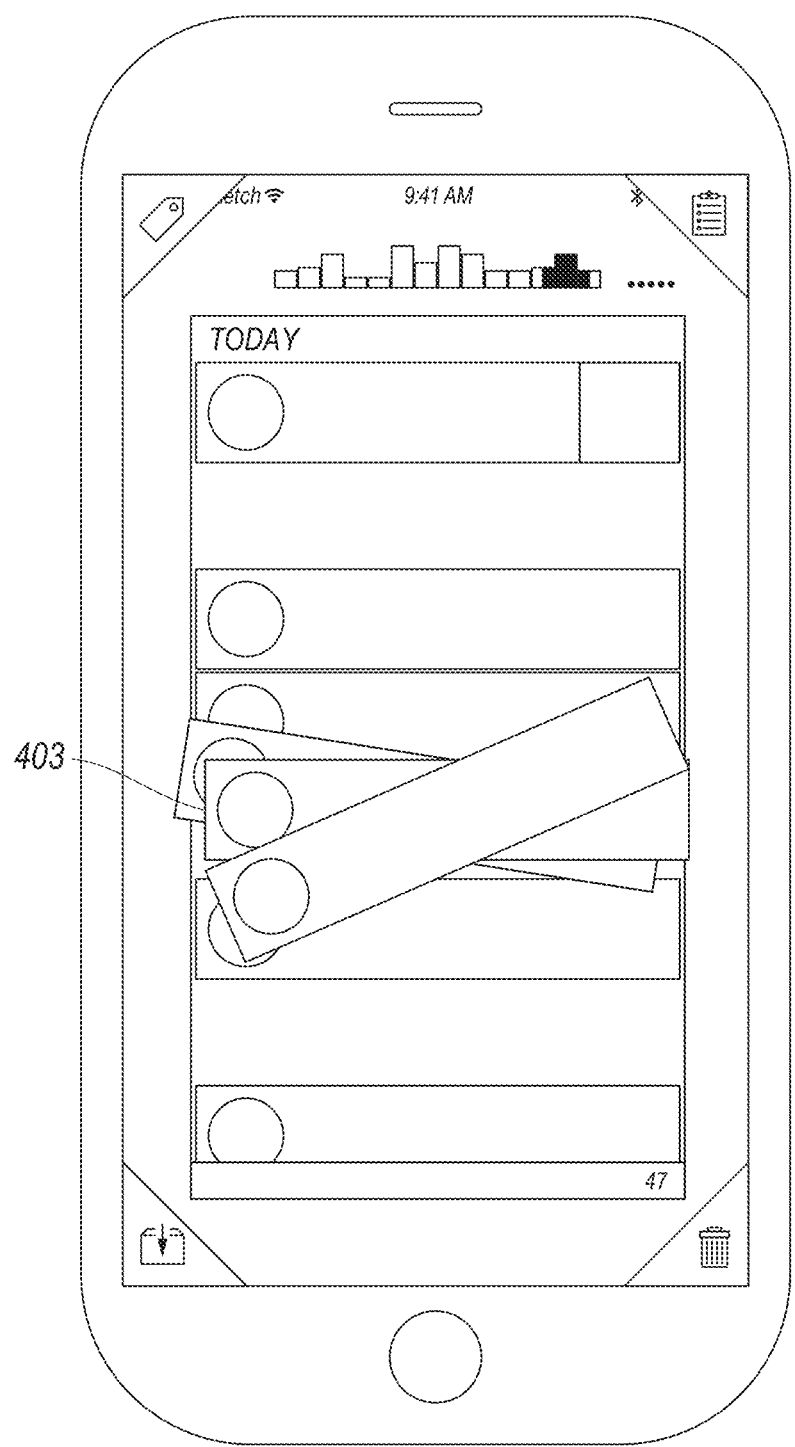
Figure 4D:
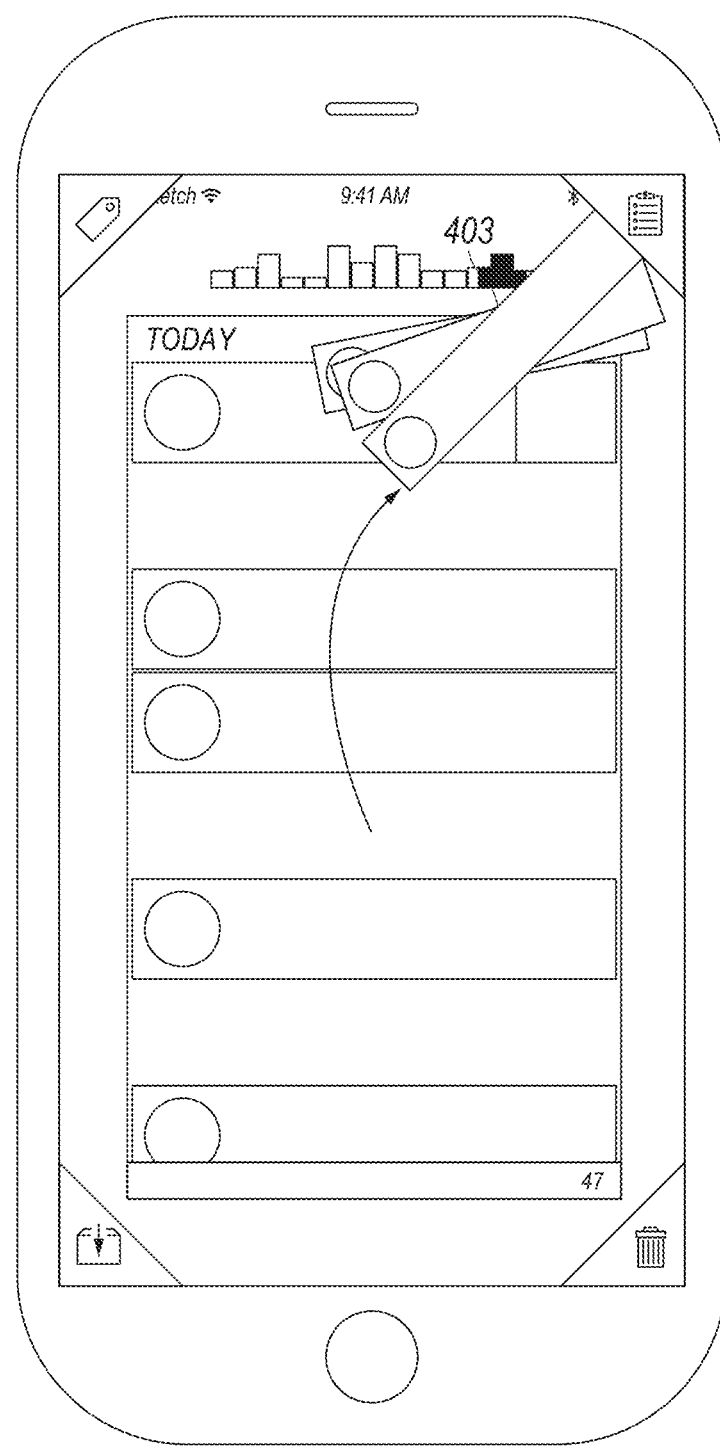
Figure 5A:
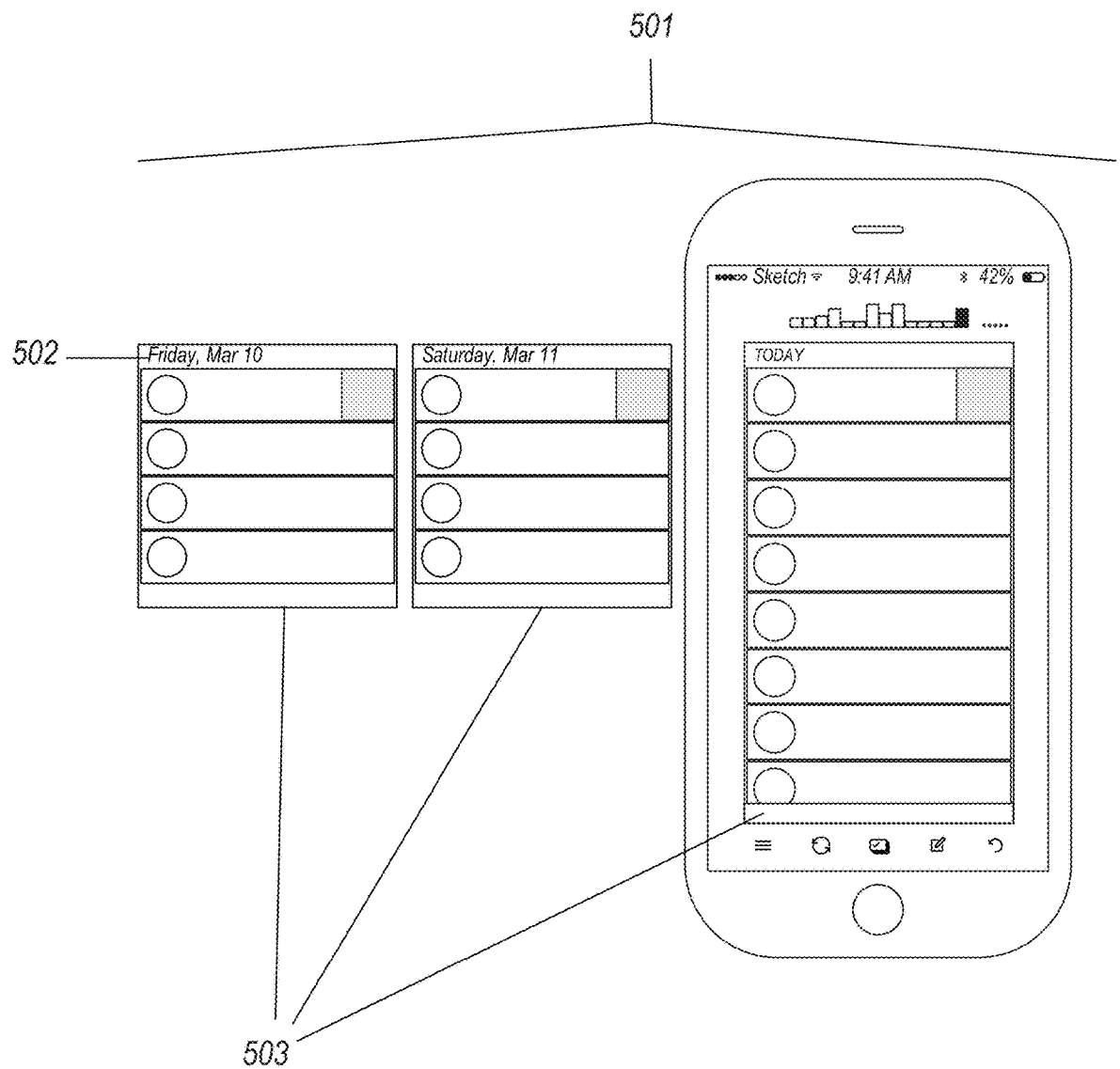
FIGS. 5A-5E show how the horizontal timeline interface may be navigated by user's left or right wrist movement, according to one embodiment.
Figure 5B:
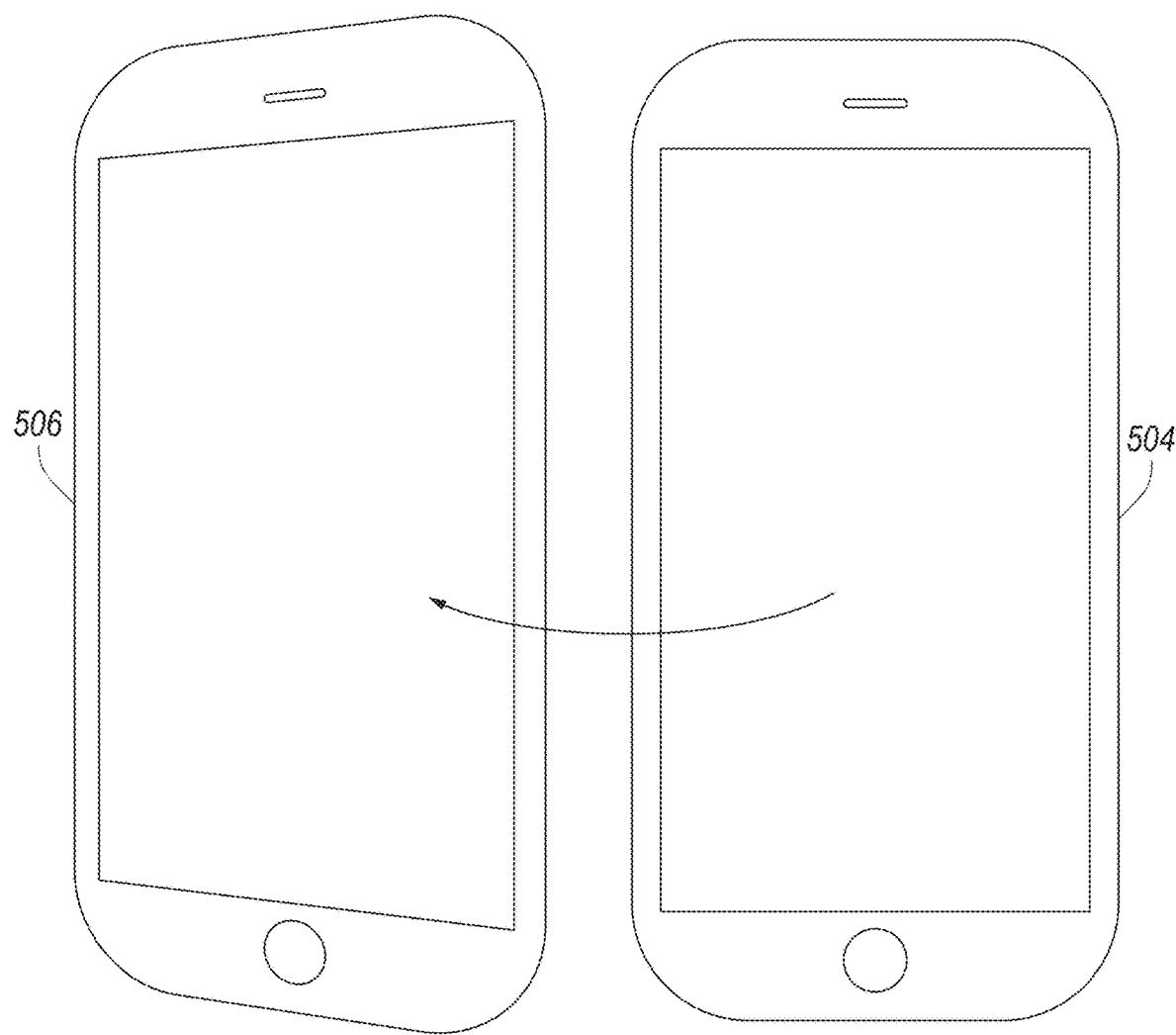
Figure 5C:
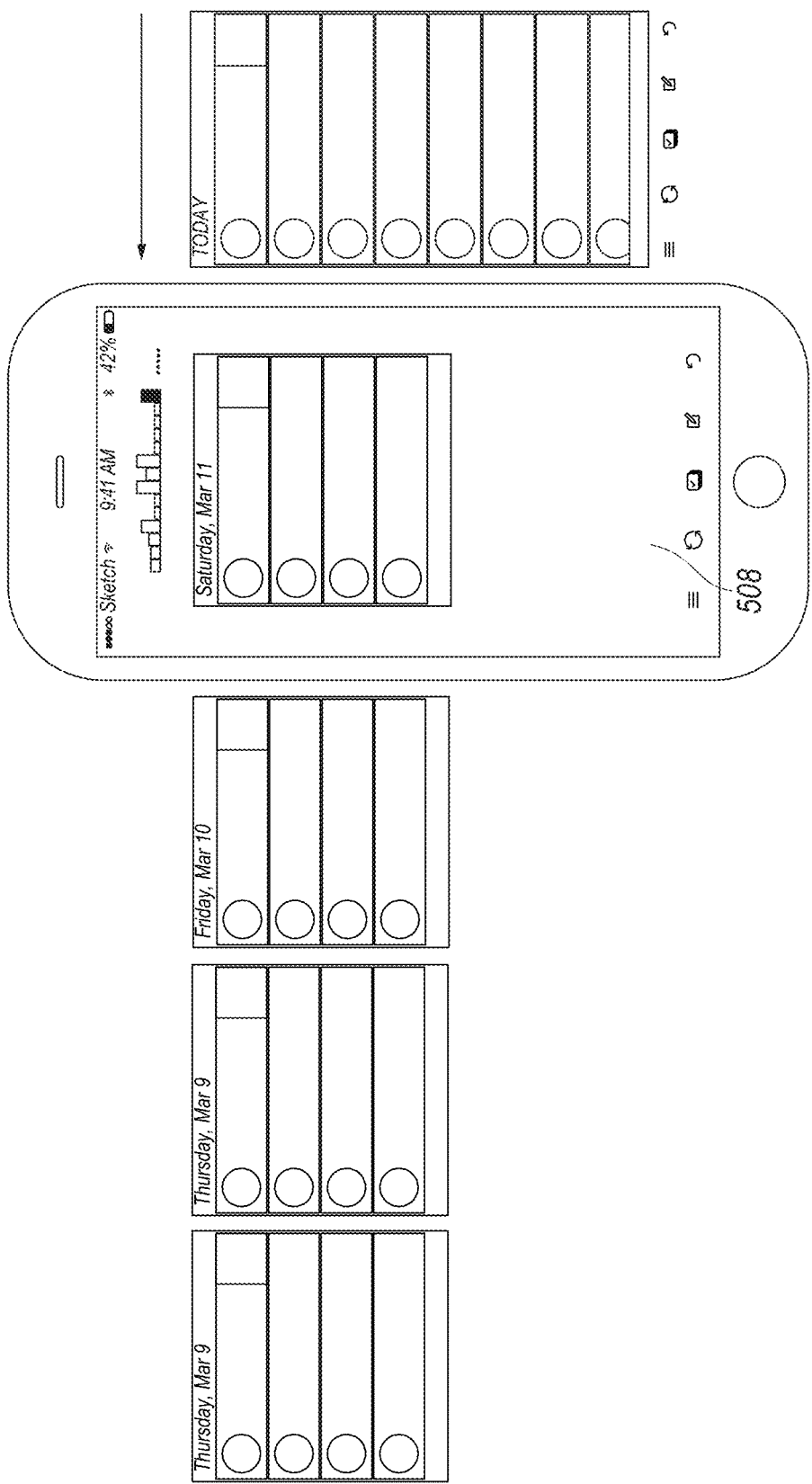
Figure 5D:
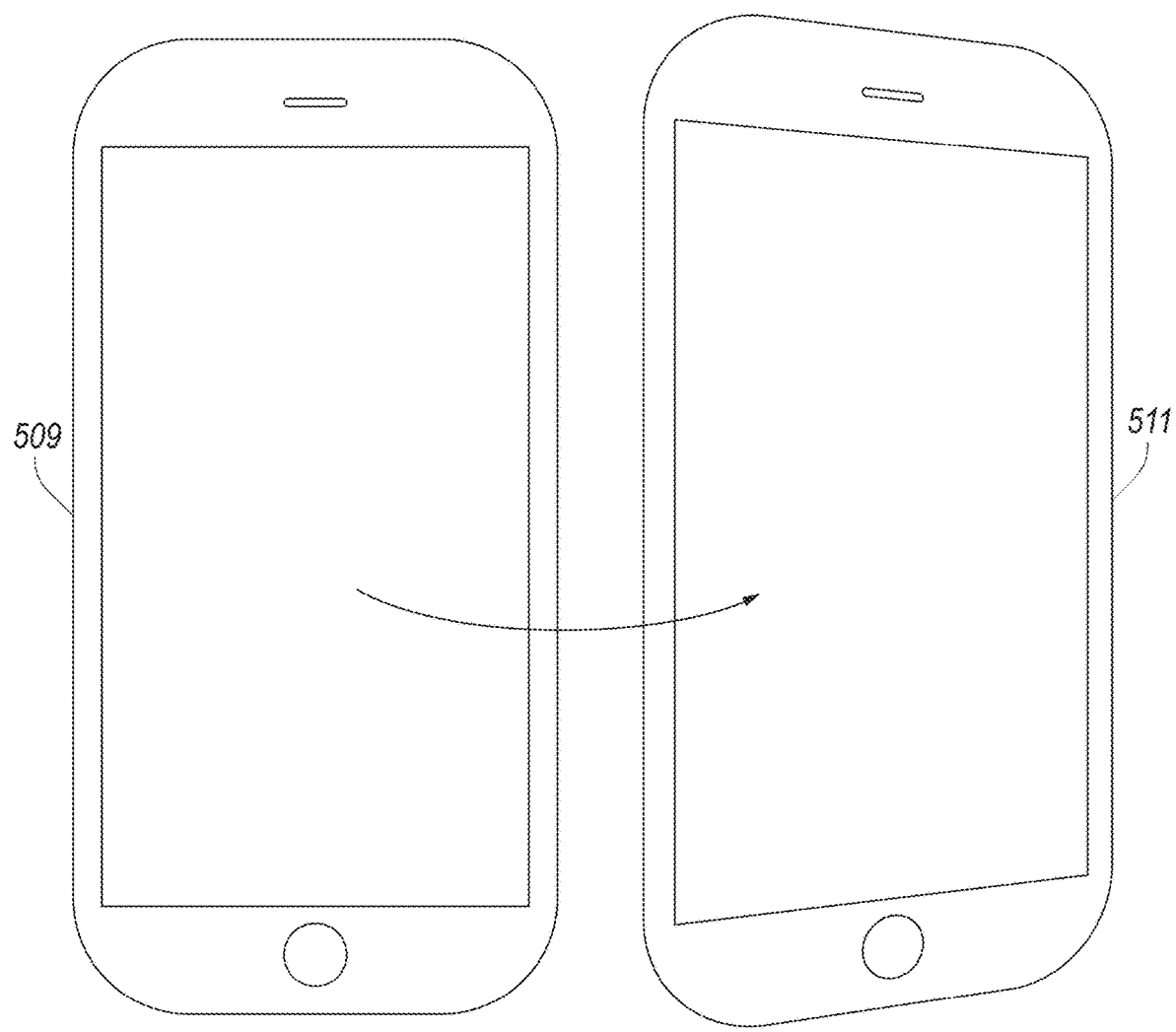
Figure 5E:
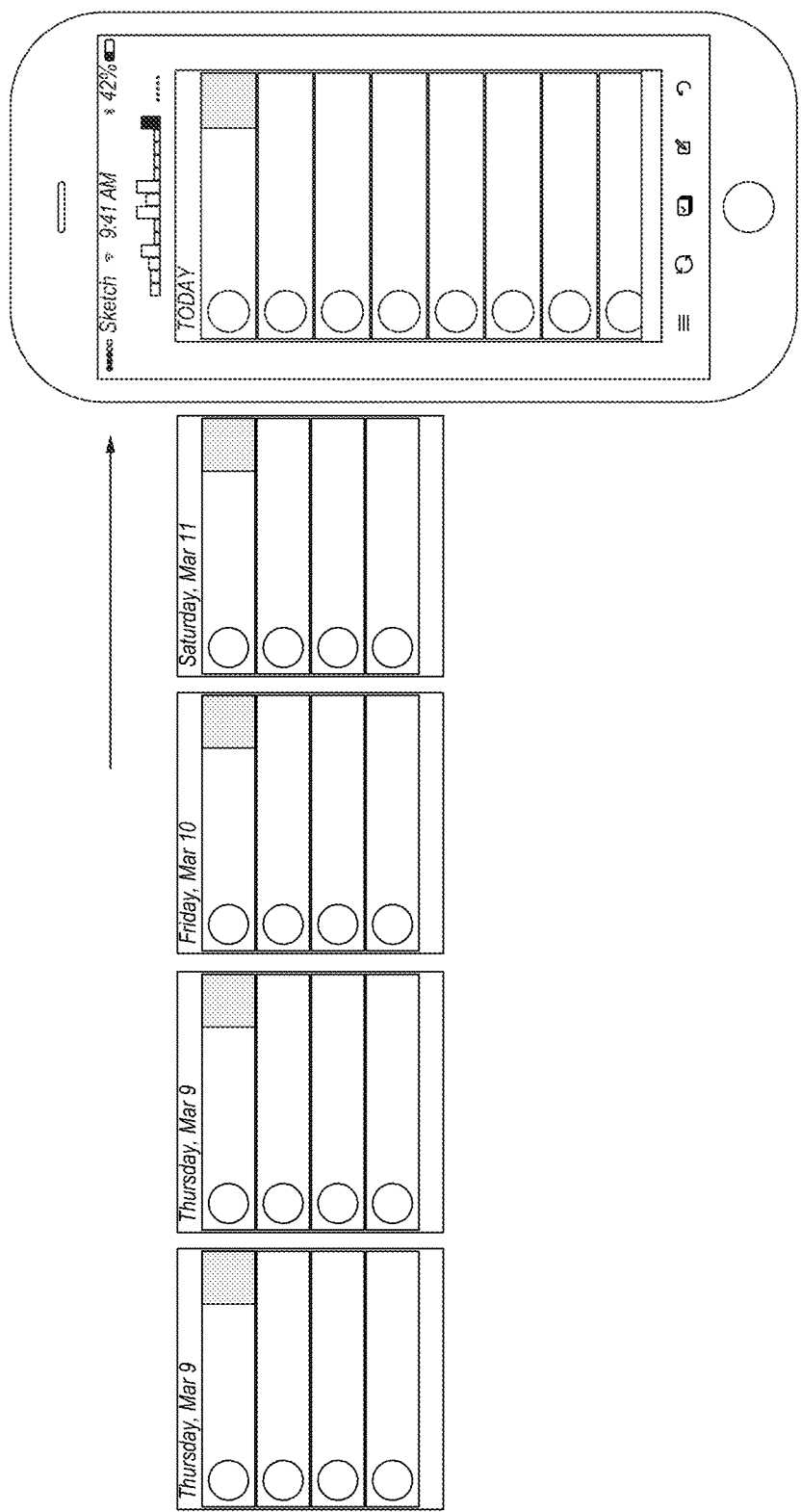

FIG. 1 shows the horizontal timeline interface 107, according to one embodiment. A user device, such as a phone, enables a user to manage his email using the system disclosed here. The system displays a histogram of the email associated with the user, e.g., histogram 102 or histogram 907 of FIG. 9. In one embodiment, the histogram 102, 907 shows the number of emails the user receives in a time period (e.g., an hour, day, week, month). In another embodiment, the histogram shows the number of important emails the user receives in a time period. The system may define the criteria for categorizing an email as import. Additionally or alternatively, the system may allow the user to define the criteria or customize the criteria. In another embodiment, the histogram 102, 907 may represent the number of files in different folders. If the system receives a zooming out gesture, such as two fingers moving toward each other, the system displays emails received in other time periods. The histogram 102, 907 enables the user to select a particular time period, and the selected time period is marked, such as by darker shading than the unselected time periods. If the user is viewing emails received on a plurality of time periods, all of the time periods viewed may be marked, such as by darker shading than the unselected time periods.

Below the histogram 102, 907, the system displays a list of email tiles received on a particular time period and the total number of emails received on that time period 105. A time period may include a time period indicator (e.g., time period indicator 108 stating that the time period is "Thursday, Mar 9"). Email tiles of the list of email tiles may include an image associated with the sender 106, the name of the sender 103, and the title of the email 104. If a user selects a different time period in the histogram, the system displays the email received on the selected time period. According to one embodiment, the system receives a touchscreen input from the user selecting a particular time period in the histogram. According to another embodiment, the system receives a motion-based gesture from the user, and based on the motion-based gesture, the system scrolls to a time period behind or a time period ahead. According to one embodiment, the motion-based gesture may be rotating the phone to the right to scroll back, or rotating the phone to the left to scroll forward.

FIGS. 2A-2D show the ability to rearrange the index and visual order of emails within a single time period so a user may personally prioritize the emails that are most important for the user, according to one embodiment. By default, the system may sort the email tiles in chronological order for each time period. The system may enable the user to re-arrange the email tiles received on a particular time period. The system receives an input from the user, the input comprising an email tile 202 or email tile 602 of FIG. 6 that the user would like to place in a different position. For example, the system receives an email selection from the user, when the user long presses the email 202, 602 on the screen 201. Without a lapse in contact with the screen 201, the user may drag the email tile 202, 602 through the ordered list of emails. Once the system receives a signal that the user has let go of the email (e.g., a lapse of contact with the screen 201), the system places the selected email tile 202 into a new position. A group of email tiles 203 may move down if the email tile 202 is moved up. FIG. 6, described below, is another example of gestures that may be used to rearrange emails.

FIGS. 3A-3E show the ability to move email tiles individually for sorting into one or more of the interface's one or more triage corners, according to one embodiment. In an embodiment, moving email tiles may include a three-dimensional visual effect of picking up an email tile from a first position (e.g., in line with a plurality of email tiles) to move it to a second position (e.g., a screen corner). The system receives an email selection of an email tile 302 from the user, such as if the user long presses the email. The system receives a signal that the user wants to place the email tile 302 into one of the screen corners 303. For example, the system receives the signal if the user (e.g., a press and hold on a region of screen 301), without letting go of the email tile 302, drags the email to any of the screen corners 303. Once the system receives a signal that the user has let go of the email (e.g., the system detects a lapse of contact), the system performs the action represented by the corner to which the user has dragged the email. The corner functions may include, for example, delete an email, include the email in a folder, favorite the email, label the email, archive the email, add the email to a to-do list, marking the email as read, reply to the email, forward the email, save attachment in the email, or any combination thereof. In an embodiment, a user may customize corner function by, for example, selecting corner function from a dropdown list of corner functions.

FIGS. 4A-4F show the ability to select and move multiple email tiles at once for sorting into one of the interface's one or more triage corners, according to one embodiment. In an embodiment, moving multiple email tiles may include a visual effect appearing to three-dimensionally pick up the email tiles from a first position and move them to a second position. The system may receive a plurality of email tiles 403 from the user. For example, if the system receives a signal that the user has pressed and let go of an email (e.g., contact with a region of the screen 401 associated with the email tiles 403 followed by a lapse of contact), the system labels the email as a selected email. The system may receive multiple email selections 403. The system receives a signal that the user wants to place the plurality of email selections 403 into one of the screen corners 303. According to one embodiment, the system receives the signal if the user drags his finger across the screen towards the desired screen corner. The system may remove the selected emails from the display (e.g., causing a plurality of gaps 406), and rearrange the display to close the gaps left by removed emails.

FIGS. 5A-5E show the histogram interface 501 responding to motion inputs (e.g., from a user's left or right wrist movement), according to one embodiment. Identifying motion inputs by utilizing various motion technologies is contemplated. The histogram interface 501 may include a plurality of time periods 503 and time periods may include time period indicator (e.g., indicator 502 stating "Thursday, Mar 9"). A motion input may be detected by any motion detection technology, such as, for example, an accelerometer, gyroscope, camera, compass, global positioning system, a plurality of motion sensors, or any combination of motion detection technology. Embodiments include the motion detection technology being located within a user device (e.g., a mobile telephone) with which a user may interact. Embodiments include the motion detection technology being located in a separate device (e.g., an external camera detecting motion of the user). Various motion technologies are contemplated, and any discussion of a particular motion detection technology should not be construed as limiting.

In an embodiment, the system may detect a motion input (e.g., via an accelerometer, gyroscope, and/or other motion detection technology) and provide a second view in response to receiving the motion input. For example, the system may detect a user moving a user device (e.g., a mobile device) and enable the user to navigate the histogram interface based on pre-defined motions. The system may browse the histogram 102, 907 upon receiving a motion-based gestures from the user. According to one embodiment, if the user rotates the device to the user's left (i.e. counterclockwise if viewing the bottom of the mobile device), from position 504 to position 506, the system displays the previous time period's email 508; if the user rotates the device to the user's right (i.e. clockwise if viewing the bottom of the mobile device), from position 509 to position 511 the system displays the next time period's email.

Figure 6A:
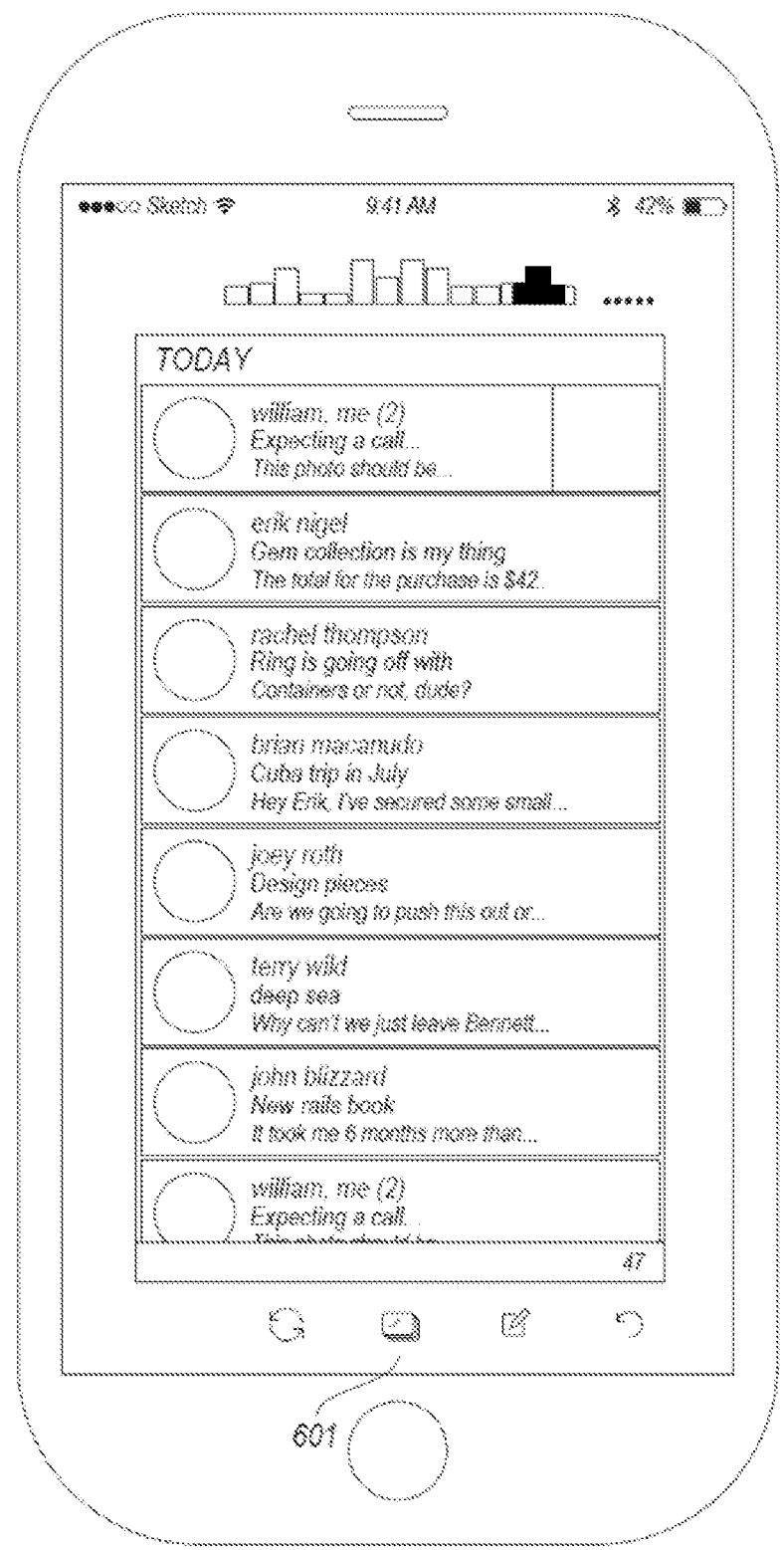
FIGS. 6A-6F show how the email tiles may be tossed to the top with a forward wrist motion after they are selected, according to one embodiment.
Figure 6B:
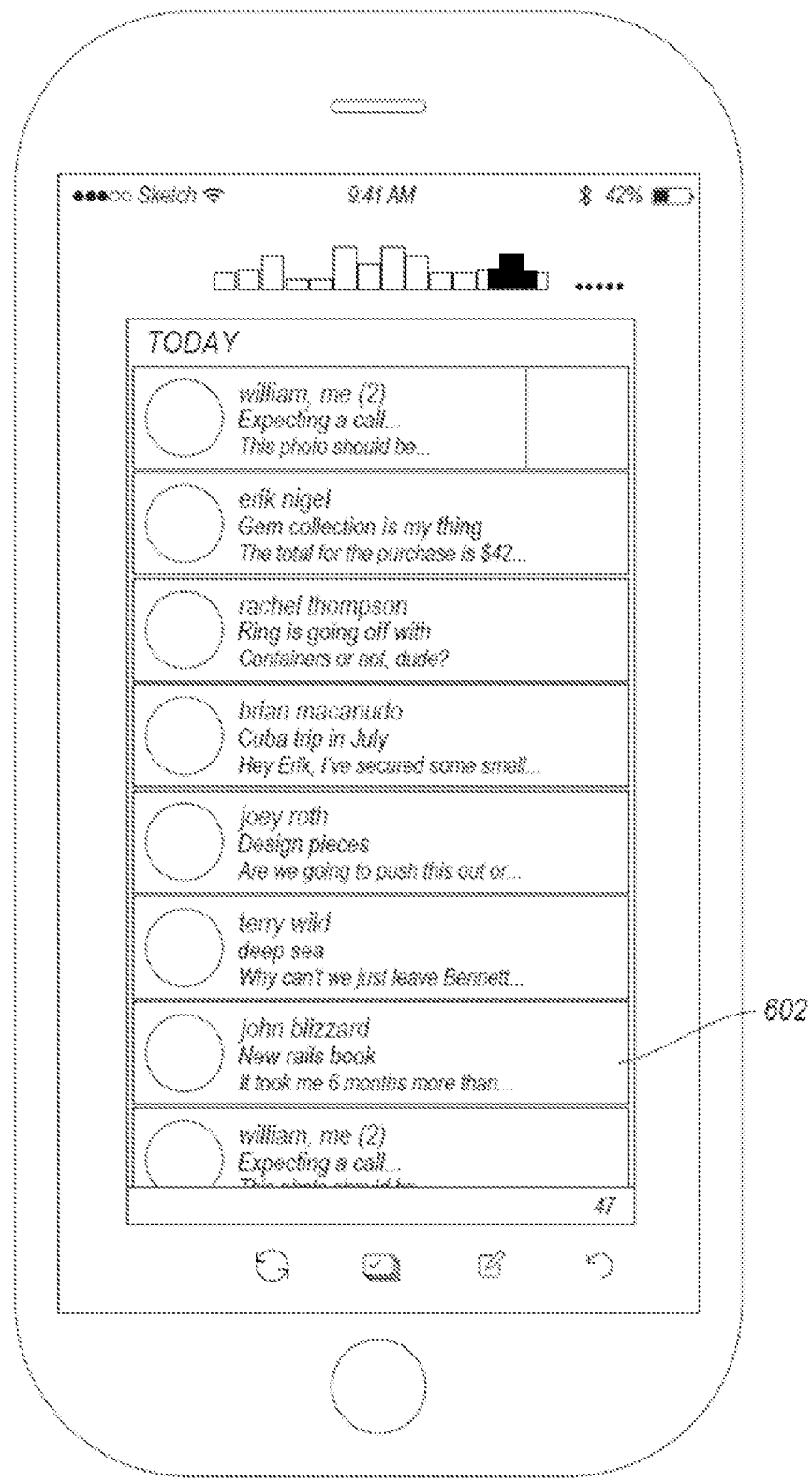
Figure 6C:
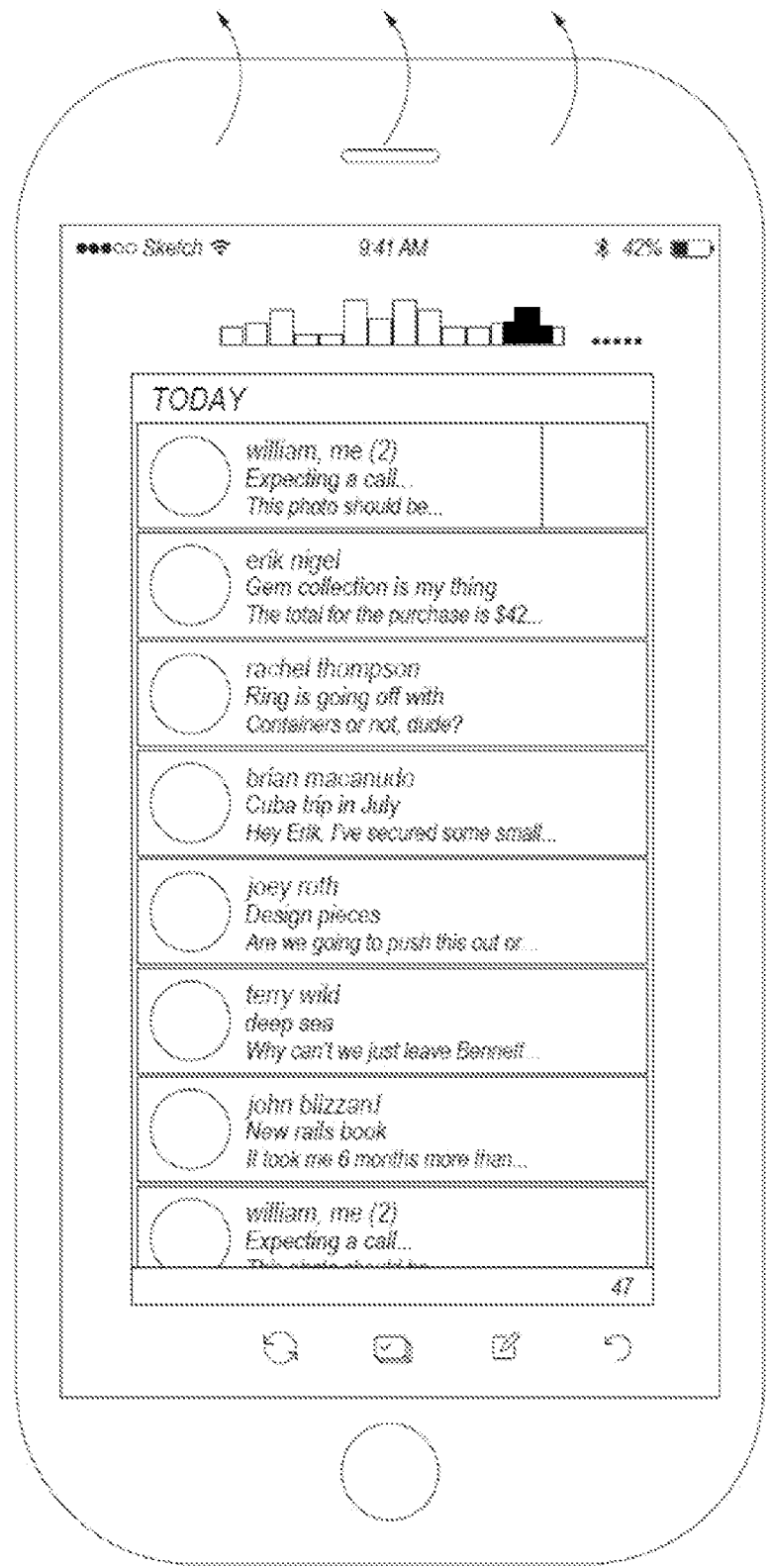
Figure 6D:
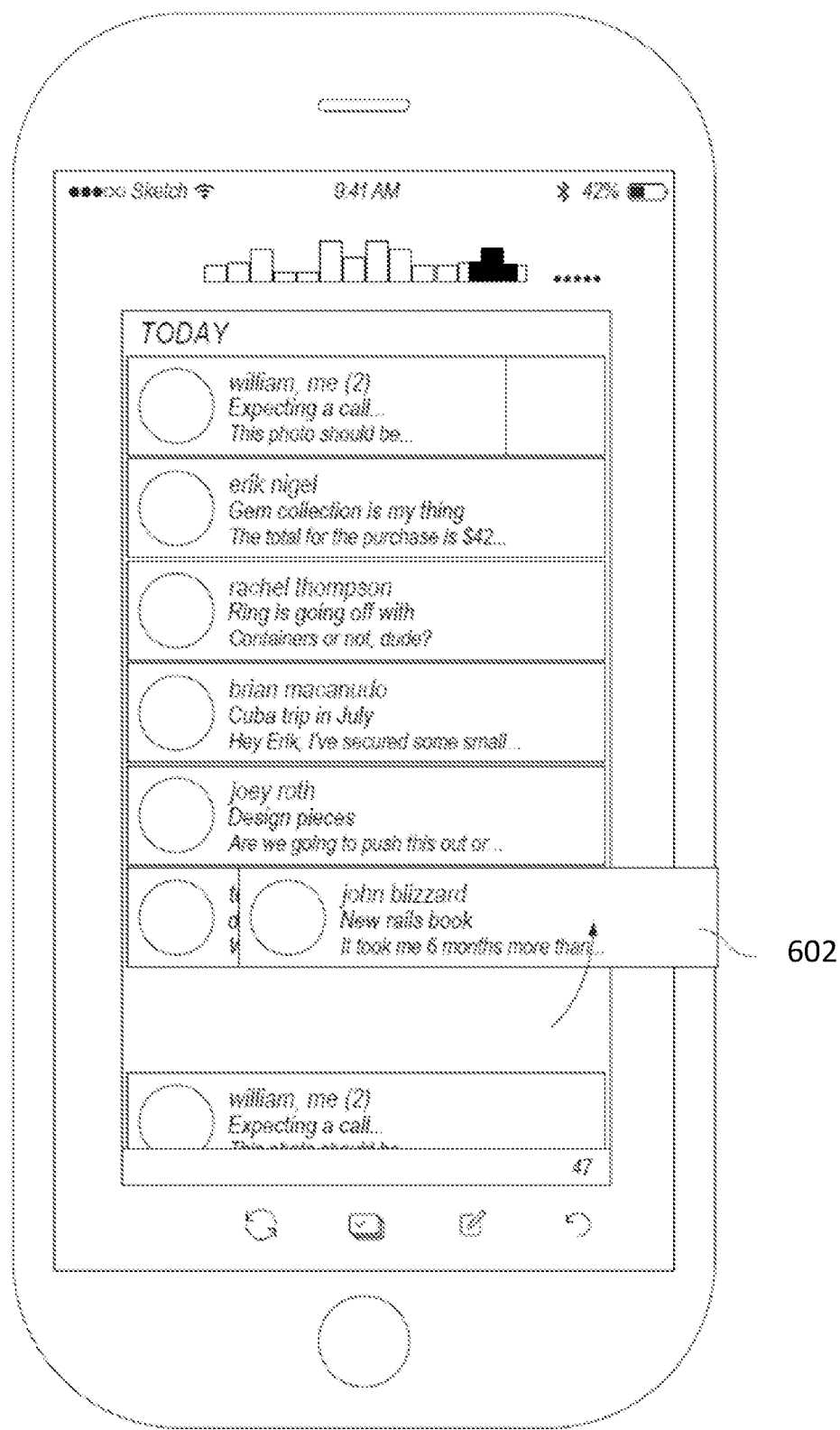
Figure 6E:
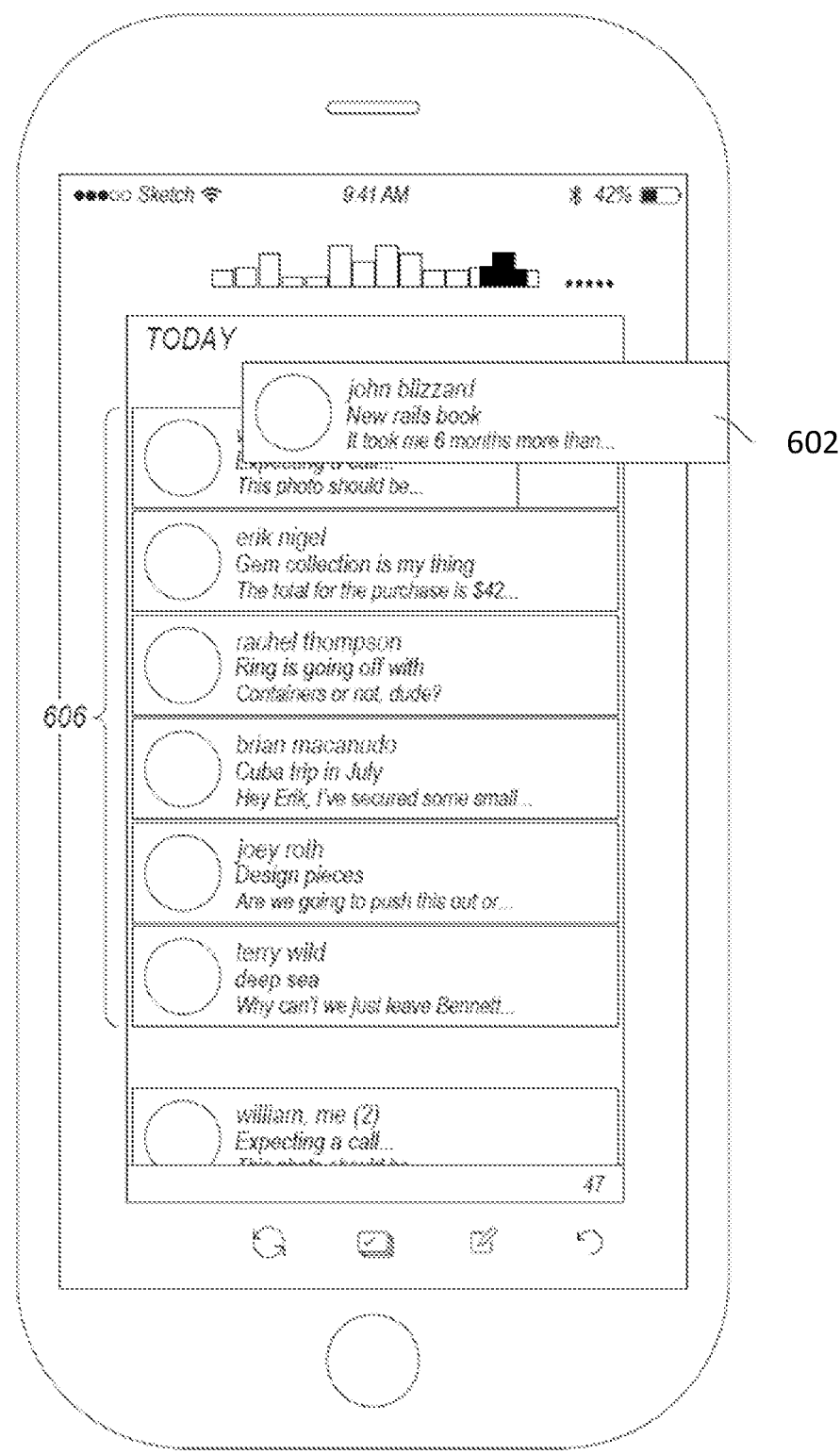
Figure 6F:
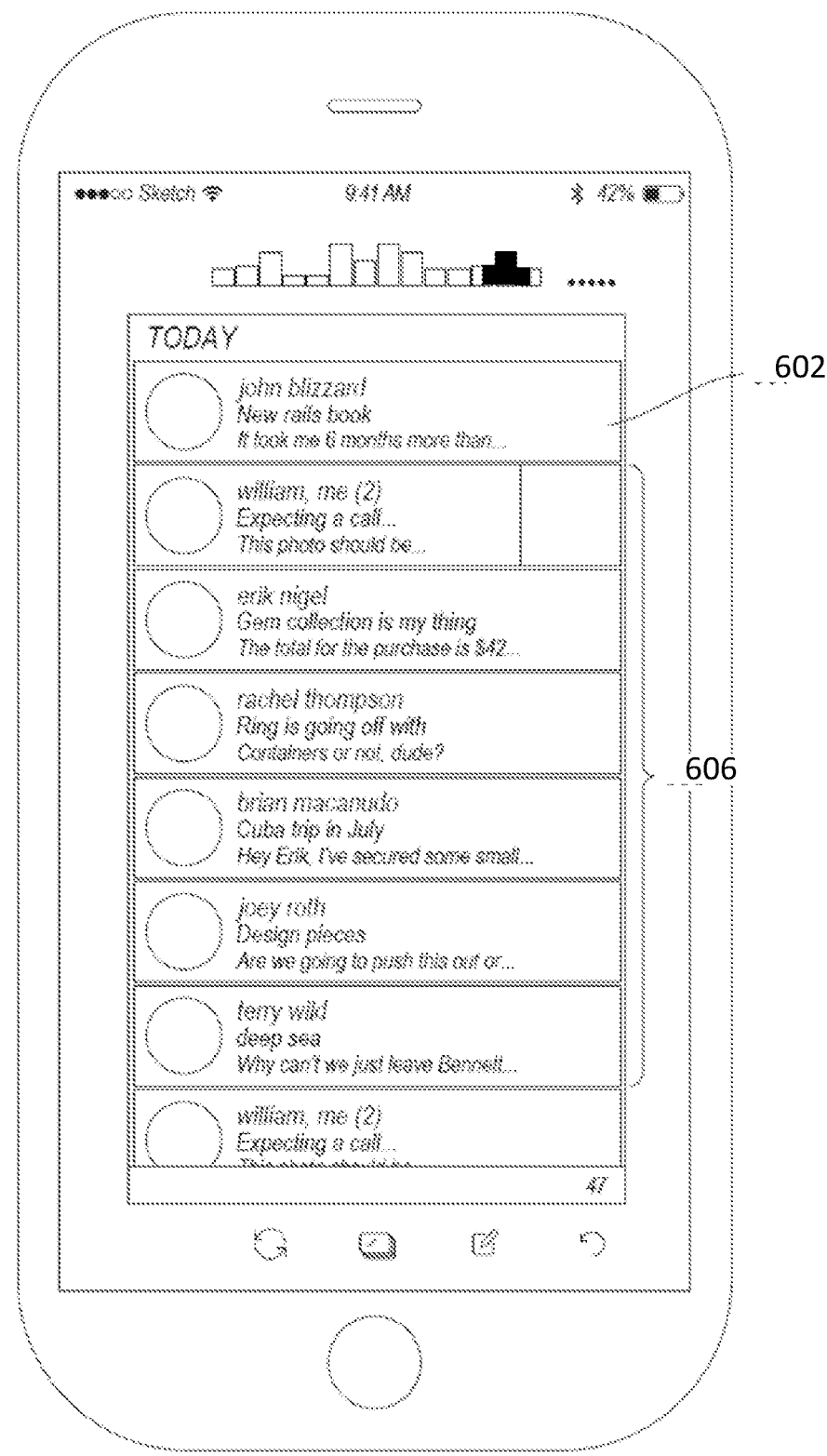

FIGS. 6A-6B show how the email tiles displayed in screen 601 may be tossed to the top with a forward wrist motion after they are selected, according to one embodiment. The system receives an input from the user, the input comprising an email tile 202, 602 that the user would like to place in a different position. For example, the system receives an email selection from the user, if the user presses the email tile 202, 602. The system may move the email to the top of the list upon receiving a motion-based gesture from the user. According to one embodiment, the motion-based gesture comprises tilting the device forward away from the user. Once the system receives a signal that the user has tilted the device, the system places the selected email tile 602 into a new position. A group of email tiles 606 may move down if the email tile 602 is moved up.

Figure 7:
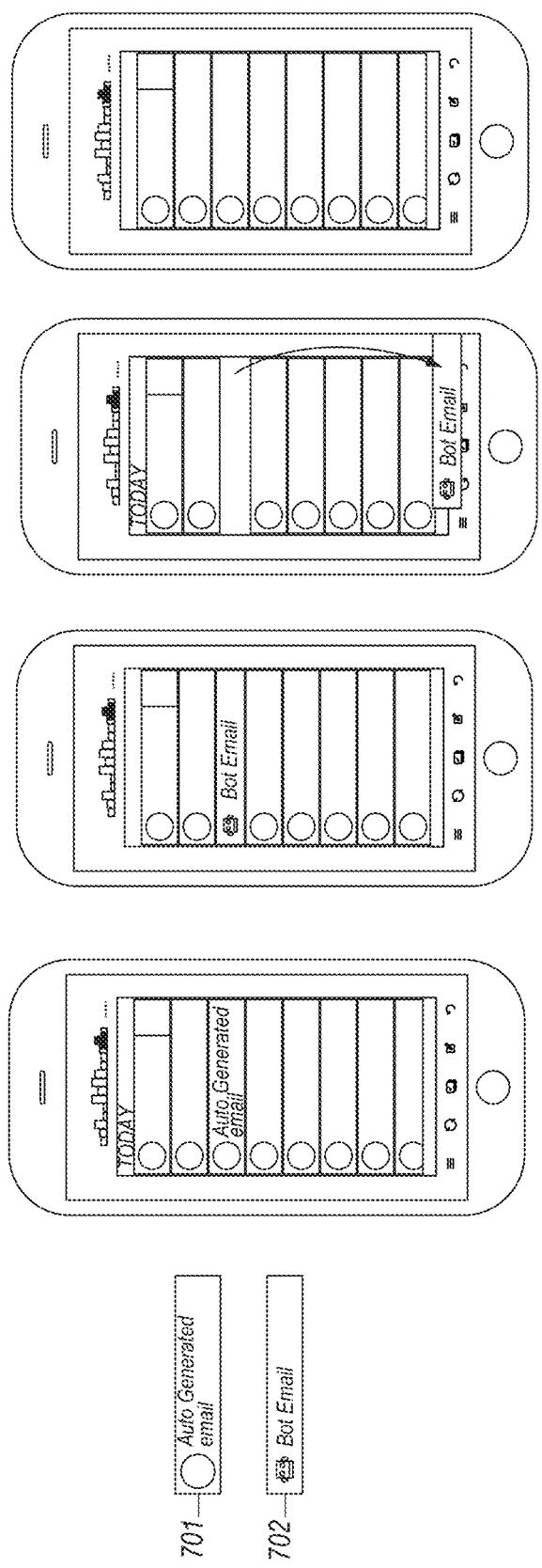
FIG. 7 shows how automatically generated emails are represented visually different from the emails received from human senders, according to one embodiment.

FIG. 7 shows how automatically generated emails are represented visually different than the emails received from human senders, according to one embodiment. For example, an automatically generated email may be represented as a standard email 701 or as a bot email 702. The bot email 702 may include a symbol representing a bot (e.g., a symbol of a head of a robot). The symbol representing a bot may indicate to a user that the email is automatically generated to help distinguish automatically generated emails from emails prepared by a human sender. The system may be configured to display automatically generated emails (e.g., bot email 702), such as emails generated by machines or by an application executing on the machine (referred to as a "robot"), in an alternate view (e.g., a view other than chronologically in an email list 704). An alternate position for an automatically generated email may include, for example, a bottom of the list of daily emails, hidden from the list, or hidden from the histogram 102, 907 count.

In an embodiment, one or more automatically generated emails identified by the system can be removed from the main user interface view temporarily or permanently by a tap on the front or back of the mobile device. This tap creates a visual representation within the user interface where the automatically generated non-human sender emails are, in an animated fashion, visually knocked forward and fall down out of their respective columns offscreen.

Figure 8:
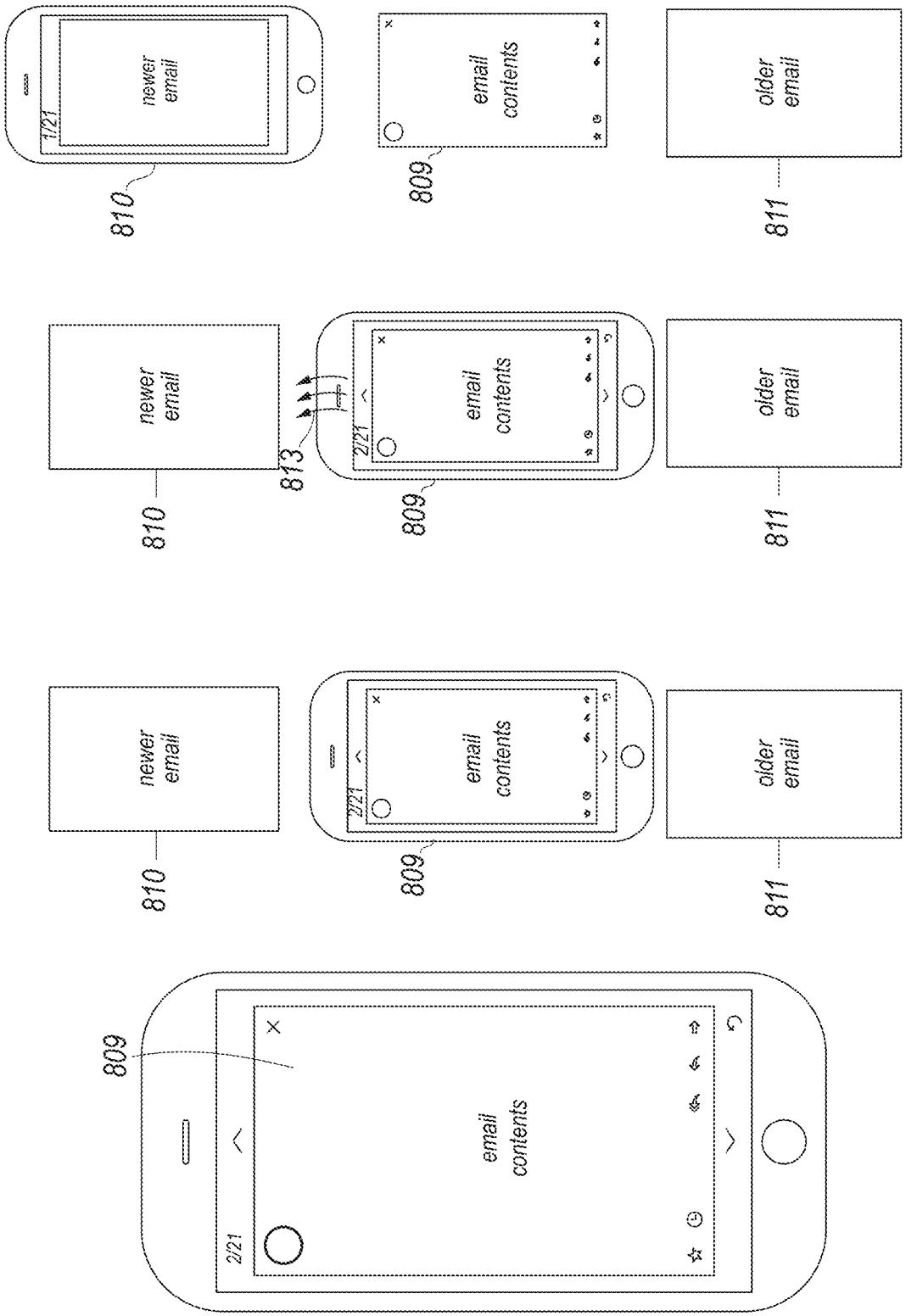
FIG. 8 shows how users may use forward or backward wrist flicks to navigate to older and newer emails in the system detail view, according to one embodiment.

FIG. 8 shows how users may use forward or backward wrist flicks to navigate from a current email 809 to an older email 811 and newer email 810 in the system detail view, according to one embodiment. The system enables the user to browse through the emails using gestures (e.g., gesture 813). In an embodiment, the system may detect tilting 813 of a user device, and in response to detecting tilting of the user device, the system may display a subsequent (e.g., newer email 810) or previous email (e.g., older email 811). According to one embodiment, if the system is displaying an email (e.g., including text 802 and/or images of the email), and the system receives a gesture tilting the phone forward (e.g., gesture 813), the system may display the following email (e.g., newer email 810); if the system receives a gesture tilting the phone backwards, the system may display the previous email (e.g., older email 811). An order of emails may be based on, for example, an order indicated by a user (e.g., by a user rearranging emails user gestors), a chronological order of emails, an order altered by the system (e.g., in response to detecting an automated email), or a combination thereof (e.g., a partially chronological list of emails with some emails having an order altered by the system and some rearranged by a user).

Figure 9A:
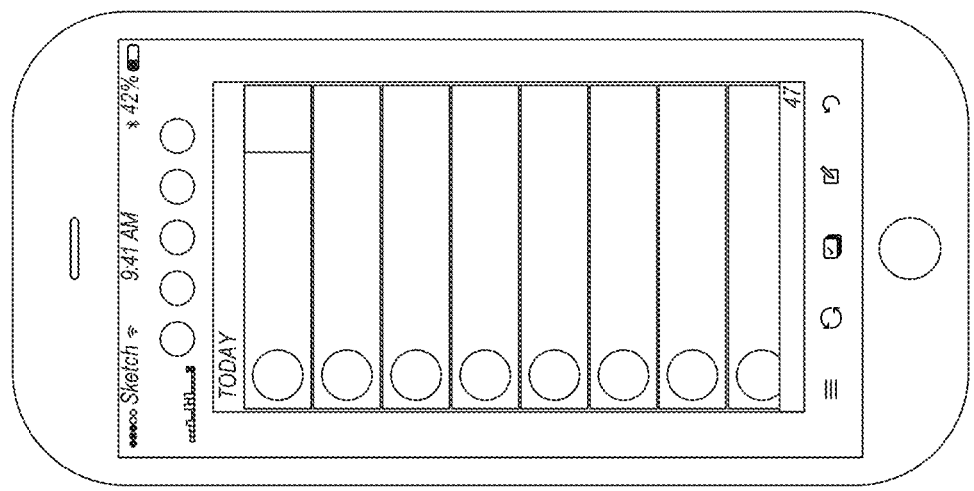
FIGS. 9A-9B show how the system timeline and the user's email quantity by time period is displayed in a histogram, according to one embodiment.
Figure 9A:
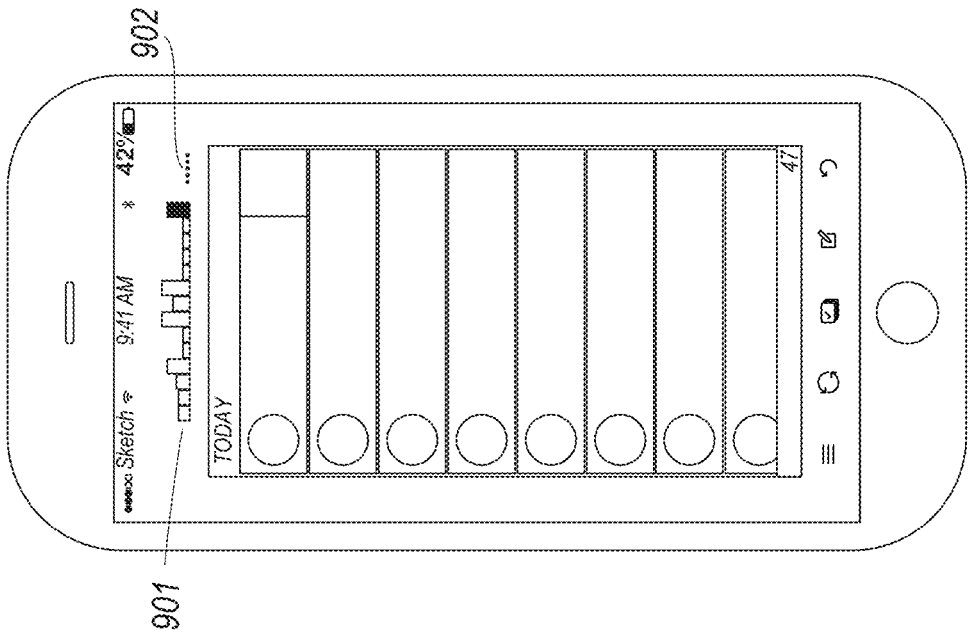
Figure 9B:
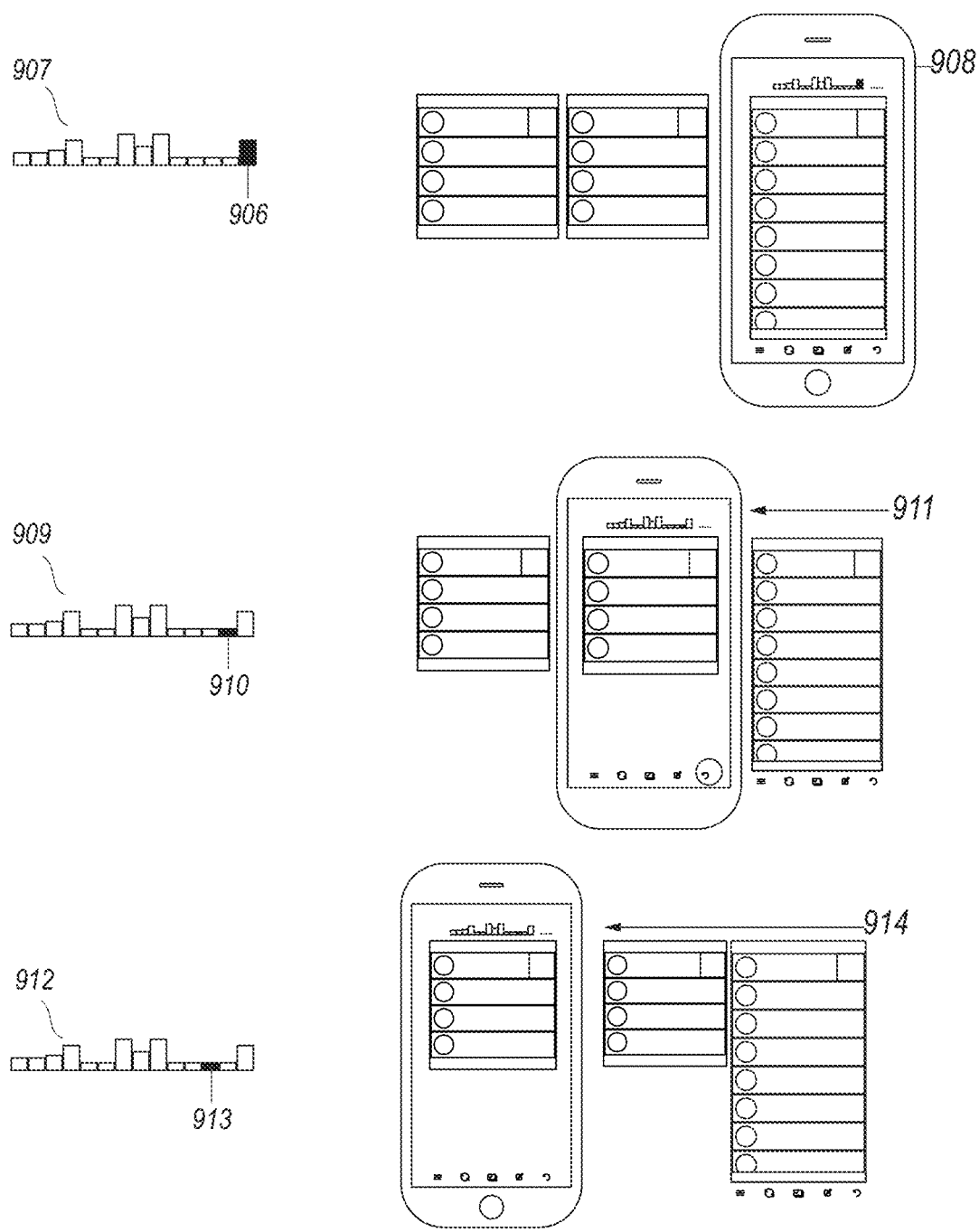
Figure 10A:
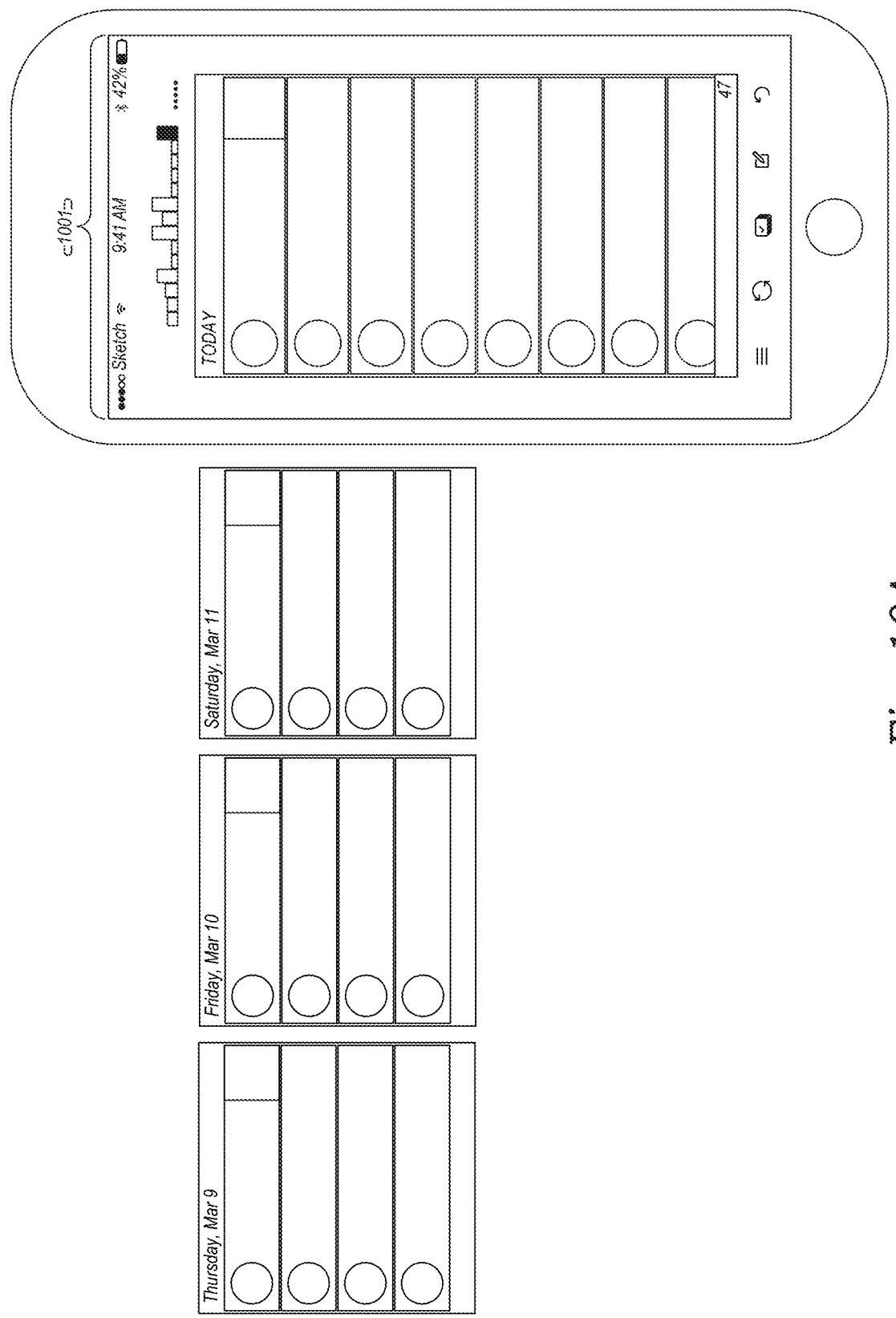
Figure 10B:
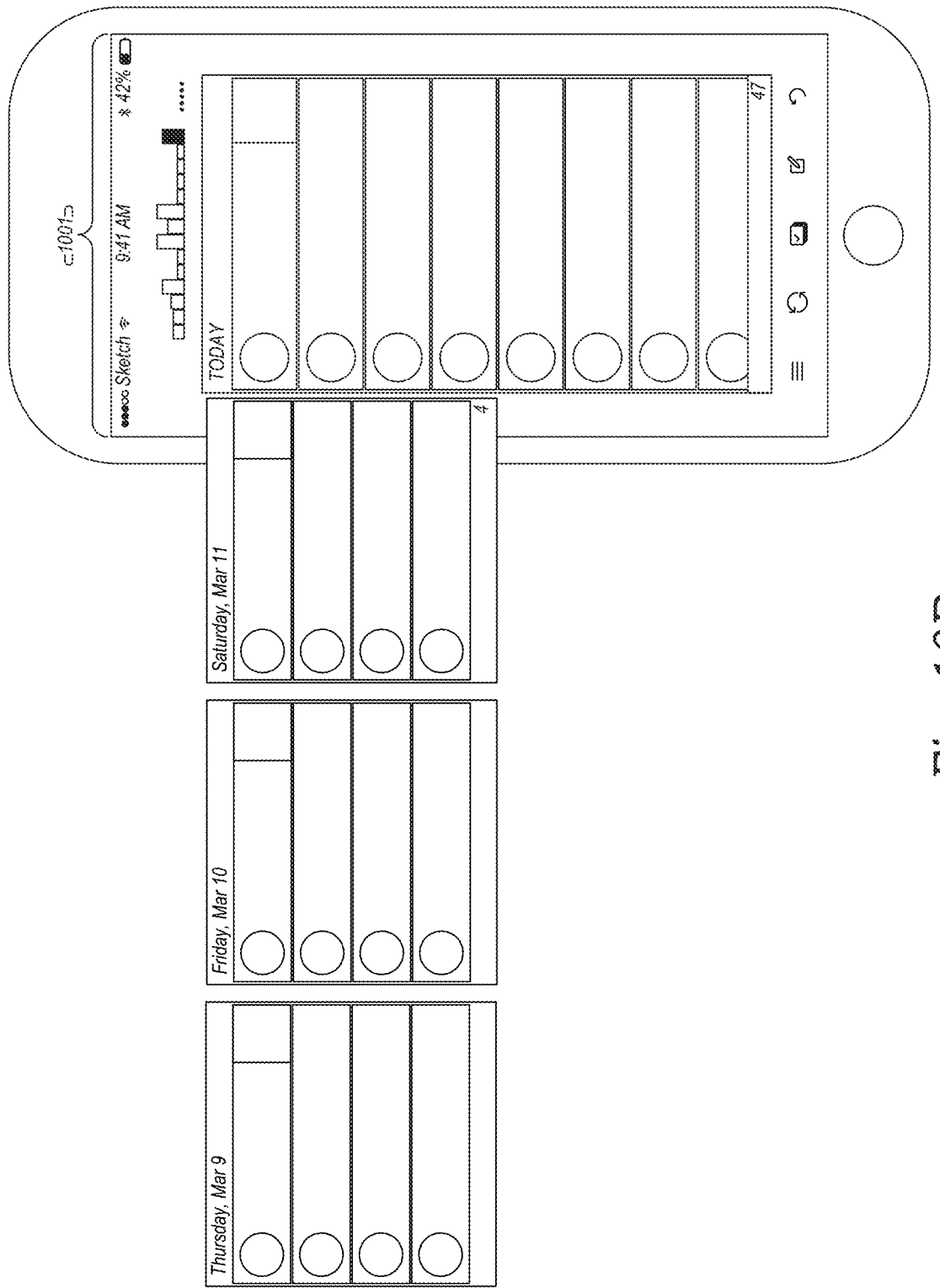
Figure 10C:
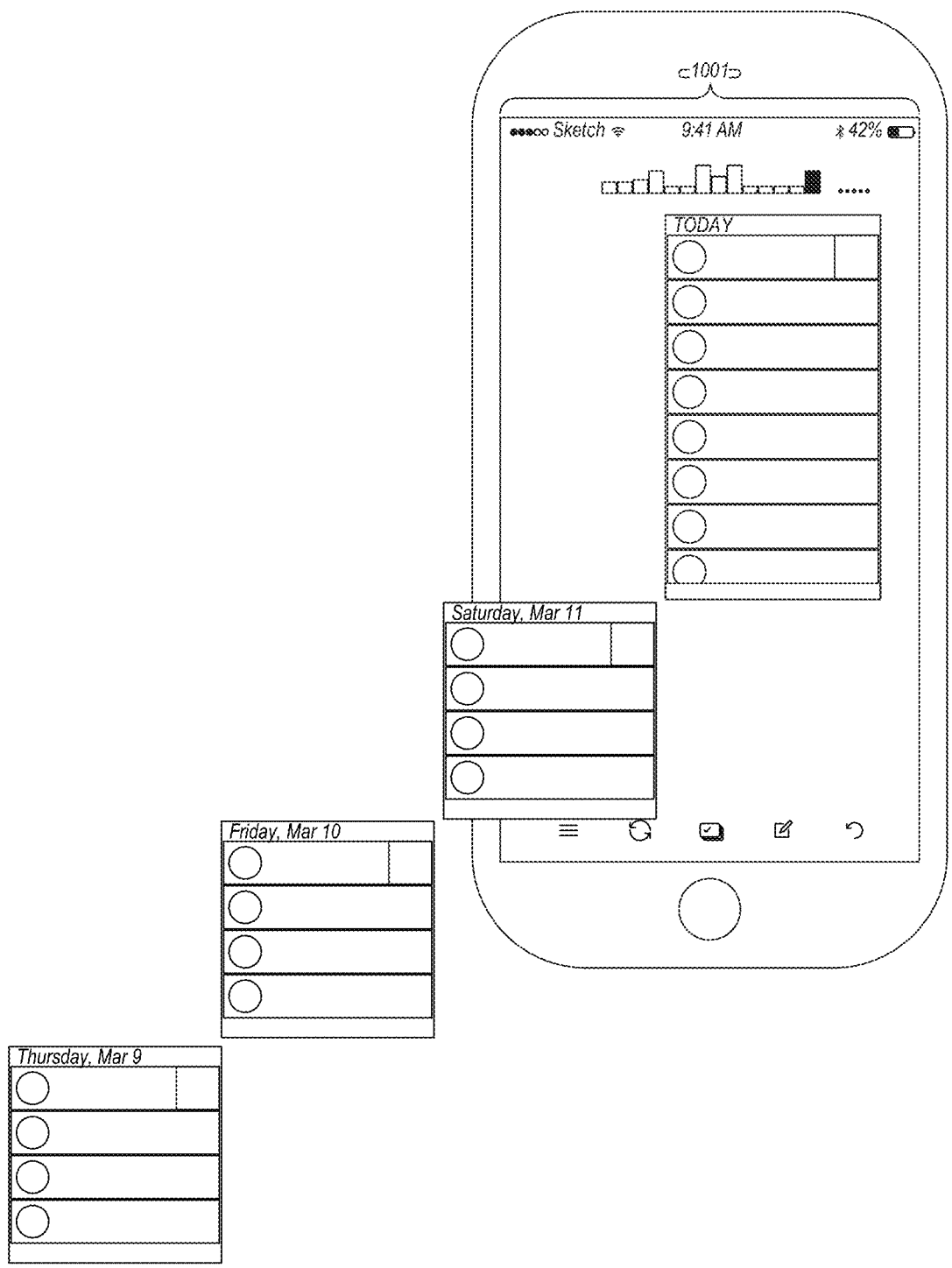
Figure 10D:
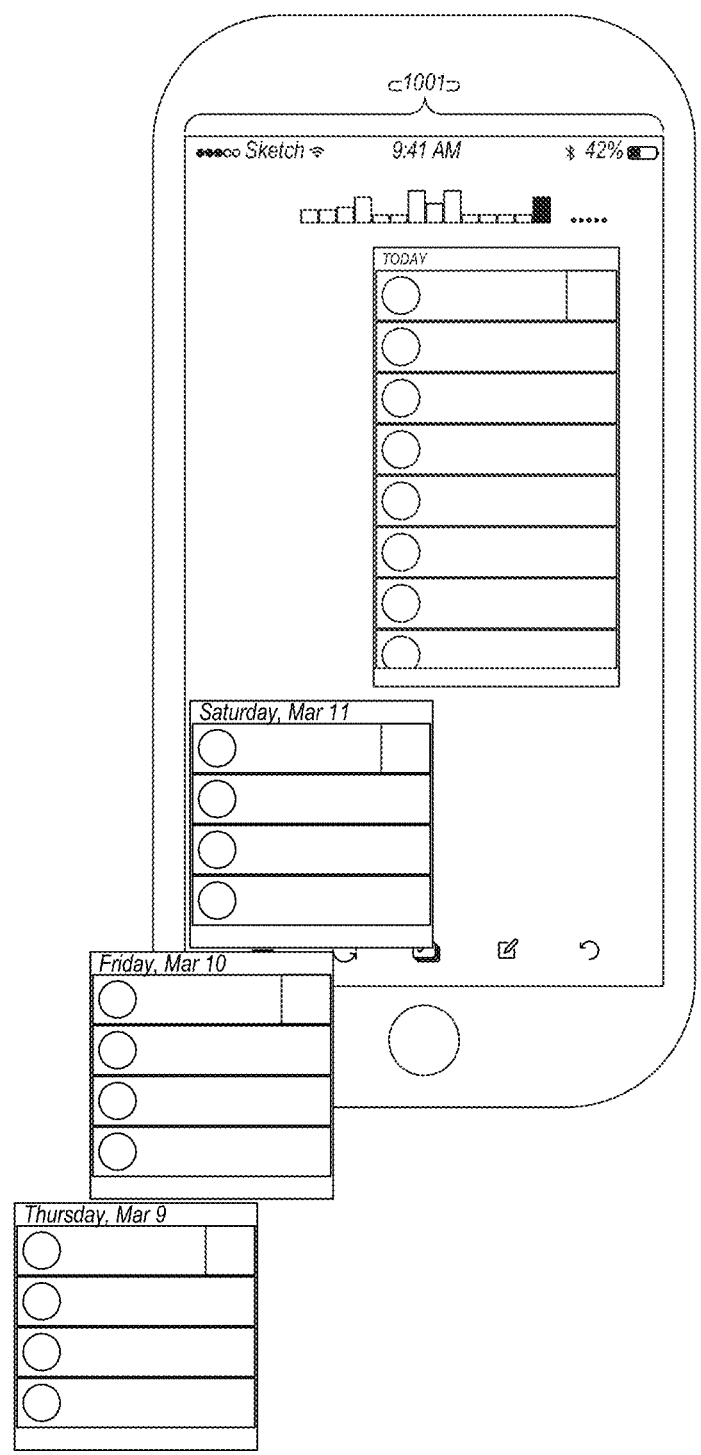

FIGS. 9A-9B show how the system timeline and the users email quantity by time period is displayed in a histogram 901, according to one embodiment. The histogram 901 may be displayed along the top of the interface which may be used to scroll from one time frame to another (e.g., from a list of emails associated with a first time period to a list of emails associated with a second time period). In addition, a user may scroll across the histogram to view contacts 902

(e.g., very important person "VIP" contacts or favorite contacts), forward emails, open all emails from a VIP contact, start a fast email to one of a user's most frequent personally selected VIP contacts, or any combination thereof. VIP contacts may be, for example, selected by a user, identified as frequent contacts by the system, or a combination thereof. The histogram 102, 907 marks the selected time period 906, for which the list of emails is displayed on the device 908. The selected time period 906 may be distinguished from other time periods by including, for example, a shade darker than other time periods, a color different than other time periods, a texture different than other time periods, or any combination thereof. The system may receive a gesture from the user to scroll through the histogram 102, 907. According to one embodiment, the gesture comprises tilting the phone to the left or to the right to scroll backwards or forwards, respectively. According to another embodiment, the user may select a date to display by pressing on the histogram 102, 907 representing the email count for that time period. According to another embodiment, the user may drag his finger across the histogram 102, 907 thereby scrolling through emails received on different time periods. For example, a user may be in contact with a display of a user device associated with a region of the selected time period 906 and the user device may display emails received on a time period associated with the selected time period 906 (e.g., as displayed on user device 908). In another example, a user may be in contact with a display of a user device associated with a region of the selected time period 910 of the histogram 909 and the user device may display emails received on a time period associated with the selected time period 910 (e.g., as displayed on user device 911). In another example, a user may be in contact with a display of a user device associated with a region of the selected time period 913 of the histogram 912 and the user device may display emails received on a time period associated with the selected time period 913 (e.g., as displayed on user device 914).

FIGS. 10A-10F show the transition between a horizontal interface and a vertical interface of emails for a user device 1001, according to one embodiment. The horizontal interface displays emails associated with a time period (e.g., an hour, day, week, month) arranged horizontally so that emails associated with a single time frame are displayed on a user device and emails associated with one or more other time frames are accessible by gesturing left or right (e.g., swiping left or right, tilting left or right). The vertical interface displays all the emails in a vertical list so that emails associated with a plurality of time frames may be accessible by gesturing up or down (e.g., swiping up or down, tilting up or down). The horizontal interface may transform into a vertical interface; and the vertical interface may transform into a horizontal interface. For example, a user may select a first group of emails associated with a first time frame (e.g., by pressing and holding the screen of a user device) and drag the first group of emails associated with the first time frame to a second group of emails associated with a second time frame. The first group may be dragged above, below, or onto the second group. The system may respond to a user selecting and dragging the first group to the second group by presenting the first group and second group as a single vertical list.

Figure 11:
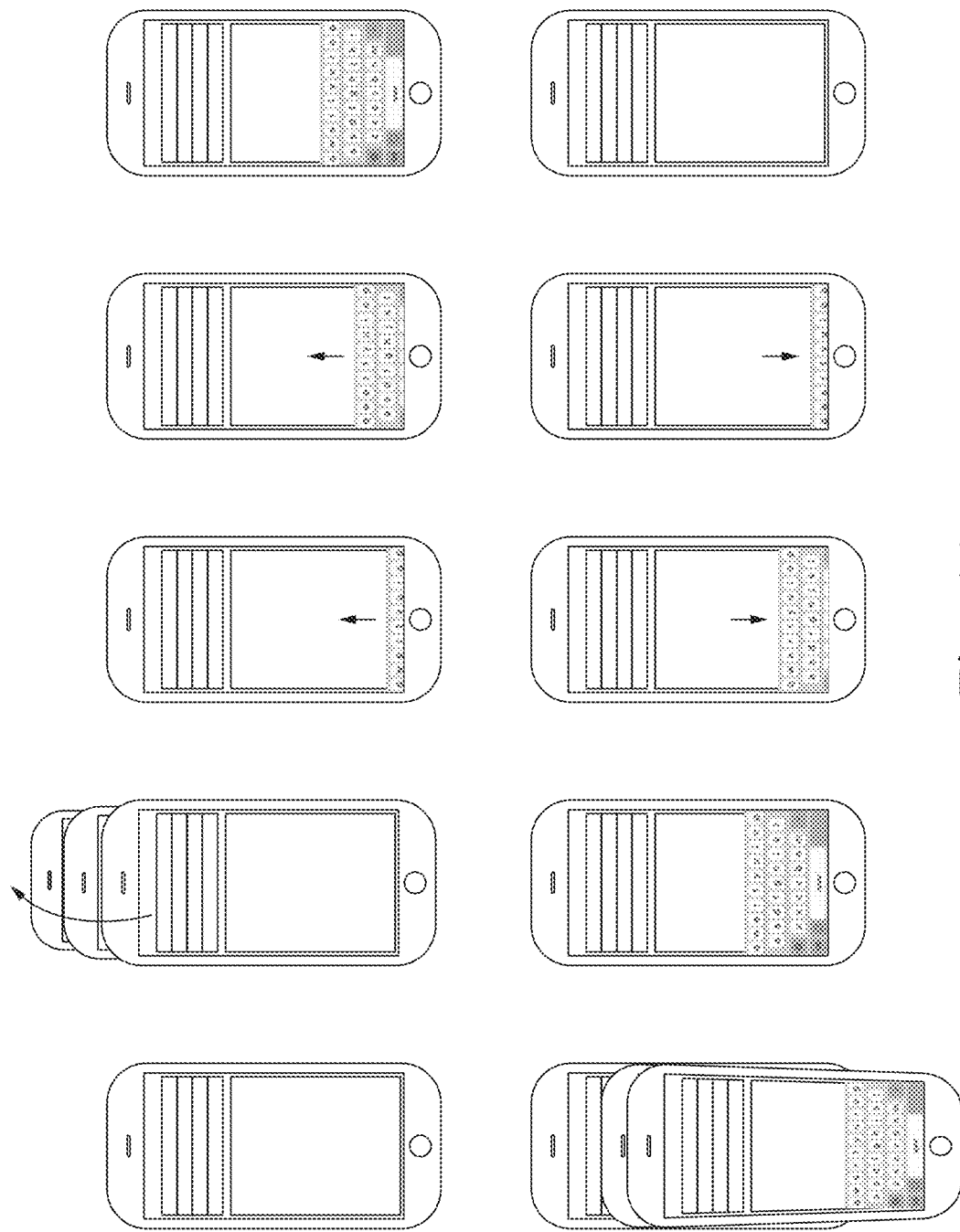
FIG. 11 shows the system providing and/or removing a keyboard in response to a motion-based gesture, according to one embodiment.

FIG. 11 shows the system providing and/or removing a keyboard in response to a motion-based gesture, according to one embodiment. In an embodiment, the system may provide a virtual keyboard on an interface of a user device in response to detecting a motion-based gesture. For example, if a user holding the user device motions a wrist forward away from their body while viewing an interface for composing, replying to, or forwarding email, the keyboard for the user device visible to user onscreen may be displayed with an animation and focus of the cursor may be put into the first blank field starting from the top. The animation may include the keyboard scrolling into view from a bottom of the screen. In another example, if a user holding the user device motions a wrist back towards their body in a gesture while viewing an interface for composing, replying to, or forwarding email, the keyboard for the user device visible to user onscreen may be hidden with an animation. The animation may include the keyboard scrolling down out of view of the screen.

Figure 12A:
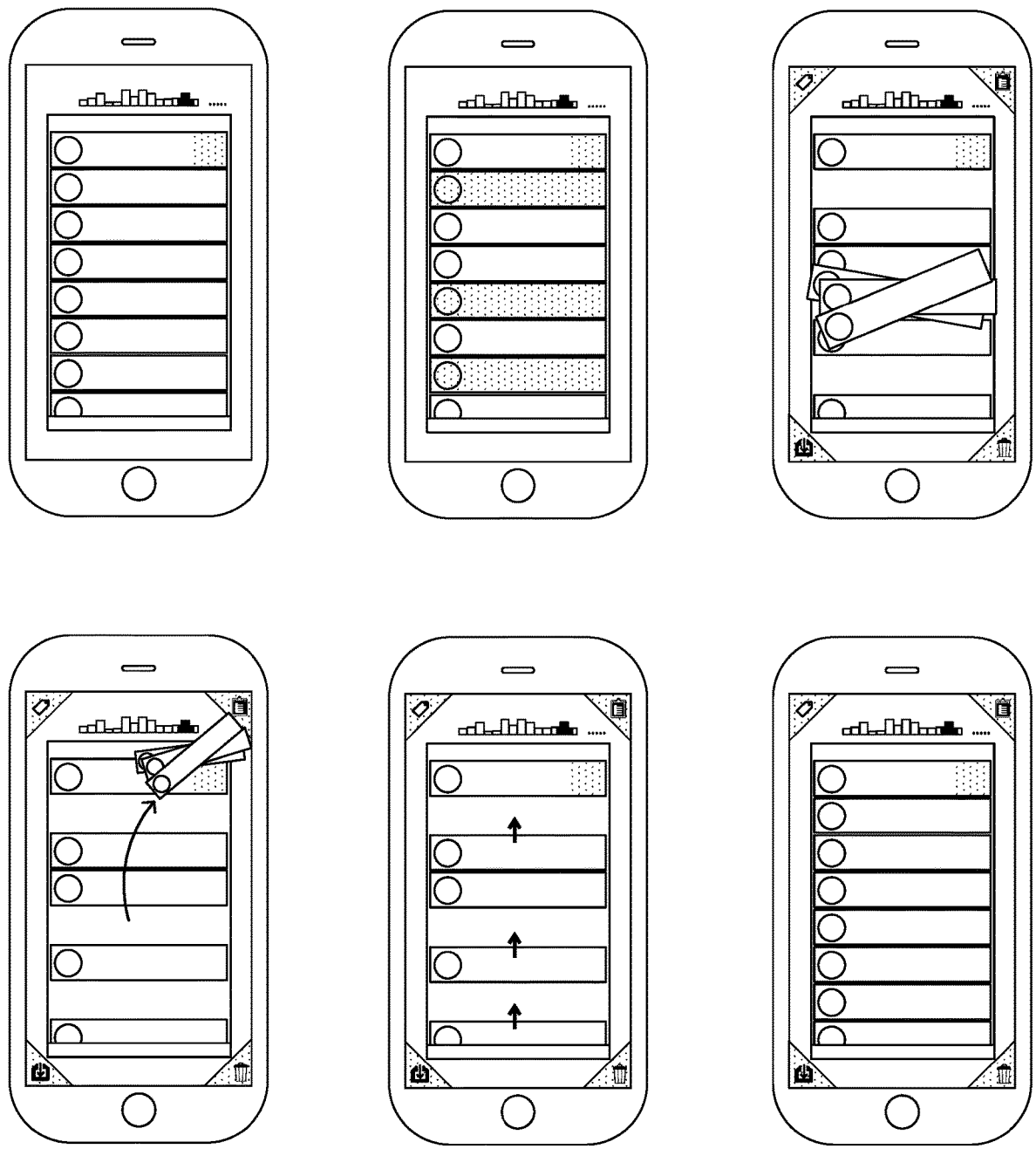
FIGS. 12A-12B show the undo feature, according to one embodiment.
Figure 12B:
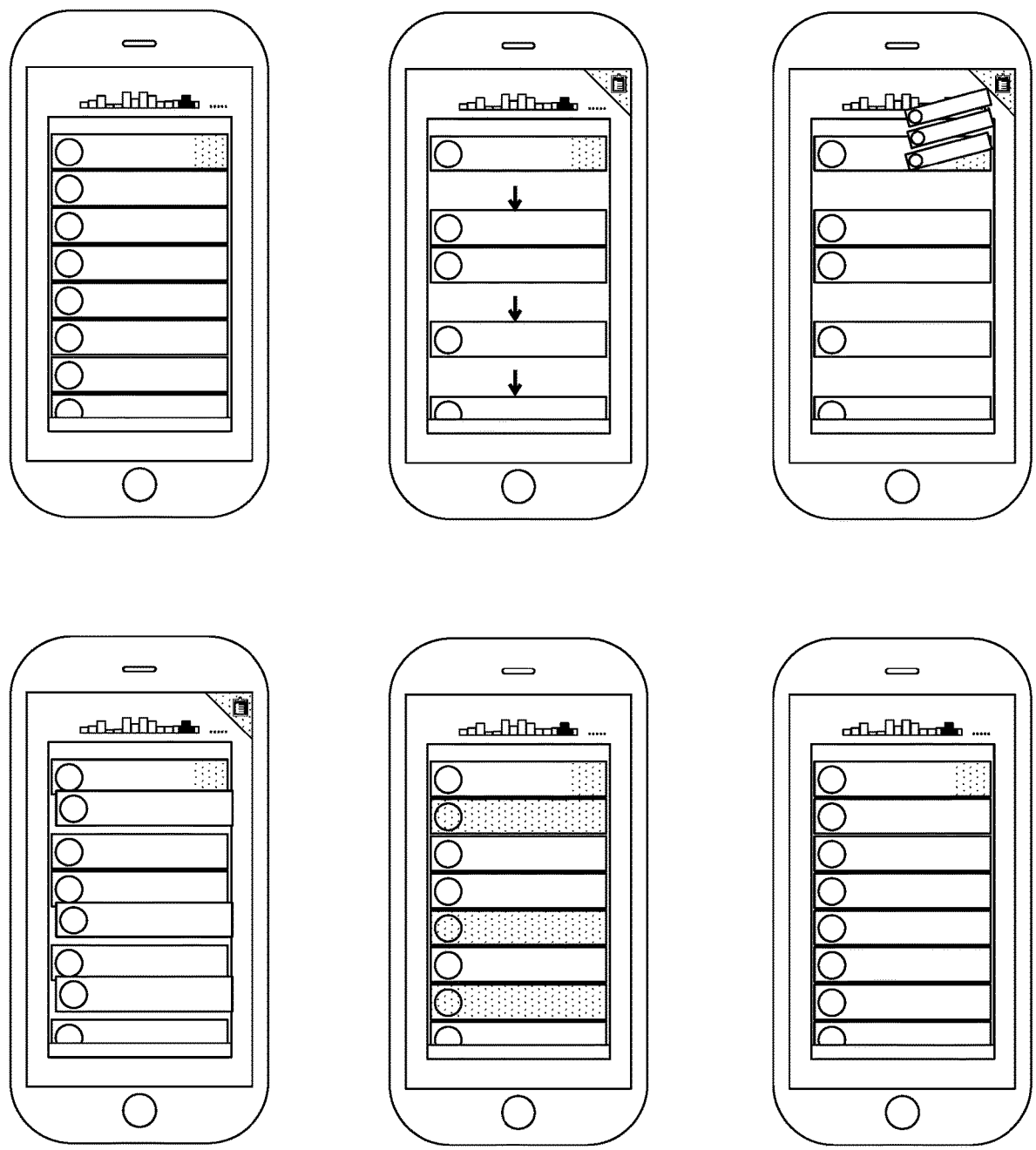

FIGS. 12A and 12B show an undo feature, according to one embodiment. In an embodiment, the system may include an undo feature to reverse one or more email management features. For example, a user may pick up individual emails or multiple emails and toss them to a corner to label, archive, delete, move, or take another action. The system may track the email management features utilized. The user may provide an input for the undo feature by, for example, selecting an undo icon or providing a motion-based gesture (e.g., shaking the user device). Undoing an action may apply to a last email management feature or a plurality of prior email management features performed by the system. A user may utilize the undo feature to correct mistakes including, for example, reclassifying emails to a new location or leaving emails in their original position within the main interface.

Figure 13A:
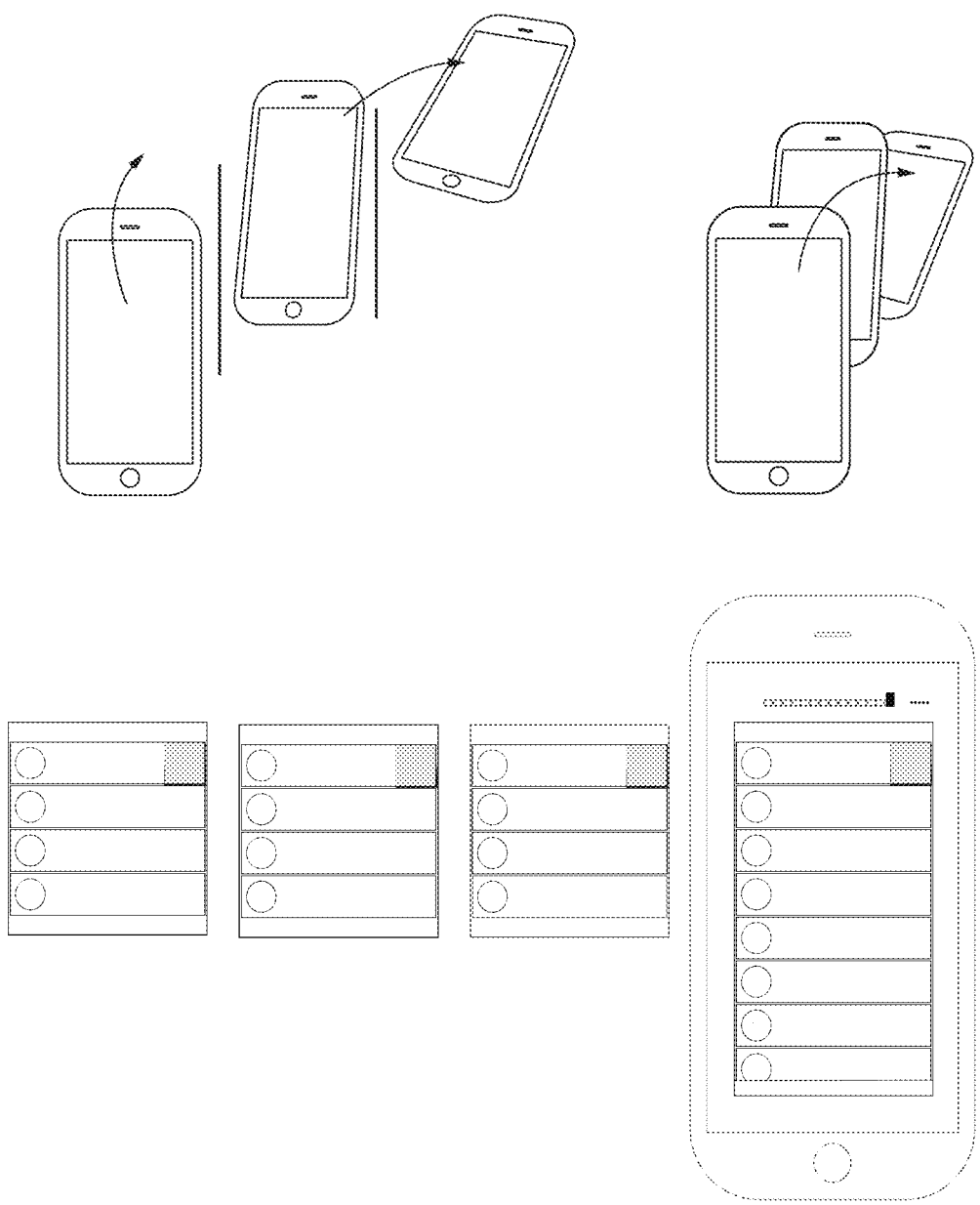
FIGS. 13A-13B show a "fishing pole" gesture to display an oldest or more recent time period, according to one embodiment.
Figure 13B:
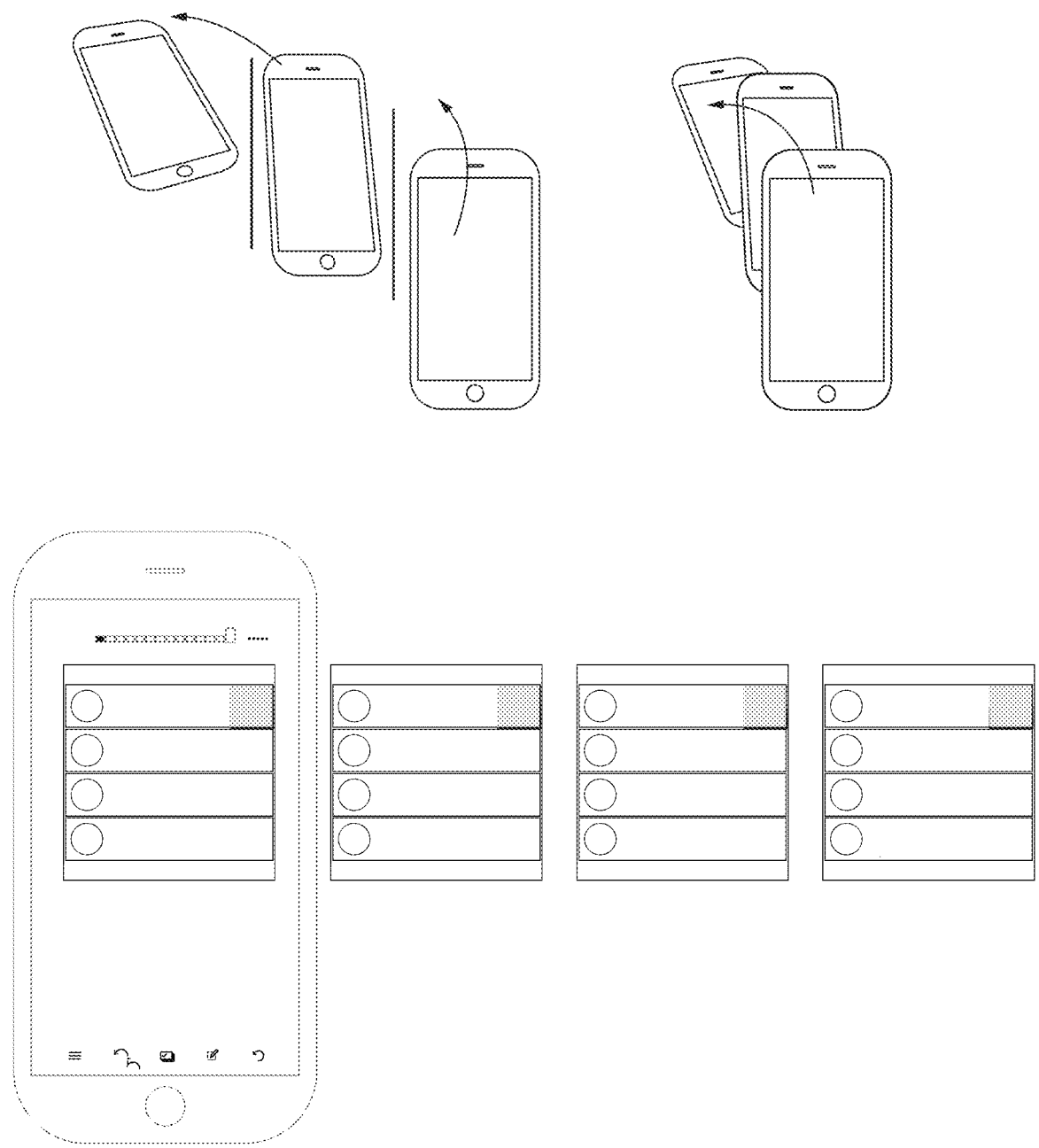

FIGS. 13A-13B show a "fishing pole" gesture action to end or being a timeframe, according to one embodiment. In an embodiment, the ability of a user to move not just by individual time periods but to move their horizontal timeline interface to the end or beginning of the time period represented by the histogram. In a diagonal motion gesture where the user moves his wrist forward and to the right or left as detected by the motion sensors, the user interface is animated and shifts to either the beginning or end of the current email columns represented by the timeline based on the direction being oriented more to the right or left at the ending point of the user hand movement.

Figure 14:
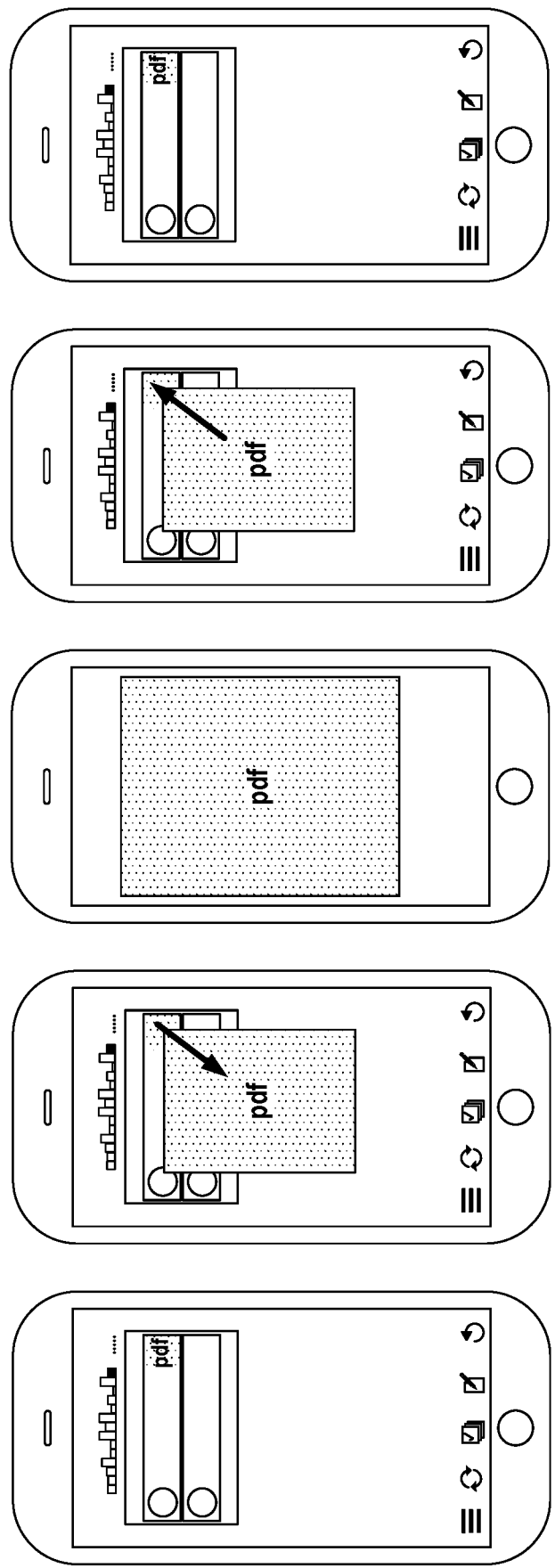
FIGS. 14-15 show how an image preview and/or a document preview and/or an audio or video content preview may be surfaced in a main interface without having to open an email, according to one embodiment.
Figure 15:
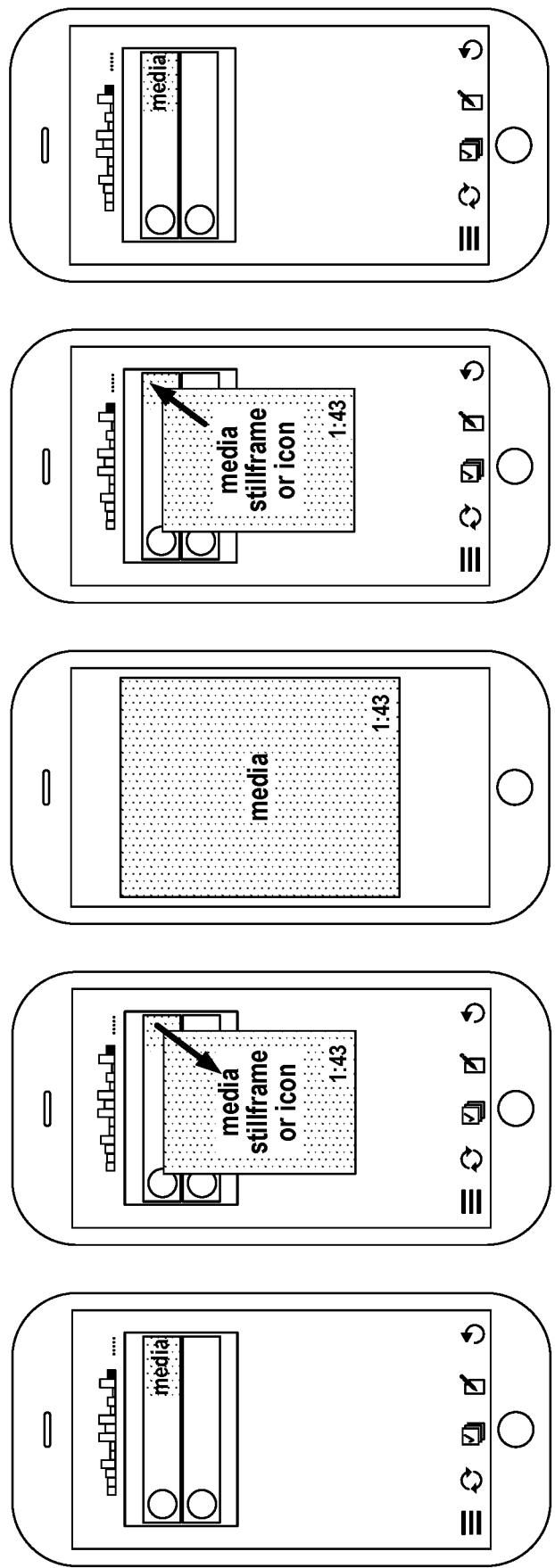

FIGS. 14-15 show how image and document previews are surfaced in main interface without having to open an email, according to one embodiment.

FIG. 14 shows the ability of a user to see a preview visualization of one or more document and image previews within the main interface without first opening an email first. The preview visualization can also be interacted with through a gesture touch on the screen to open a full size of the attachment in question, whether it is an image, a pdf, a word document, or any other file type. This surfacing of attachment content is a unique way for users to get access to potentially important visual information or documents more directly from within an email or to determine which emails might be of most interest for interacting with first.

FIG. 15 shows the ability of the user to see a preview visualization of other media parsed out of links within the body of an email in this example showing a YouTube® video which can be interacted with and opened directly without opening the email and tapping any additional links. This surfacing of media content is a unique way for users to get access to potentially important or entertaining information more directly from within an email or to determine which emails might be of most interest for interacting with first.

Figure 16:
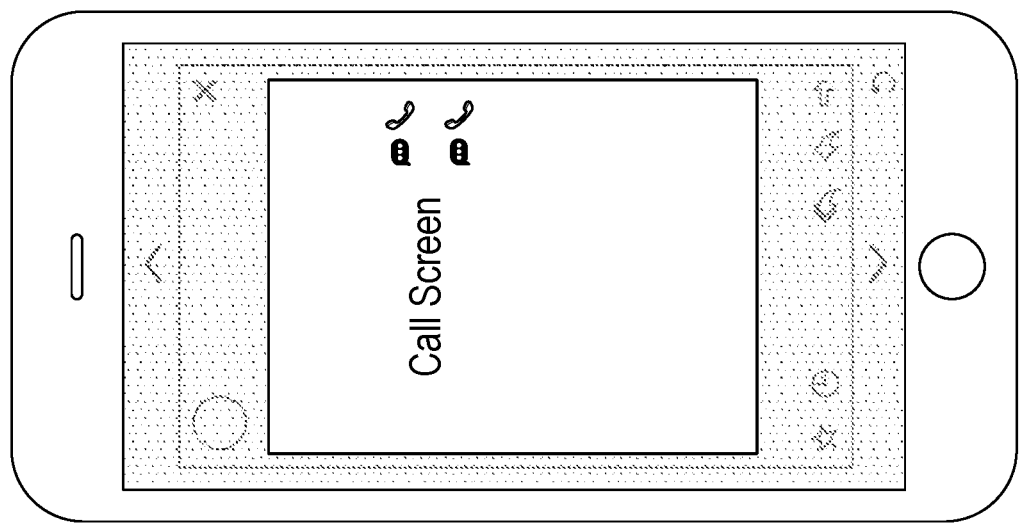
FIG. 16 shows a popup for contact information which may allow a prompt communication to another user, according to one embodiment.
Figure 16:
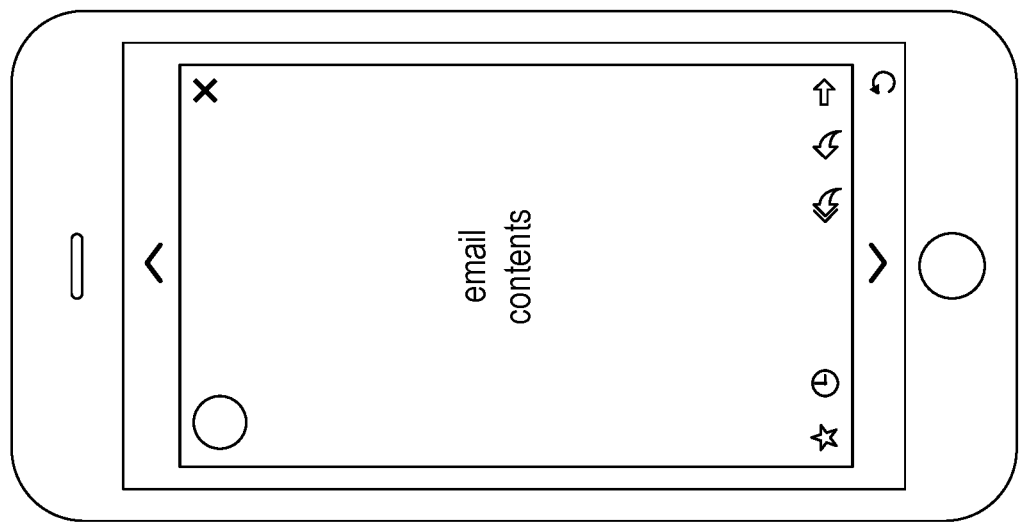

FIG. 16 shows a popup for contact information which may allow a prompt text message or call, according to one embodiment. In an embodiment, the ability of users to quickly get to the contact details for all recipients and/or senders of an email thread and to initiate a mobile phone call or text message from directly within the application.

Figure 17A:
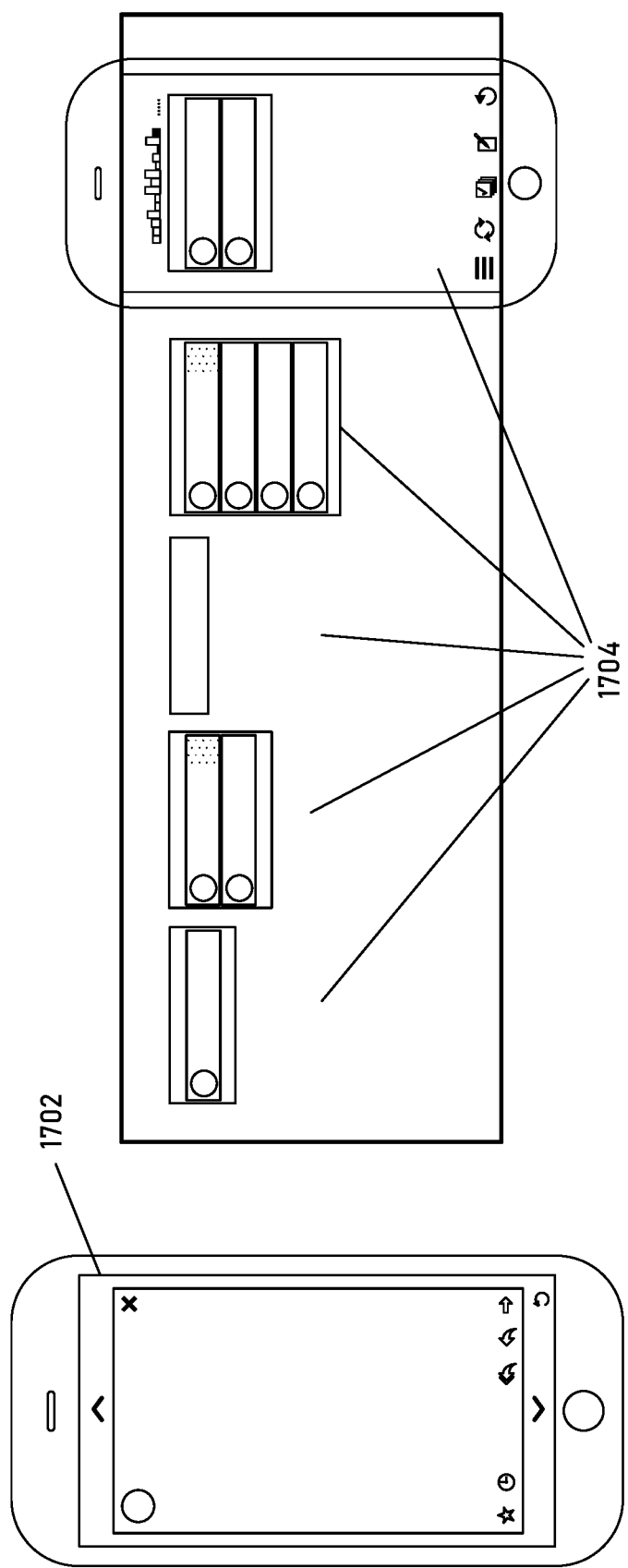
FIGS. 17A-17B show a view of emails from a sender feature and a view of attachments from a sender feature, respectively, according to one embodiment.
Figure 17B:
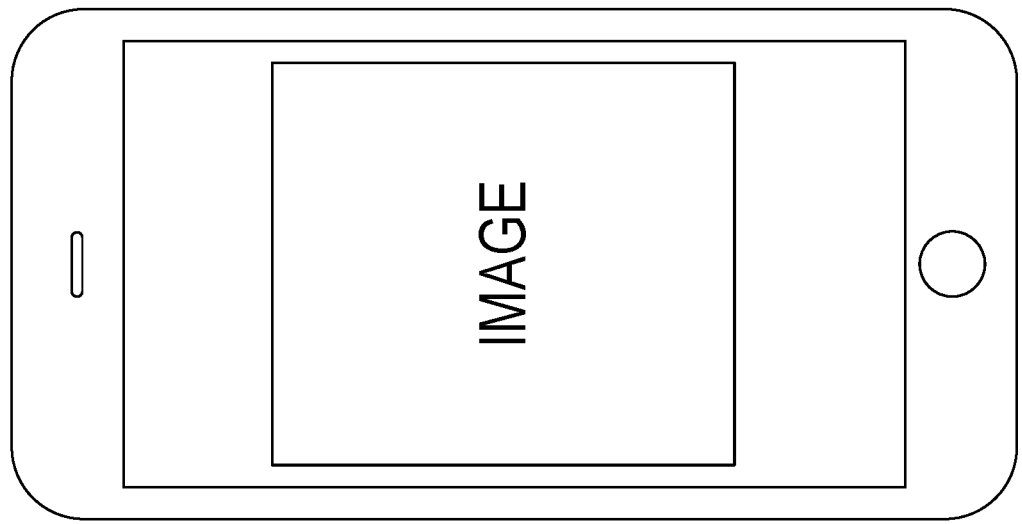
Figure 17B:
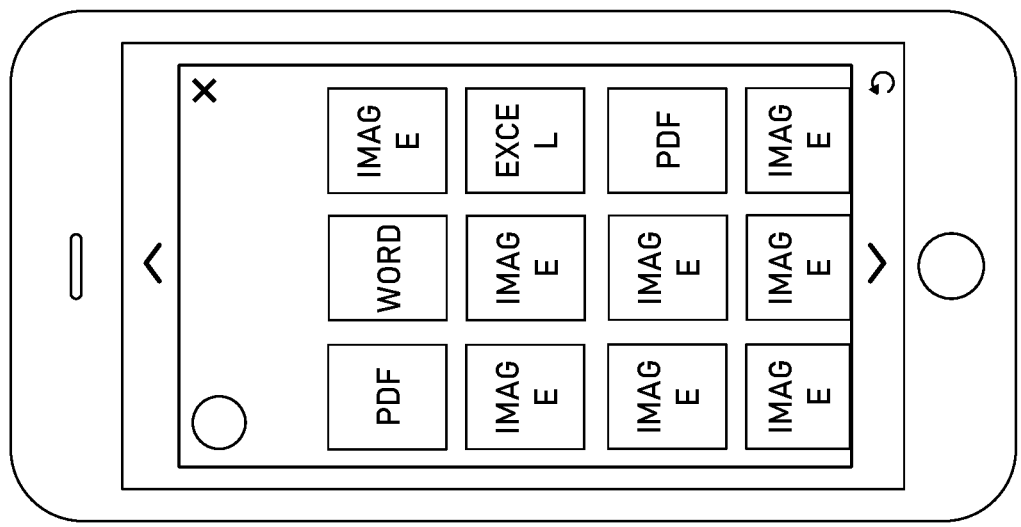
Figure 17B:
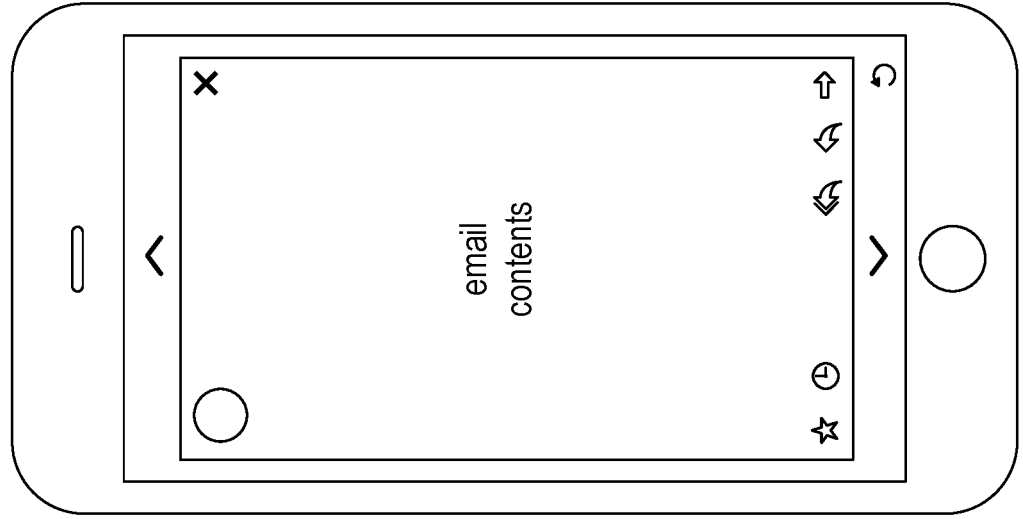

FIGS. 17A-17B show a view emails from a sender feature and a view attachments from a sender feature, respectively, according to an embodiment. In an embodiment, the view emails from the sender feature may be provided if a user selects a particular sender. The system may allow the user to see the emails on a timeline interface with each column representing a specific time period or may allow the user to see them in single vertical chronological list. For example, if a user selects a favorite user, emails sent from the favorite user may be provided in the horizontal timeline. In another example, if a user selects a sender of an email (e.g., the sender "Erik Lucas" visible in screen 1702), the system may generate and provide a horizontal timeline of emails from the sender (e.g., the horizontal timeline 1704).

In an embodiment, the view attachments from the sender feature may be provided if a user selects a particular sender. The system may allow the user to browse, reorganize, and filter by attachment type if desired. For example, if a user selects a favorite user, attachments included in emails sent from the favorite user may be provided in the horizontal timeline. In another example, if a user selects a sender of an email the user is viewing, the system may generate and provide a attachments included in emails from the sender. The user may have the ability to select with either gestures or touch screen interactions which attachments they would like to view in full format and then have that file displayed. Users may be able to edit a document and reply with an edited or version and also may forward or send the email to another contact or contacts. Examples of some files types which a user will see from contacts with the all attachments from sender feature are MS Word documents, PDFs, MS Excel files, Video Files with screencap preview, Text files, Html files, Images, Icons, MS Powerpoint, etc.

Figure 18:
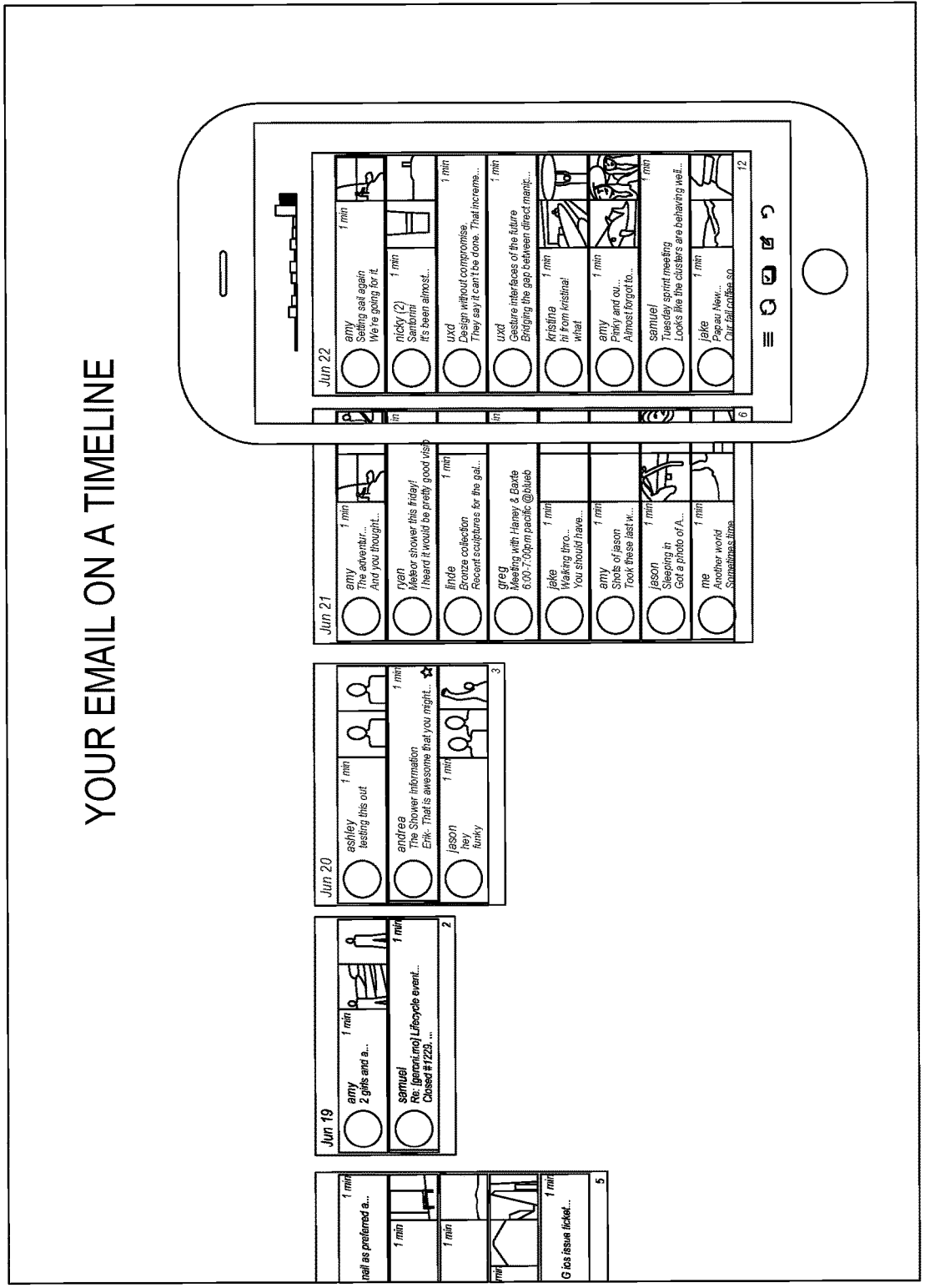
FIG. 18 is an illustration of a horizontal timeline, according to one embodiment.

FIG. 18 is an illustration of the horizontal timeline interface, according to one embodiment. The horizontal timeline interface is an example of a horizontal timeline interface as described with reference to FIGS. 2A-2D.

Figure 19:
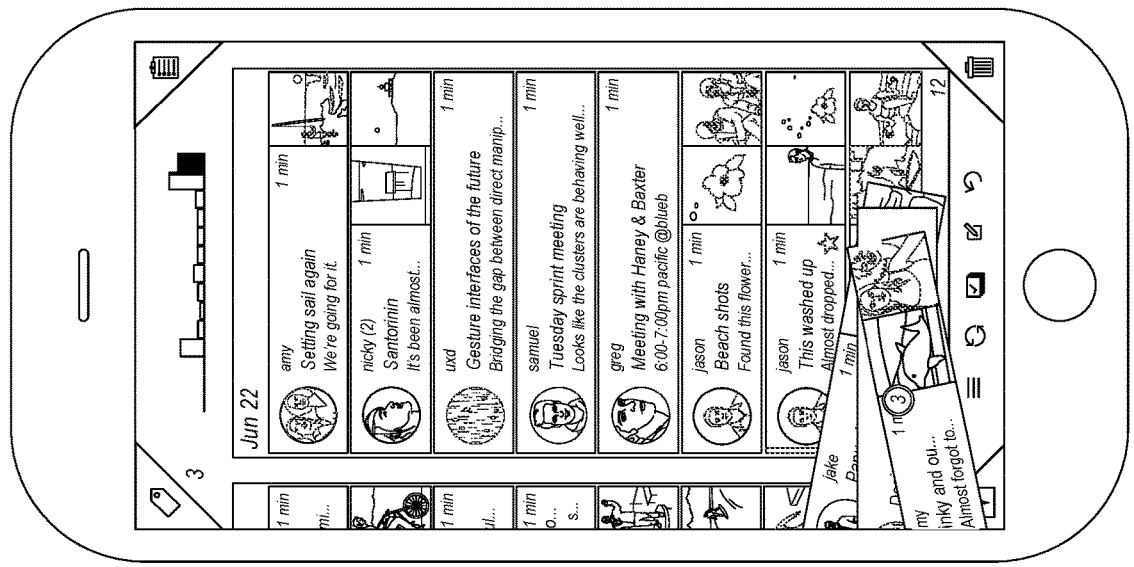
FIG. 19 is an illustration of sorting a plurality of email messages into one or more triage corners, according to one embodiment.
Figure 19:
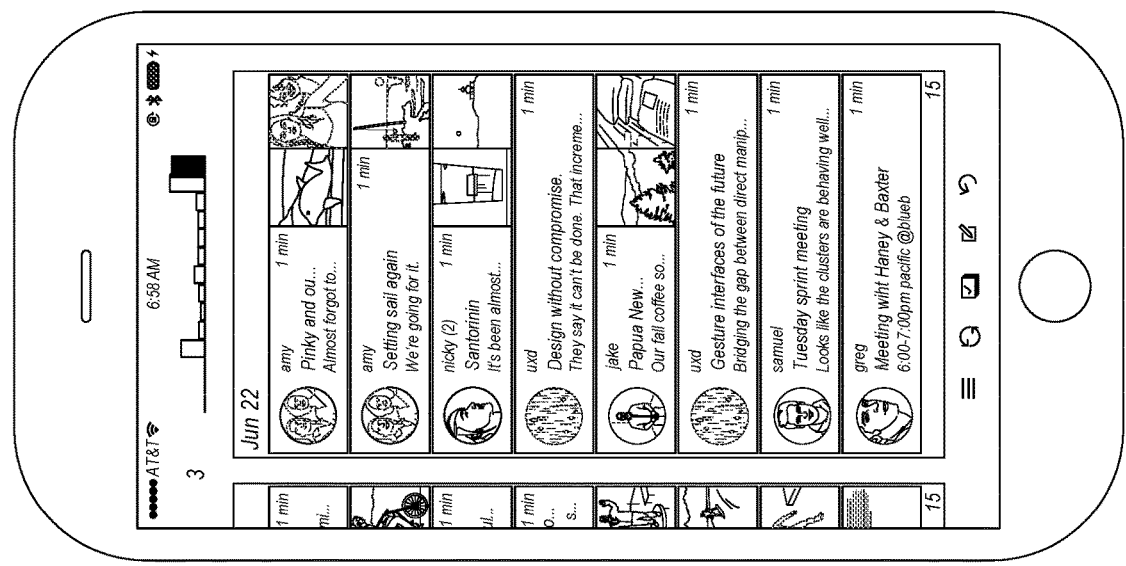

FIG. 19 is an illustration of sorting a plurality of email tiles into any of four triage corners, according to one embodiment. Although four triage corners are illustrated, embodiments include having no triage corners, having one triage corner, and having more than one triage corner. The triage corners may function, for example, as described with reference to FIGS. 3A-3E.

Figure 20:
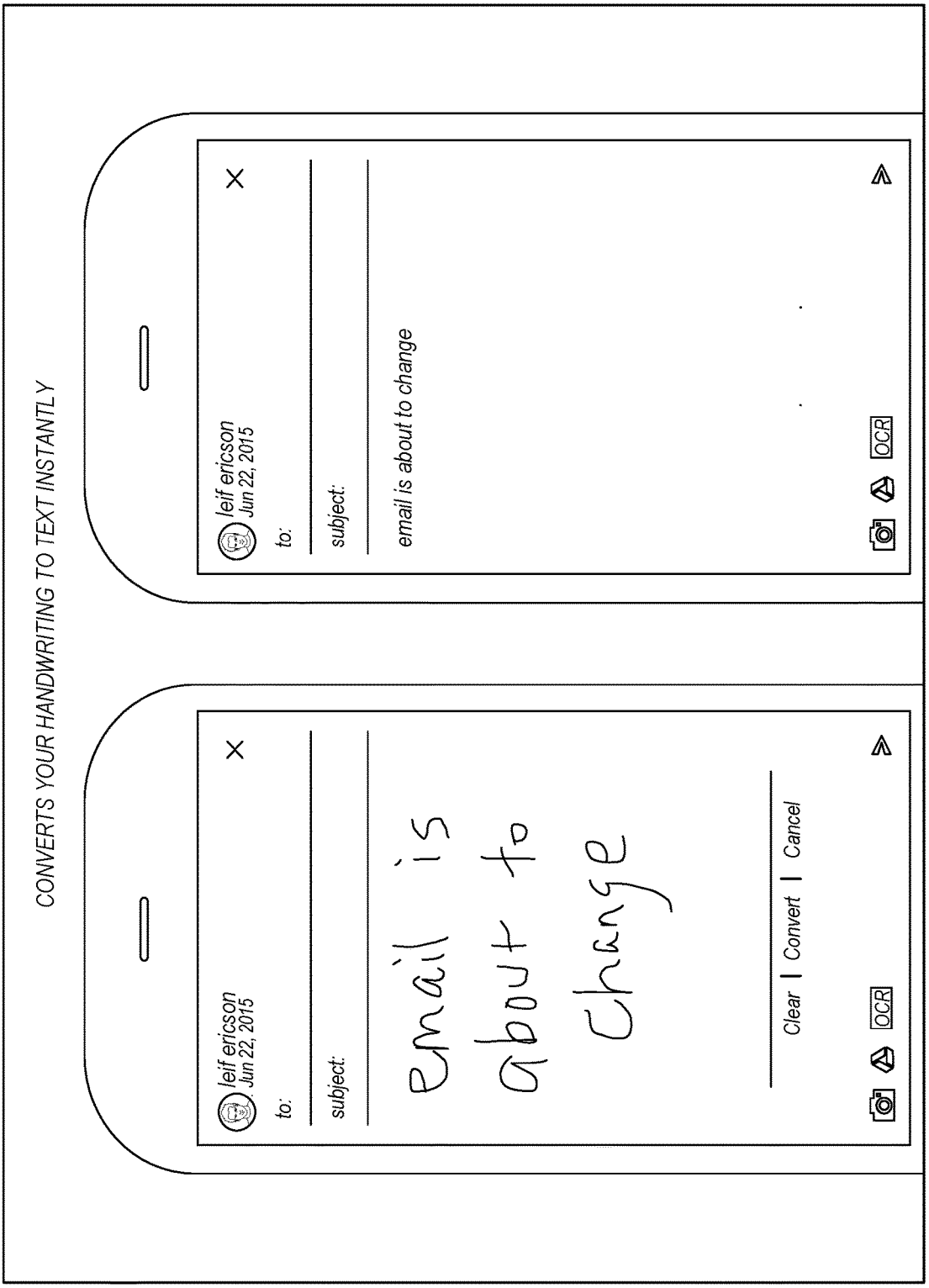
FIG. 20 is an illustration of the optical character recognition, according to one embodiment.

FIG. 20 is an illustration of the optical character recognition, according to one embodiment. The system receives a handwritten text input, such as alphanumeric characters, from the user. According to one embodiment, the user may input the text with a finger. The system may convert the hand writing into a typed message. In an embodiment, the system may analyze the handwritten message by identifying segments of inputs and determine a correlation between the identified segments and alphanumeric characters. An input segment may be, for example, a portion of an input physically separated from other portions of an input (e.g., a space exists between the portion and other portions), a portion of an input temporally separated from other portions of an input (e.g., the portion is input in a first time period and other portions are input in a second time period), or a combination thereof. Identified input segments may be analyzed by utilizing, for example, a matching algorithm to determine a correspondence between, for example, a first input segment and a first alphanumeric character (e.g., the letter "e"). An alphanumeric character having a greatest determined correlation may be included in an email as text.

Figure 21:
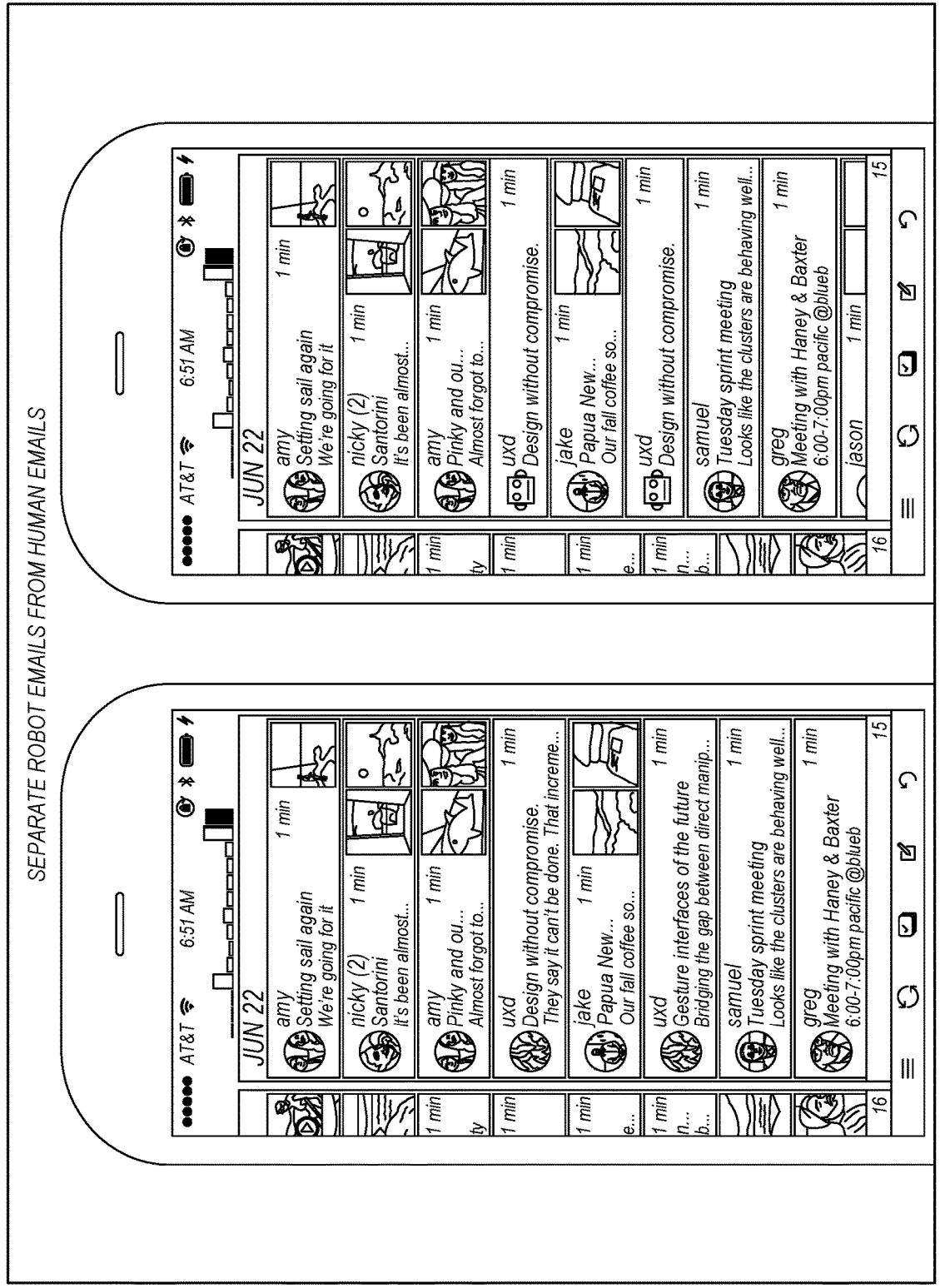
FIG. 21 is an illustration of displaying emails with different visual representations for emails received from senders determined by heuristics to have been sent by human senders and emails determined to have been automatically generated, according to one embodiment.

FIG. 21 is an illustration of displaying emails based on priority, according to one embodiment. According to one embodiment, the system prioritizes email based on a sender type, such as whether the sender is associated with a person or a robot. The system may automatically detect whether the sender is a person, or whether the message is automatically generated. The system may associate a distinctive image with the messages that are automatically generated. According to one embodiment, the image representing a robot head may be included in emails associated with emails being automatically generated. The user may identify which email messages are automatically generated based on a provided image (e.g., the robot head), and therefore identify the email as lower priority. According to another embodiment, the system may automatically display the lower priority messages at the bottom of the list of daily emails, or the system may omit the lower priority messages from the list of daily emails. In addition, the system may exclude the number of lower priority messages from the histogram count.

Figure 22:
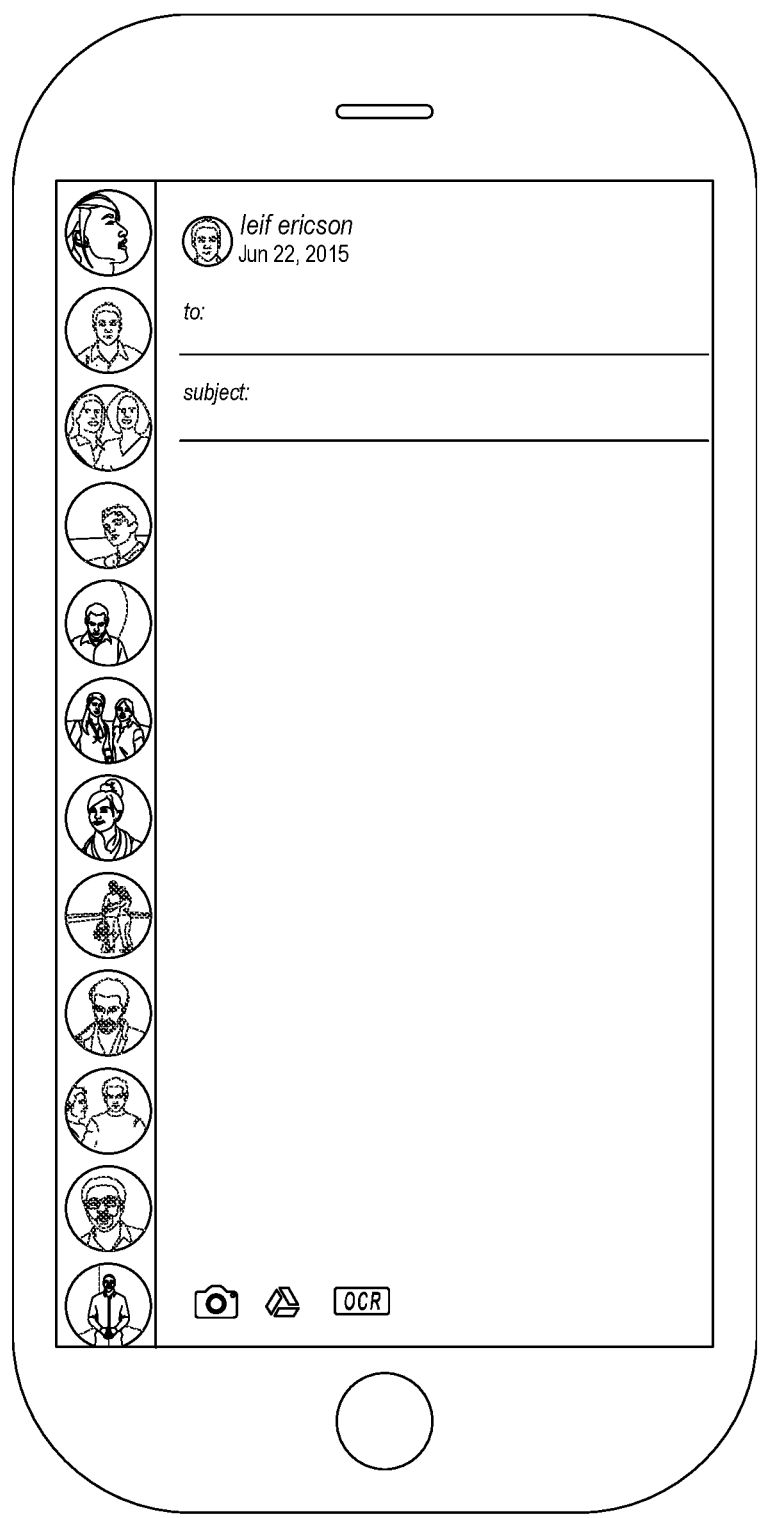
FIG. 22 is an illustration of displaying favorite email contacts, according to one embodiment.

FIG. 22 is an illustration of displaying favorite email contacts, according to one embodiment. If a user is composing an email and before the user enters the email address associated with a recipient, the system displays a list of images associated with the user's frequent email contacts. The system may receive a gesture-based input from the user selecting an image associated with a user's frequent contact. The gesture-based input may be, for example, pressing and dragging the selected image to the email field associated with the recipient address. In another example, if a pointer focus is within a to/cc/bcc field, the gesture-based input may be touching an icon photo of a favorite email contact causing the system to insert an email address associated with the favorite email contact into the to/cc/bcc field. Once the system receives the gesture-based inputs from the user, the system assigns the recipient email address to be the email associated with the selected image.

Figure 23:
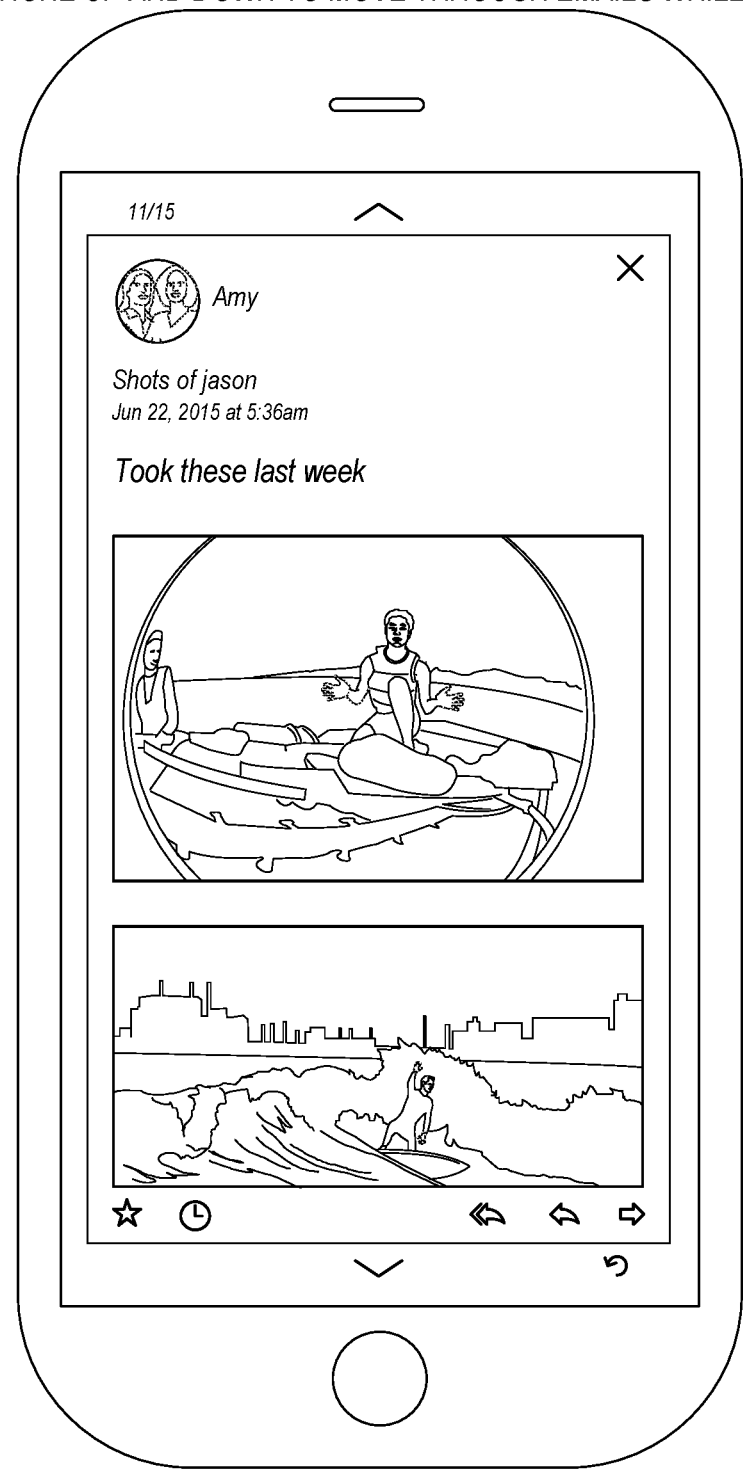
FIG. 23 is an illustration of a motion-based gesture, such as tilting, for browsing through emails, according to one embodiment.

FIG. 23 is an illustration of a motion-based gesture, such as tilting, for browsing through emails, according to one embodiment. The system receives a gesture-based input from the user, and based on that input scroll forward or backward through the list of emails. For example, the gesture may be tilting the device forward to scroll forward; or tilting the device backward to scroll backward through the list of emails.

Figure 24:
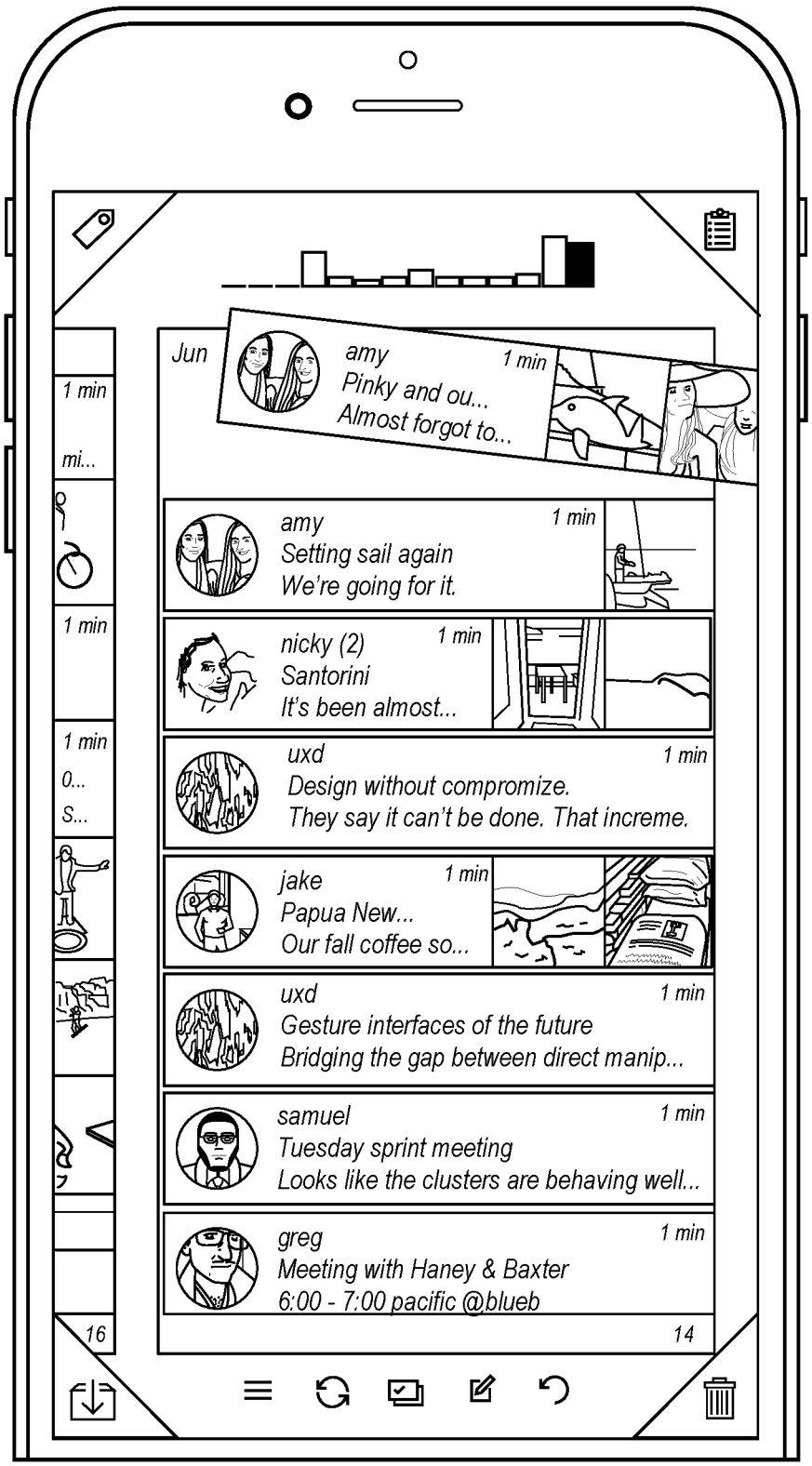
FIGS. 24-25 are an illustrations of a gesture for organizing emails, according to one embodiment.
Figure 25:
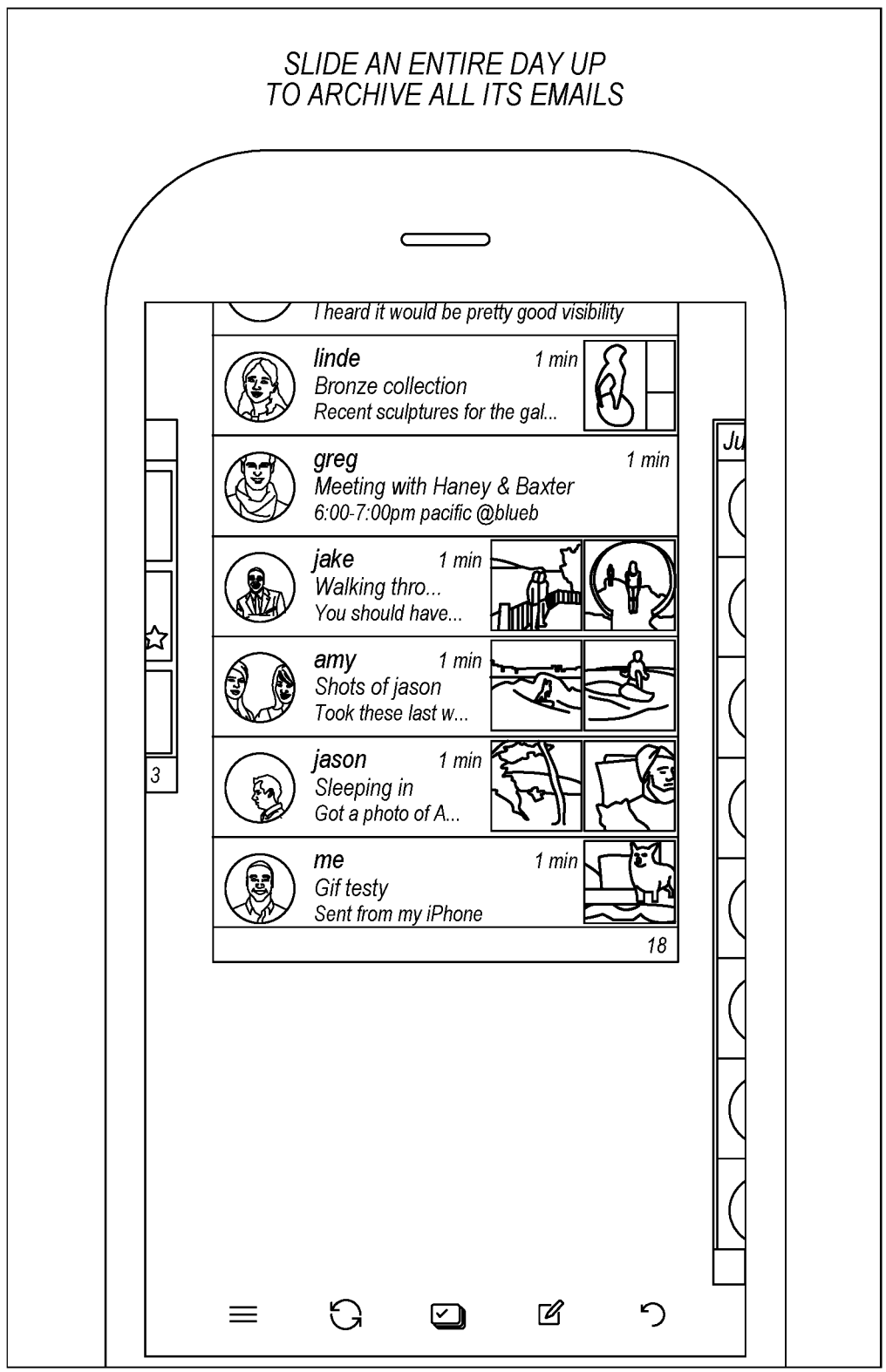

FIGS. 24-25 are an illustration of a gesture for organizing emails, according to one embodiment. The system receives an email selection from the user, such as if the user presses on an email message. The system receives a gesture-based input from the user, placing the email into one of the screen corners associated with the device. The gesture may include the user dragging the selected email to one of the screen corners, or the user tilting the device towards one of the screen corners. Once the system receives the input, the system performs the function associated with the icon displayed in the selected screen corner. The function performed may include, for example, deleting an email, including the email in a folder, favoriting the email, labeling the email, archiving the email, adding the email to a to-do list, marking the email as read, replying to the email, forwarding the email, saving an attachment in the email, or other email actions.

According to another embodiment, the gesture-based input from the user for organizing emails may include sliding the entire daily email list up on the device screen, in order to archive the entire daily email list.

Figure 26:
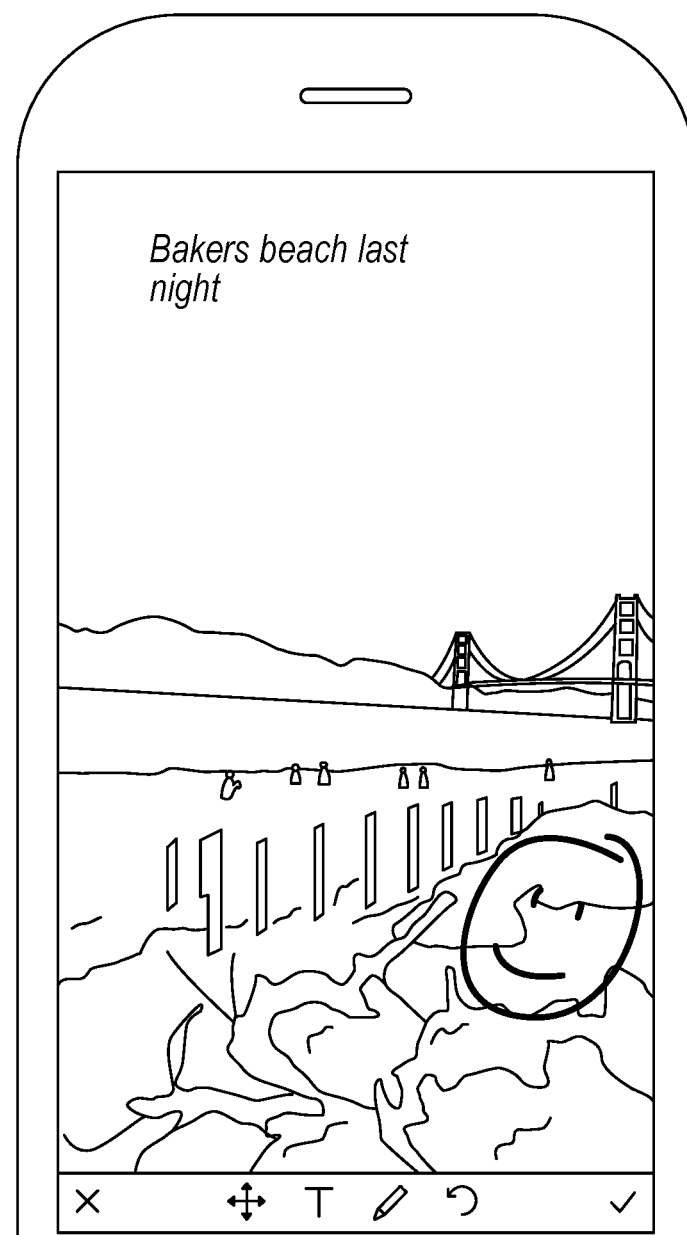
FIG. 26 is an illustration of adding text or notes to an image, according to one embodiment.

FIG. 26 is an illustration of adding text or notes to an image and/or document, according to one embodiment. The system receives a typed input, or a hand written input (such as a writing, or a scribble) from the user. The system also receives a selection of an image from the user. The system associates the image and the typed or handwritten input, and displays the image overlaid with the user notes. The system stores the overlaid image or annotated document.

Figure 27:
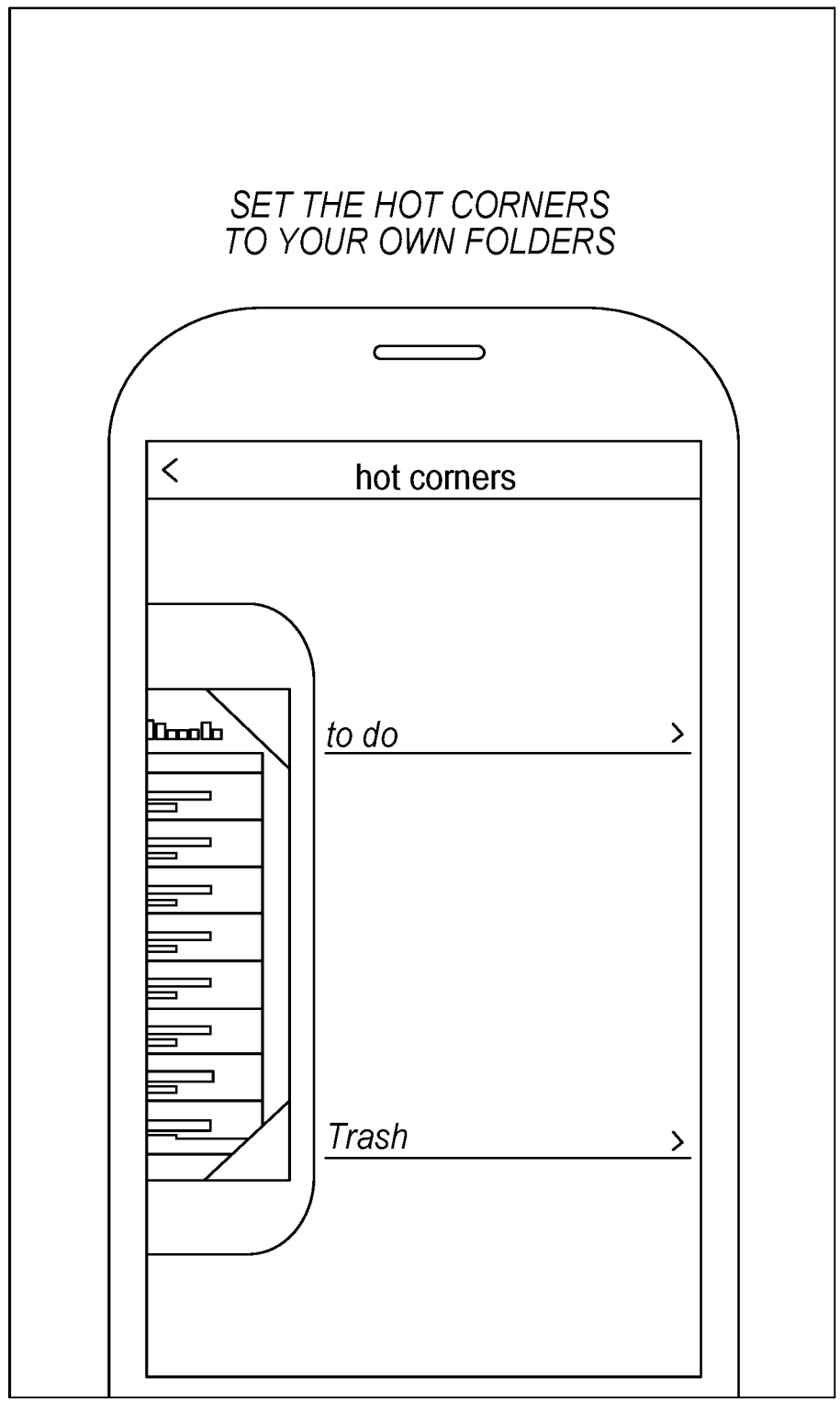
FIG. 27 is an illustration of customizing the hot corners, according to one embodiment.

FIG. 27 is an illustration of customizing the hot corners, according to one embodiment. The system receives an input from the user associating a particular folder, or a particular action with a screen corner. The particular folder may be an email folder, or a folder associated with the device. The particular action may be reply to an email, reply all to an email, forward an email, save all attachments associated with an email, or other email actions.

Figure 28:
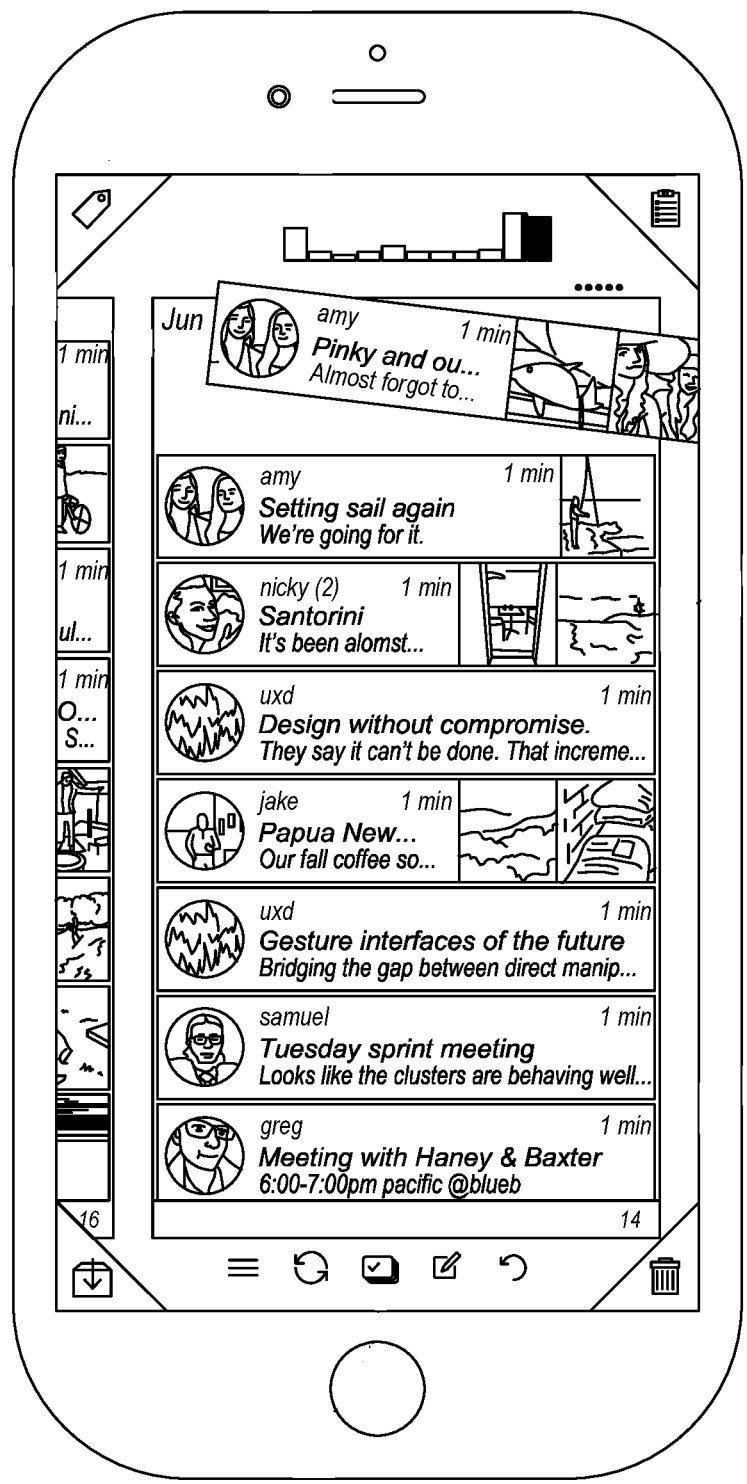
FIG. 28 is an illustration of the system main user interface, according to one embodiment.

FIG. 28 is an illustration of the system main user interface, according to one embodiment. The system displays attachment previews in the daily email list. If the user selects an attachment preview, the system displays the attachment without opening the email.

Figure 29:
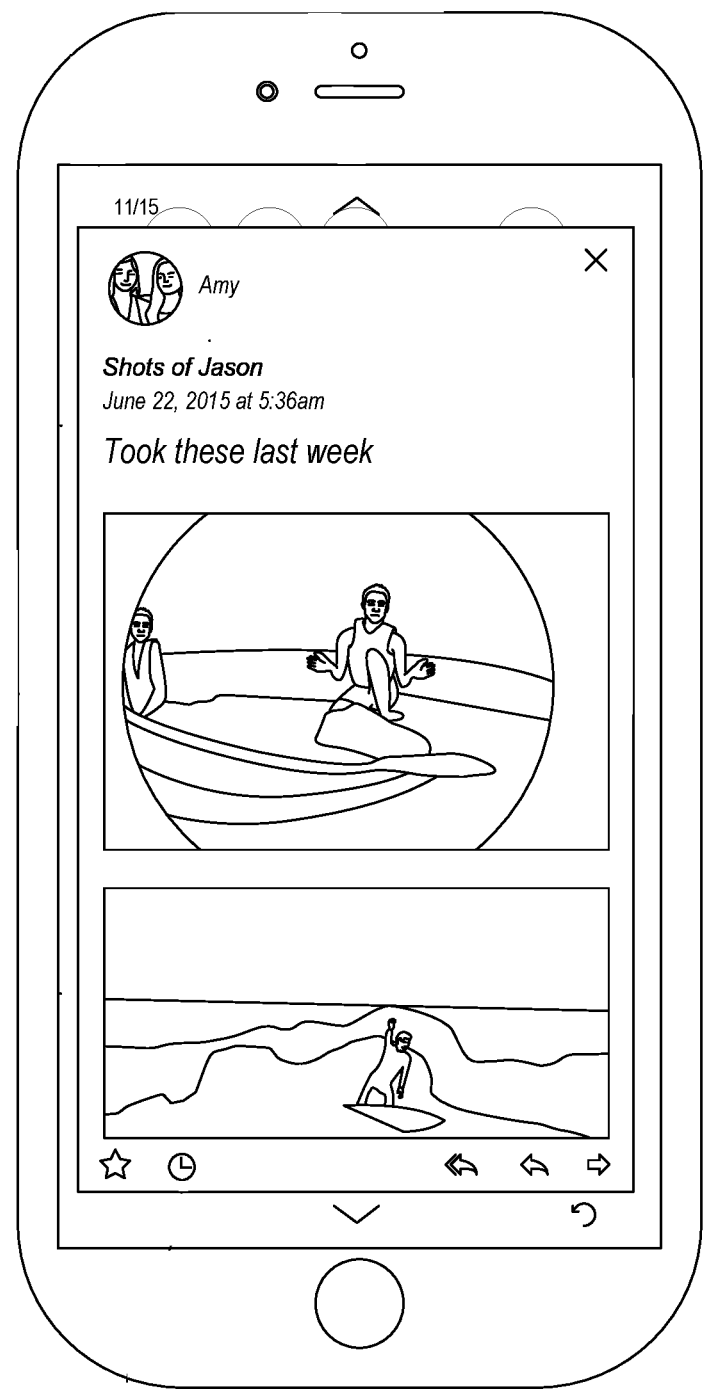
FIG. 29 is an illustration of the system user interface for reading an email, according to one embodiment.

FIG. 29 is an illustration of the system user interface for reading an email, according to one embodiment. If the system is displaying an email for reading, the system displays the email position in the daily email list on the screen, such as 11/15, meaning the displayed email is the 11th email out of 15 emails received on that time period. The system displays attachments so that the attachments fit on the device screen. The system receives gesture-based inputs from the user to organize email. For example, if the system receives a left wrist flick gesture, the system archives the email. If the system receives input comprising the user grabbing an email by the subject and dragging it to one of the screen corners, the system performs the function associated with the selected screen corner.

Figure 30:
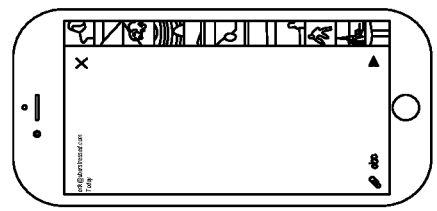
FIG. 30 is an illustration of the system user interface for composing an email, according to one embodiment.
Figure 30:
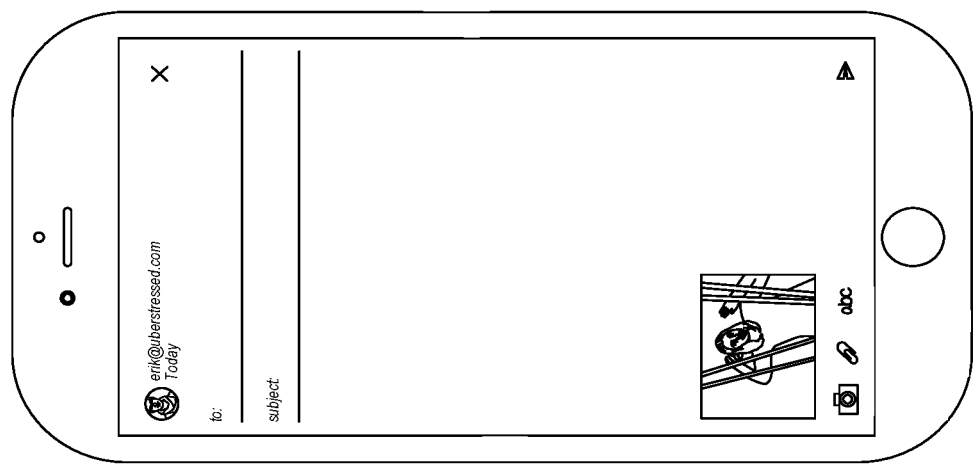
Figure 30:
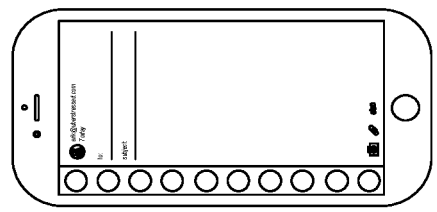

FIG. 30 is an illustration of the system user interface for composing an email, according to one embodiment. If the system is receiving an input from the user for composing an email, the system may receive gesture-based inputs from the user to display a VIP contact, or to display recent photos. The VIP contact may be a frequent contact or a contact that the user places on the VIP contact list. For example, the system receives an input that the user has slid the screen from left to the right, the system displays a list of images associated with the user's frequent contacts. If the system receives an input that the user has slid the screen from right to the left, the system displays a list of recent photos. If the system is receiving an input from the user for composing an email, the system displays several icons with corresponding functions: an icon for attaching photos associated with the device, an icon for adding photos associated with a cloud service such as iCloud®, Dropbox®, Google Drive®, an icon for quick handwriting conversion, etc. The system may receive a gesture-based input to allow the user to annotate an email photo attachment. For example, if the system receives an input from the user consisting of tapping a photo attachment, the system displays the photo attachment, and allows the user to annotate it.

Figure 31:
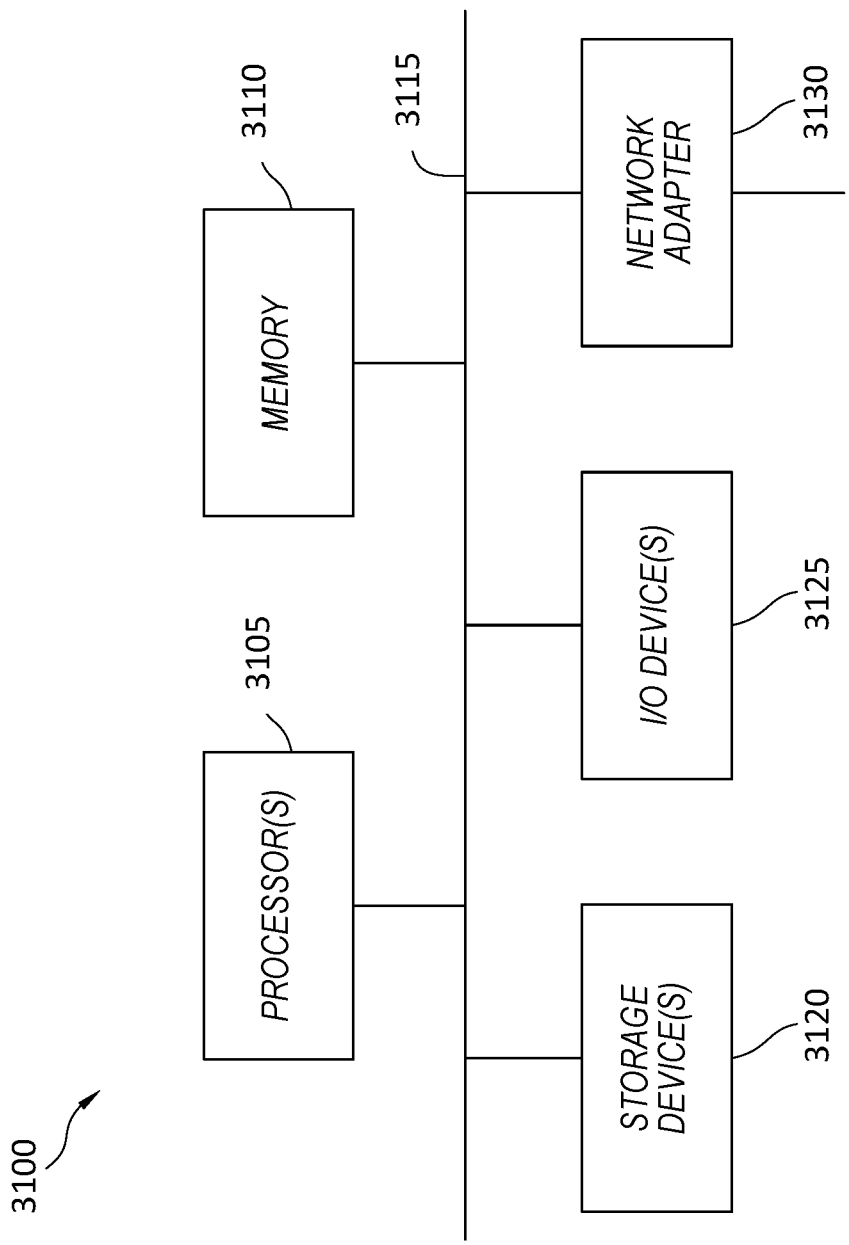
FIG. 31 is a block diagram of a computer system as may be used to implement certain features of some of the embodiments.

FIG. 31 is a block diagram of a computer system as may be used to implement certain features of some of the embodiments. The computer system may be any user device such as a mobile device, a tablet PC, a personal digital assistant (PDA), a cellular telephone, an iPhone, an iPad, a Blackberry, a processor, a telephone, a web appliance, a console, a hand-held console, a (hand-held) gaming device, a music player, any portable, mobile, hand-held device, wearable device (e.g., a watch), or a machine equipped with motion detection technology (e.g., a gyroscope, accelerometer, a plurality of motion sensors) and capable of executing a set of instructions (sequential or otherwise) that specify actions to be taken by that machine. In an embodiment, the computer system may be a virtual reality adaption of the system described herein. For example, a user's motions may be detected and correlated with a virtual representation of the interface described herein provided to a user.

The computing system 3100 may include one or more central processing units ("processors") 3105, memory 3110, input/output devices 3125 (e.g., keyboard and pointing devices, touch devices, display devices), storage devices 3120 (e.g., disk drives), and network adapters 3130 (e.g., network interfaces) that are connected to an interconnect 3115. The interconnect 3115 is illustrated as an abstraction that represents any one or more separate physical buses, point to point connections, or both connected by appropriate bridges, adapters, or controllers. The interconnect 3115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 3194 bus, also called "Firewire".

The memory 3110 and storage devices 3120 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media may include computer-readable storage media (e.g., "non-transitory, media) and computer-readable transmission media.

The instructions stored in memory 3110 may be implemented as software and/or firmware to program the processor(s) 3105 to carry out actions described above. In some embodiments, such software or firmware may be initially provided to the processing system 3100 by downloading it from a remote system through the computing system 3100 (e.g., via network adapter 3130).

The various embodiments introduced herein may be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Figure 32:
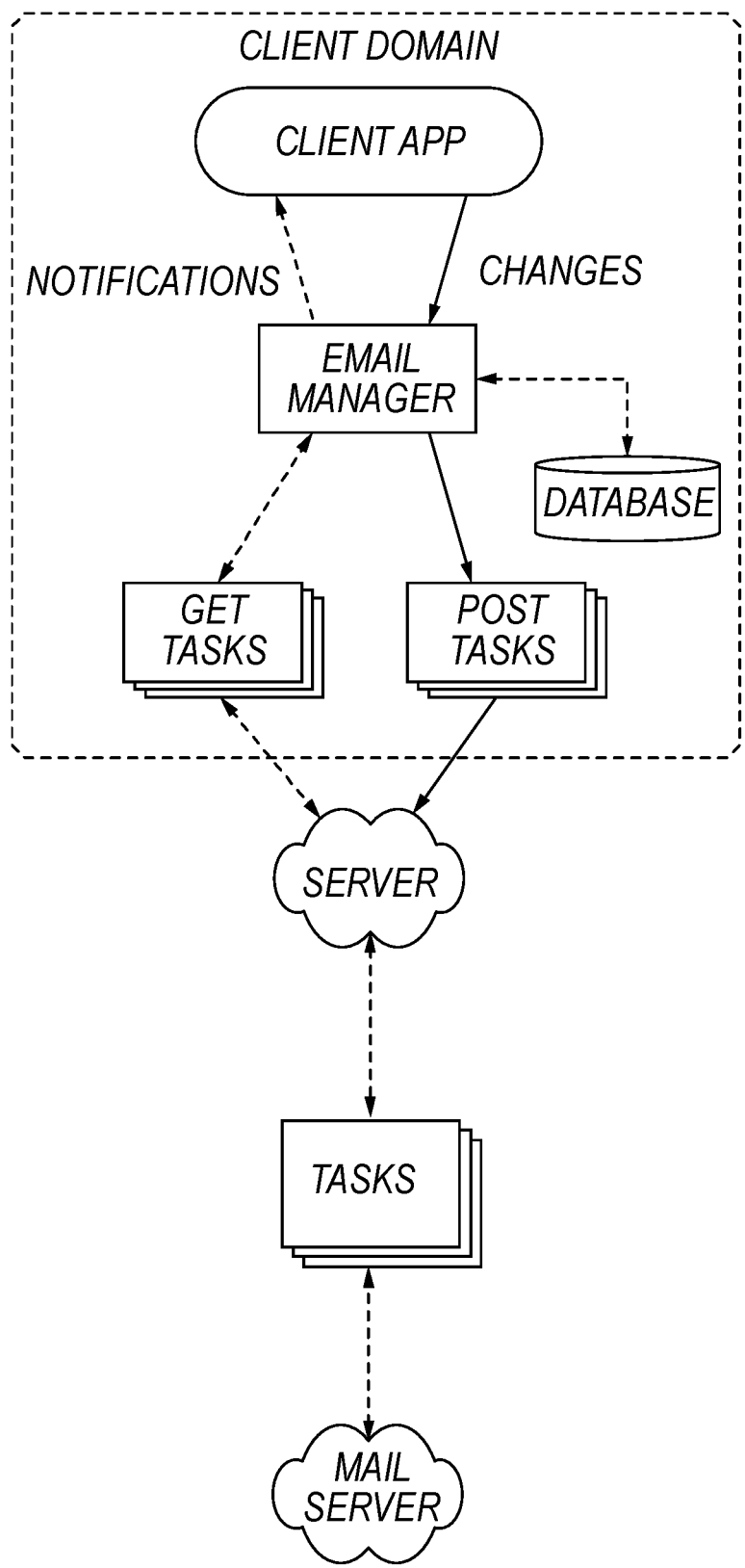
FIG. 32 is a block diagram illustrating an abstracted architecture of the system, according to one embodiment.

FIG. 32 is a block diagram illustrating an abstracted architecture of the system, according to an embodiment. In an embodiment, the system may include a remote server for facilitating communication between a client domain and an email server (e.g., mail server). The client domain may be configured to execute one or more processes via a local processor (e.g., the one or more processors 3105 of FIG. 31). For example, the client application may receive notifications from an email manager and provide changes to the email manager. The email manager may store data associated with one or more emails in a local database. The email manager may receive tasks ("GET Tasks") from a remote server and transmit tasks ("POST Tasks") to the remote server. The remote server may communicate with a mail server by, for example, receiving and/or transmitting tasks to the mail server.

Figure 33:
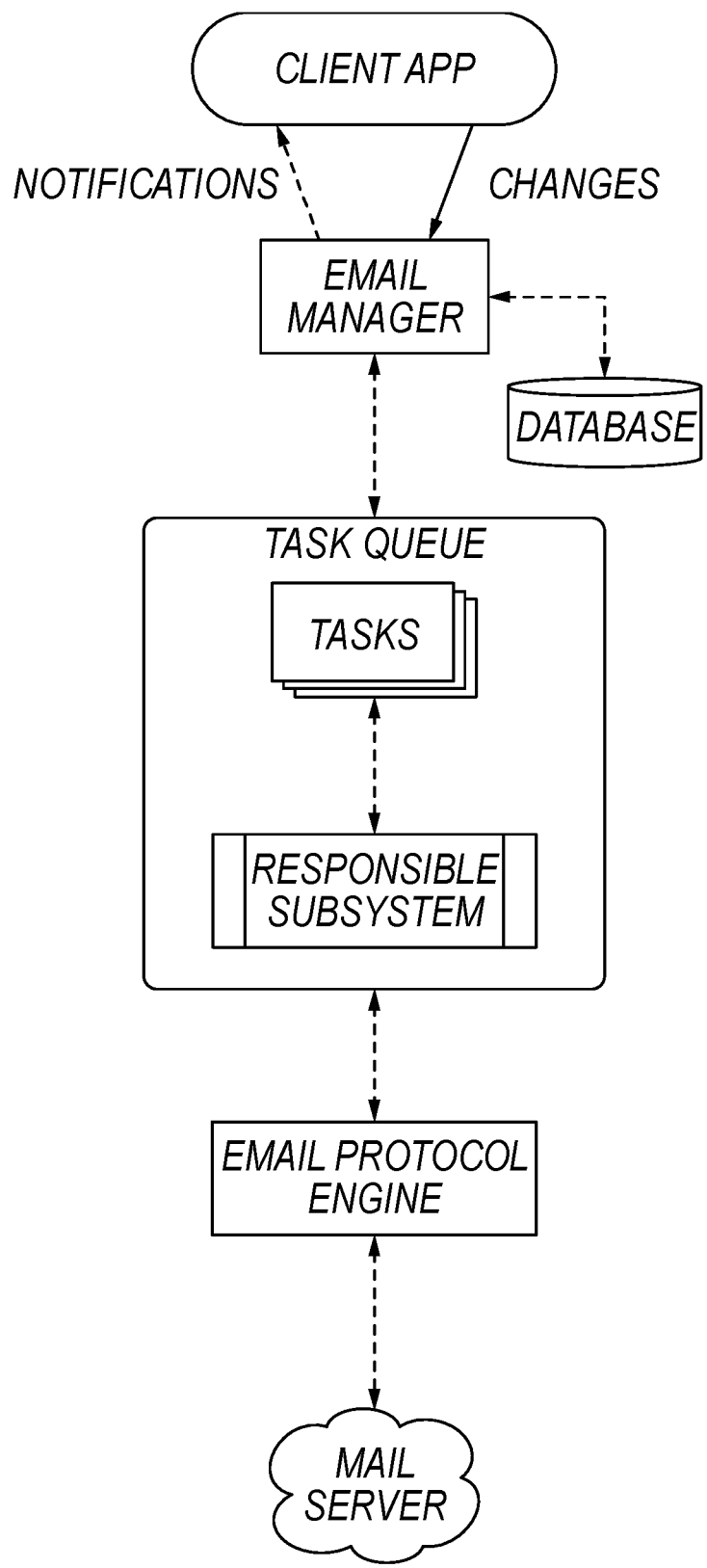
FIG. 33 is a block diagram illustrating an abstracted architecture of the system, according to one embodiment.

FIG. 33 is a block diagram illustrating an abstracted architecture of the system, according to an embodiment. In an embodiment, the system may include a client domain configured to communicate directly with an email server (e.g., mail server). The client domain may be configured to execute one or more processes via a local processor (e.g., the one or more processors 3105 of FIG. 31). For example, the local processor may execute instructions to perform a method for managing a task queue, as described below with reference to FIG. 27. In another example, the client application may receive notifications from an email manager and provide changes to the email manager. The email manager may store data associated with one or more emails in a local database. The email manager may receive and/or transmit tasks (e.g., tasks having valid authorization) in a tasks queue via an email protocol engine to a mail server.

Figure 34:
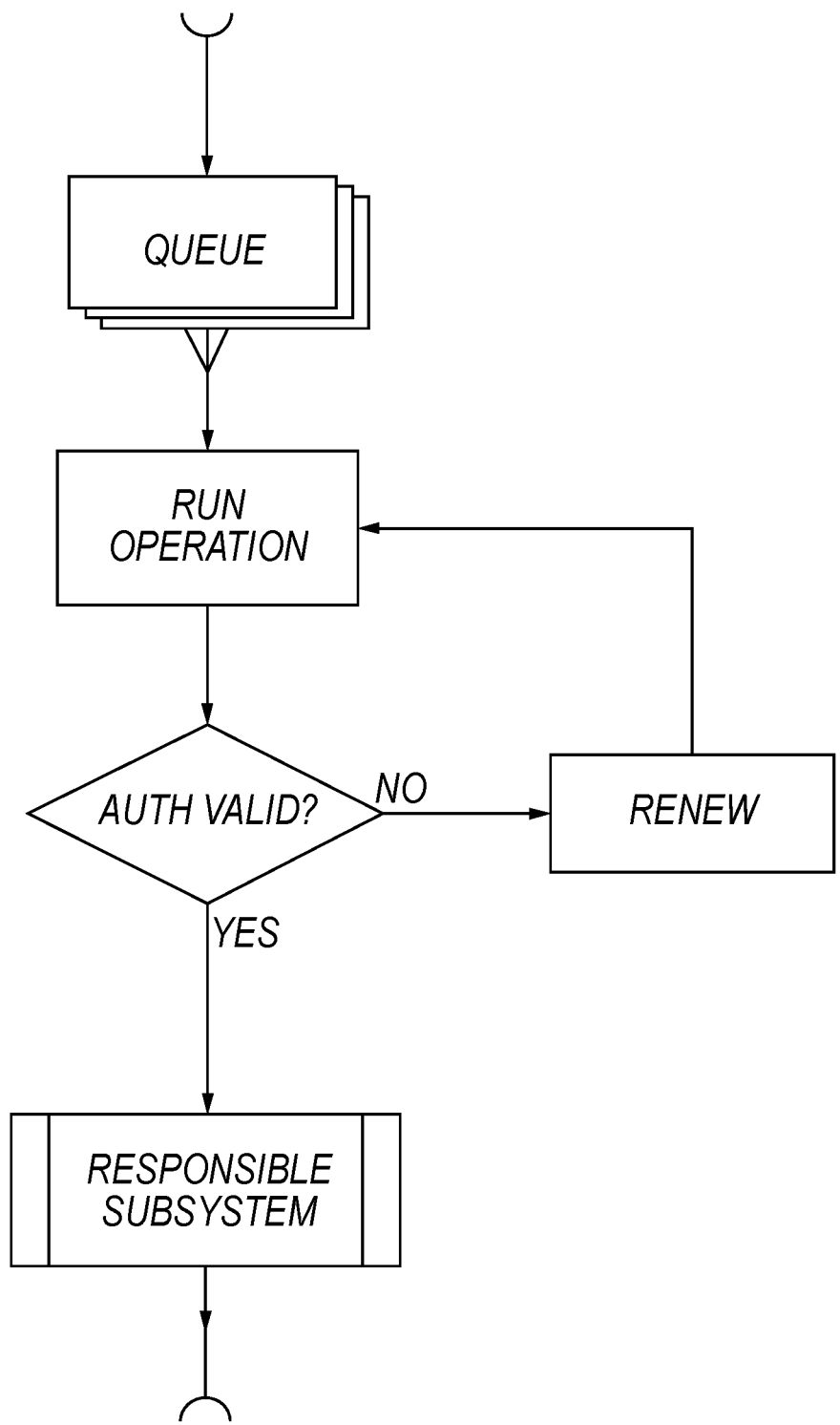
FIG. 34 is a block diagram illustrating a method for managing a task queue, according to an embodiment.

FIG. 34 is a block diagram illustrating a method for managing a task queue, according to an embodiment. One or more tasks may be received from the email manager and maintained in a queue. A local processor (e.g., the one or more processors 3105 of FIG. 31) may run an operation (e.g., by executing instructions stored in a local database) and determine if valid authorization to perform the task is the queue exists. If valid authorization exists, a responsible subsystem may be identified to perform and/or manage the task. For example, a responsible subsystem (e.g., a communication device) may be identified to transmit a message via the email protocol engine to the mail server.

Immersive Message Management

The disclosed technology includes embodiments in mixed reality, which merges real and virtual works to produce environments and visualizations where physical and digital objects coexist and interact in real-time. As described herein, "mixed reality" can take place in the physical world and/or virtual world, such as a hybrid of augmented reality (AR) and virtual reality (VR). In particular, AR is an interactive experience of the real-world environment where objects that reside in the real world are enhanced by computer-generated perceptual information, sometimes across multiple sensory modalities, including visual, auditory, haptic, somatosensory, or olfactory. AR can be defined as a system that incorporates three basic features: a combination of real and virtual worlds, real-time interaction, and accurate 3D registration of virtual and real objects. The overlaid sensory information can be constructive (e.g., additive to the natural environment), or destructive (e.g., masking the natural environment). This experience is seamlessly interwoven with the physical world such that the disclosed technology is perceived as an immersive aspect of the real environment. In this way, AR alters the user's ongoing perception of a real-world environment, whereas virtual reality completely replaces the user's real-world environment with a simulated one.

Embodiments include interfaces where a user can go back and forth between a small minimal interface on a handheld device (e.g., smartphone) with notifications and a fuller "open" version of a message application in a mixed reality interface. The user can organize, manage, and navigate messages within their 3D realm. Thus, for example, handheld devices can present a preliminary summary view of messages, which can be open or transformed to explore and manage messages in a mixed reality environment. That is, users can seamlessly navigate between messages on a handheld device and a mixed reality environment as opposed to being exclusively confined to the handheld device.

Capabilities can include motion-based gestures with the handheld device or independent of the handheld device. For example, a user can tap on a surface of the handheld device's screen, swipe across a surface of the screen, or accelerate a handheld device to navigate the representations displayed on the handheld device. In addition, the user can use a dedicated wand device or the handheld device as a wand to navigate the same messages in a mixed reality environment projected to the user wearing a head-mounted display device (e.g., smart glasses). The dedicated wand device can be independent and different from a mobile phone. In addition, a combination of wands for different hands or a wand and a smartphone can be used as sorting/selecting/organizing devices. As such, in an AR environment, a user is situated within the real world in a variety of contextual real-world environments such that the user's motion gesture may be discrete or more various compared to interactions on a handheld device with a screen-based focus period.

More specific examples of motion-based gestures include a tap on the surface of a screen, a swipe across a surface of the screen, an acceleration of the user device to navigate the messages on a display, an acceleration and change in orientation of the handheld device operating as a wand to navigate the same messages in relation to a projected AR/VR interface, a hand motion in relation to an AR/VR interface, a directional eye movement in relation to an AR/VR interface, a head movement in relation to an AR/VR interface, a physical space movement like walking in relation to an AR/VR interface, or other movements of the physical body in relation to the surface of a screen or a projected AR/VR interface. In other words, interfacing in a mixed reality environment can include essentially any movement of a physical body or even subtle eye interactions being that there is a larger 3D space and also a variety of contexts where users can scale their gestures up or down as appropriate. The disclosed technology encompasses but is not limited to detecting eye movement for directing the placement of tiles on an interface, for changing the orientation of an interface between AR/VR, and for changing between expanded and contracted views of information related to that tile.

Figure 35:
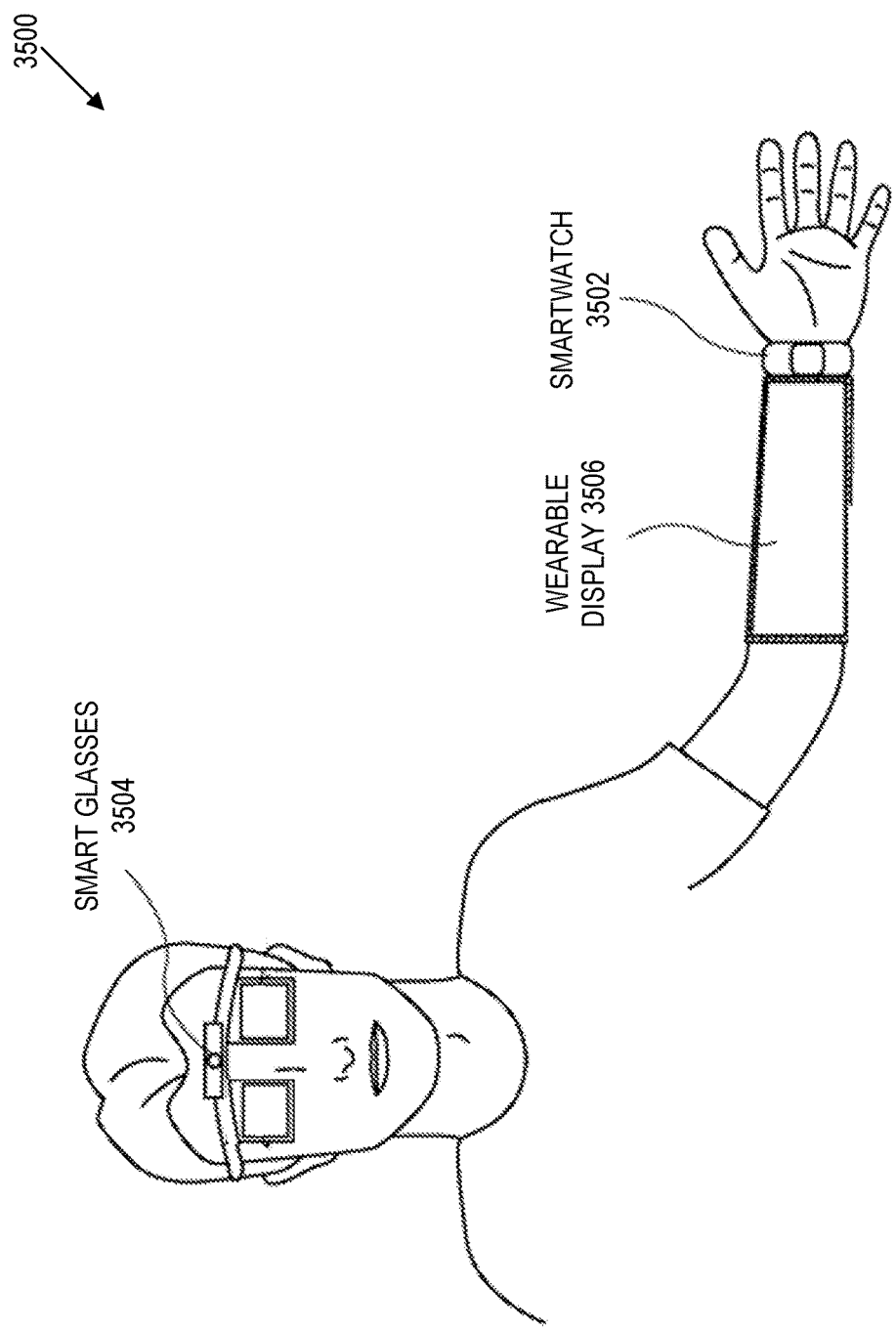
FIG. 35 illustrates a system including wearables configured to visualize message management in a mixed reality environment, according to one embodiment.

The disclosed technology can include portable electronic devices other than handheld devices. For example, FIG. 35 illustrates a system 3500 including wearables configured to visualize message management in a mixed reality environment. The wearables can provide various advantages over handheld devices. For example, wearables can sense accelerations or other movements of a user to navigate messages without being confined to a fixed area on a small screen display device. As shown, the wearables can be component parts that operate collectively or independently to interact a message interface. The component parts include different wearable devices, which are smart electronic devices (e.g., include micro-controllers) that are worn close to and/or on the surface of the skin, where they detect, analyze, and transmit information concerning, for example, accelerations and/or ambient data, and which can allow feedback to the wearer. The wearables can be used to collect data of user motions or movements. Wearable devices such as activity trackers are an example of Internet-of-Things (IoT) devices that include electronics, software, sensors, and/or connectivity that enable objects to exchange data over the internet with a manufacturer, operator, and/or other connected devices, without requiring human intervention.

In the illustrated example, the wearables include a smartwatch 3502, smart glasses 3504, and a wearable display device 3506 on a forearm. The smartwatch 3502 can provide a local touchscreen interface, while an associated mobile app on a smartphone (not shown) provides for management features. The smartwatch 3502 can include apps, a mobile operating system, and WiFi/Bluetooth connectivity. The smart glasses 3504 add information alongside of what the wearer sees. Alternatively, smart glasses 3504 can change their optical properties at runtime. Superimposing information onto a field to create a mixed reality view is achieved through an optical head-mounted display (HMD) or embedded wireless glasses with transparent heads-up display (HUD) or AR overlay. Hence, the smart glasses 3504 can be effectively wearable computers which can run self-contained mobile apps. Some are handsfree and can communicate with the Internet via natural language voice commands, while others use touch buttons.

In one example, the smart glasses 3504 are part of a headgear that can include a breathable mesh, elastic straps, and a band that can provide a comfortable apparatus for carrying, securing, or otherwise positioning around the head of the user. The headgear may also include fasteners for securing the headgear on the user. The fasteners may be influenced with Velcro, snaps, or other types of securing devices.

The wearable display device 3506 can function like a smartphone to combine a mobile telephone and computing functions into one unit. It is distinguished from other smart devices by its complex hardware capabilities and extensive mobile operating systems, which facilitate wider software, internet, and multimedia functionality, alongside core functions. The wearable device can contain a number of integrated circuit (IC) chips, including various sensors such as a magnetometer, proximity sensors, barometer, gyroscope, accelerometer and more, and support wireless communications protocols (e.g., Bluetooth, Wi-Fi, or satellite navigation).

In accordance with implementations, a wearable or other device can be secured to the person by using fasteners, such as straps, tape, elastic bands, Velcro, gauze, or the like. A system including wearables can include a controller and a battery charging device. For various security reasons, each component of the system 3500 may be manufactured so that a housing cannot be opened easily. To allow a person to continuously experience a mixed reality effect, one or more additional components are provided to allow the person to receive the effect while any of the wearables is inoperable.

In one example, each component of the system 3500 can include a signal generator to generate movement data and/or collect data about a physical motion of the user and/or the location of the person who is wearing the particular component. In one example, a signal generator includes an accelerometer and/or transmitter configured to generate and transmit data regarding movement to organize, manage, or navigate messages in a mixed reality environment.

The system and/or its component parts can communicate using encryption to, for example, thwart hacking. That is, the system can implement several types of encryption protocols to protect signal data. In one example, the system uses asymmetric encryption employing key pairs, a private key and public key. Symmetric encryption could also be used employing the same key for encryption and decryption but could potentially be less secure. Hashing can be used to confirm the integrity of the signal data. Hashing generates a fixed length value associated with a file including a recording of a signal.

Figure 36:
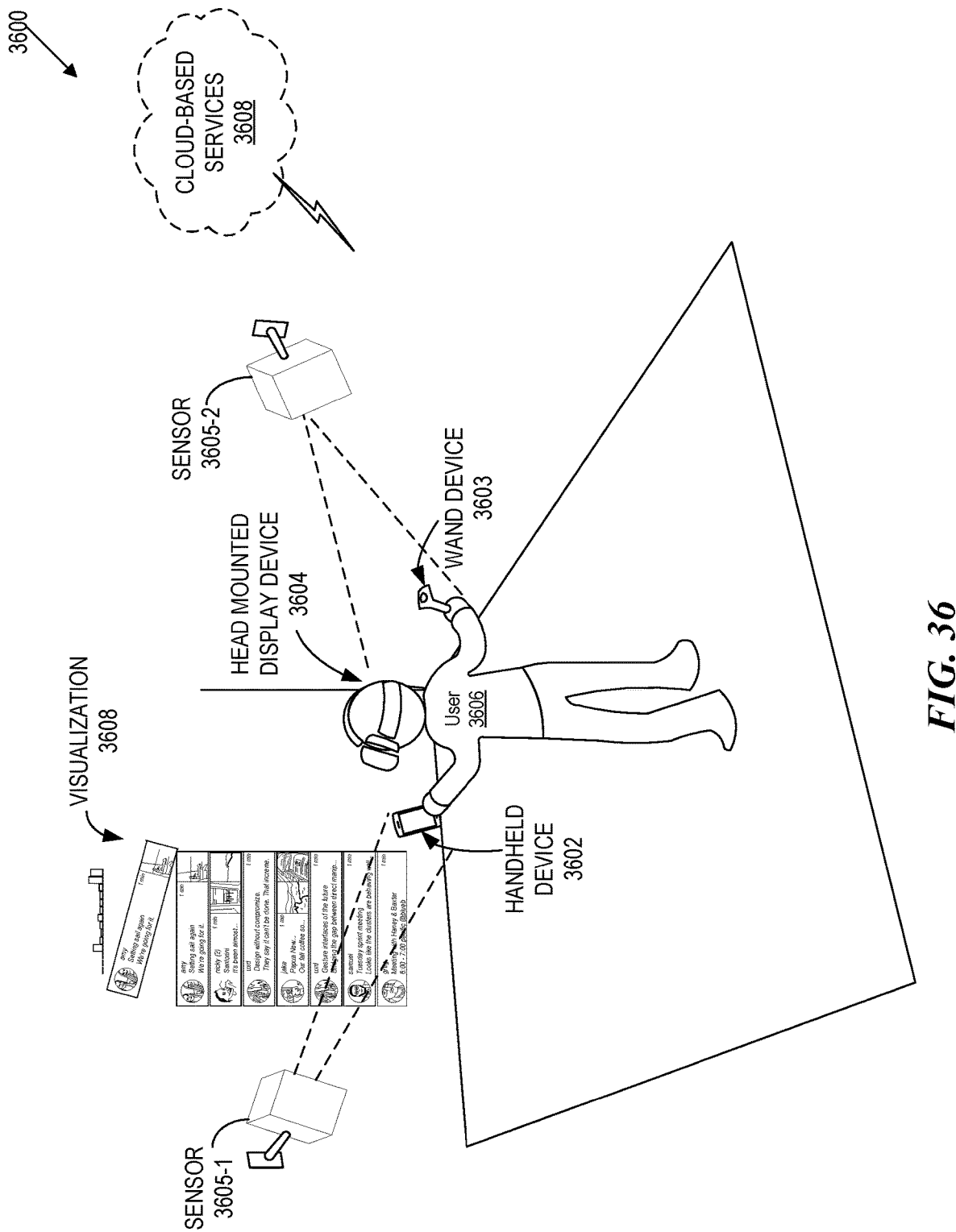
FIG. 36 illustrates a user engaged with a mixed reality system for immersive message management, according to one embodiment.

FIG. 36 illustrates a user engaged with a mixed reality system 3600 for immersive message management. The components of the system 3600 can include a handheld device 3602 that administers a session running on other components of the system 3600 including an HMD device 3604 (e.g., partial or full 360 degree horizontal interfaces). The system 3600 can also include motion or position sensors 3605-1 and 3605-2 that are stationary or worn by the user 3606 such as, for example, sensors of wearables. As illustrated, the handheld device 3602 operates as a wand to navigate objects of the visualization 3608 experienced by the user 3606 through the HMD device 3604. A dedicated wand device 3603 (e.g., with one or more dedicated hardware buttons) can additionally or alternatively be used for navigation. In another example, the sensors 3605-1 and 3605-2 can detect the position and/or movement of the user 3606's finger in the air to perform the functions including the examples illustrated in FIGS. 1-30, which could be rendered in a mixed reality session like on the handheld device 3602.

In some embodiments, some components of the system 3600 are remotely located from the user. For example, cloud components can provide cloud-based services 3610 to administer the mixed-reality session running on the components of the system 3600 or provide services or content for a mixed reality session. Hence, administration of a mixed reality session could be through the HMD device 3604, augmented with the handheld device 3602, and/or with the cloud system 3610 that receives session progress feedback (e.g., anywhere outside of room where the user is experiencing a simulation).

As shown, the HMD device 3604 can provide content (e.g., visualization 3608) of a mixed-reality session and process feedback from the user via the handheld device 3602 to navigate the visualization 3608. As shown, the HMD device 3604 is a near-to-eye display system that is worn by the user 3606. For example, the HMD device 3604 can have a chassis and various electrical and optical components to enable an immersive experience by the user 3606 wearing the HMD device 3604. For example, the HMD device 3604 can include a display for each of the user's eyes. The displays can render a real-world scene of a simulation for view by the user's eyes when the HMD device 3604 is worn by the user. The HMD device 3604 can also include a camera mounted to the chassis. The camera can capture movement of the user's pupils for physiological feedback responsive to simulated scenes being rendered. The HMD device 3604 may also include a network interface enabling the handheld device 3602 to communicatively couple to the HMD device 3604 over a wireless connection.

In some embodiments, the HMD device 3604 includes features for measuring the user's physiological activity. For example, the HMD device 3604 can include components to measure the user's electrical brain activity. As such, the HMD device 3604 can collect physiological data in combination with any direct input by the user. In some embodiments, the physiological data can be used to supplement the user's conscious inputs. In some embodiments, the physiological data could be used to compare against the user's conscious input.

In one example, the HMD device 3604 can render a virtual immersive environment by displaying images in view of the user's eyes such that the user can only see the images (e.g., visualization 3608) and see nothing of the real-world. The HMD device 3604 can also render an AR environment. As such, the user can see the visualization 3608 overlying on the real world while the HMD device 3604 is worn by the user 3606. Hence, to achieve an AR environment, the user in an augmented reality simulation has a transparent view with digital objects overlaid or superimposed on the user's real-world view.

Examples of the sensors 3605-1 and 3605-2 include cameras or motion detectors that are positioned proximate to the user such that the sensors 3605-1 and 3605-2 can obtain real-world feedback responsive to interactions with a simulated real-world scene. For example, cameras facing the user can detect the user 3606's movement while the user is engaged in a simulation and provide feedback to the HMD device 3604 administering the simulation. The handheld device 3602 can be used by the user 3606 to submit input, which can include actuating buttons for the user 3606 to input data and/or accelerometers that detect spatial movement. For example, the user 3606 can move the handheld device 3602 to provide inputs responsive to a scene administered by the HMD device 3604.

The visualization 3608 is one example of many that can be rendered in a mixed-reality session. FIGS. 1-30 show a variety of examples of visualizations that could likewise be rendered in a mixed reality session. The user 3606 can select and move objects of the visualization 3608 in a manner described with respect to FIGS. 1-30. In some examples, the system 100 can include a library of navigation programs. As described further below, the system 100 can include servers that are remotely located from the user 3606 and can access a program administered by the HMD device 3604. Further, a local software generation and distribution framework can be used to rapidly scale content. The core components and services can support complex user and session elements that can be easily managed by a service provider. As such, a platform of a mixed reality system can standardize interaction elements such as a session landing, sign-in, navigation rules, and the like. A top-level abstraction layer can support customization such as a sequence of sessions or scenes or conditional ordering of sessions or scenes. Services can include authentication, tracking, reports, user services, help services, pause and resume services, and the like.

Figure 37:
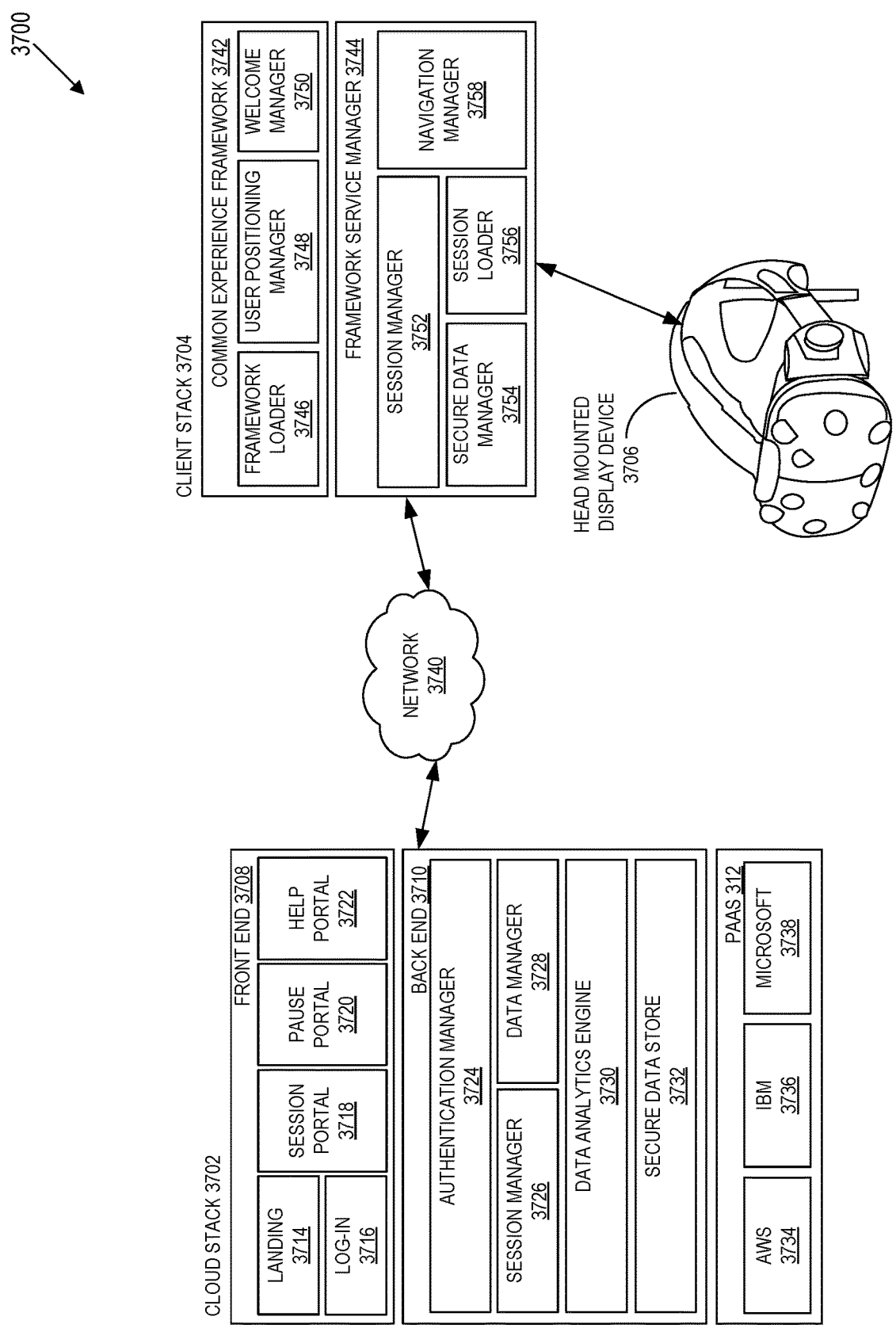
FIG. 37 is a block diagram illustrating stacks of a mixed reality platform that can collectively administer a session on a near-to-eye display system, according to one embodiment.

FIG. 37 is a block diagram illustrating a cloud stack 3702 and a client stack 3704 architecture for a platform 3700 that can collectively administer a mixed reality session on an HMD device 3706. As shown, the cloud stack 3702 includes three primary layers: a frontend layer 3708, a back-end layer 3710, and a platform as a service (PaaS) layer 3712. The frontend layer 3708 includes a landing component 3714 and a log-in component 3716. The two components 3714 and 3716 are executed at the beginning of a session administered to orient a user and seek login credentials to control access to message programs and user information of the platform 3700. The frontend layer 3708 also includes a session portal 3718, pause portal 3720, and help portal 3722. The session portal 3718 is for normal front-facing operations of a simulation session whereas the pause portal 3720 is for operations while the session is paused. Lastly, the help portal 3722 can help the user or administrator to address questions related to the platform 3700 or simulation.

The back-end layer 3710 includes an authentication manager 3724 that can authenticate a user and/or an administrator of the platform 3700. A session manager 3726 can manage access to a particular session. A data manager 3728 can manage user data and/or data about the session such as any feedback from users while engaged in sessions. For example, the data manager 3728 can collect feedback data from multiple users including their inputs and physiological data. A data analytics engine 3730 can process the collected data to determine the actions of users and to learn how to improve the sessions (e.g., mixed reality scenes). A secure data store 3732 can store sensitive data such as data that identifies users. Lastly, the PaaS layer 3712 includes cloud computing services that provide the platform 3700 for clients to administer the mixed reality sessions. Examples include AMAZON WEB SERVICES (AWS) 3734, or services provided by IBM 3736 and/or MICROSOFT 3738.

The cloud stack 3702 is communicatively connected to the client stack 3704 over a network 3740 such as the internet. The client stack 3704 includes a common experience framework layer 3742 and a framework service manager layer 3744. The common experience framework layer 3742 includes a framework loader 3746 to load the framework for a session, a user positioning manager 3748 to monitor and track the relative position of the user engaged with the session, and a welcome manager 3750 to orient the user at the beginning of the session.

The framework service manager layer 3744 includes a session manager 3752 to manage the session experienced by a user wearing the HMD device 3706. The framework service manager layer 3744 also includes a secure data manager 3754 to store or anonymize any sensitive data, session load manager 3756 for loading a session, and a navigation manager 3758 for navigating a user through mixed reality scenes of a message management program. The platform 3700 is merely illustrative to aid the reader in understanding an embodiment. Other embodiments may include fewer or additional layers/components known to persons skilled in the art but omitted for brevity.

Figure 38:
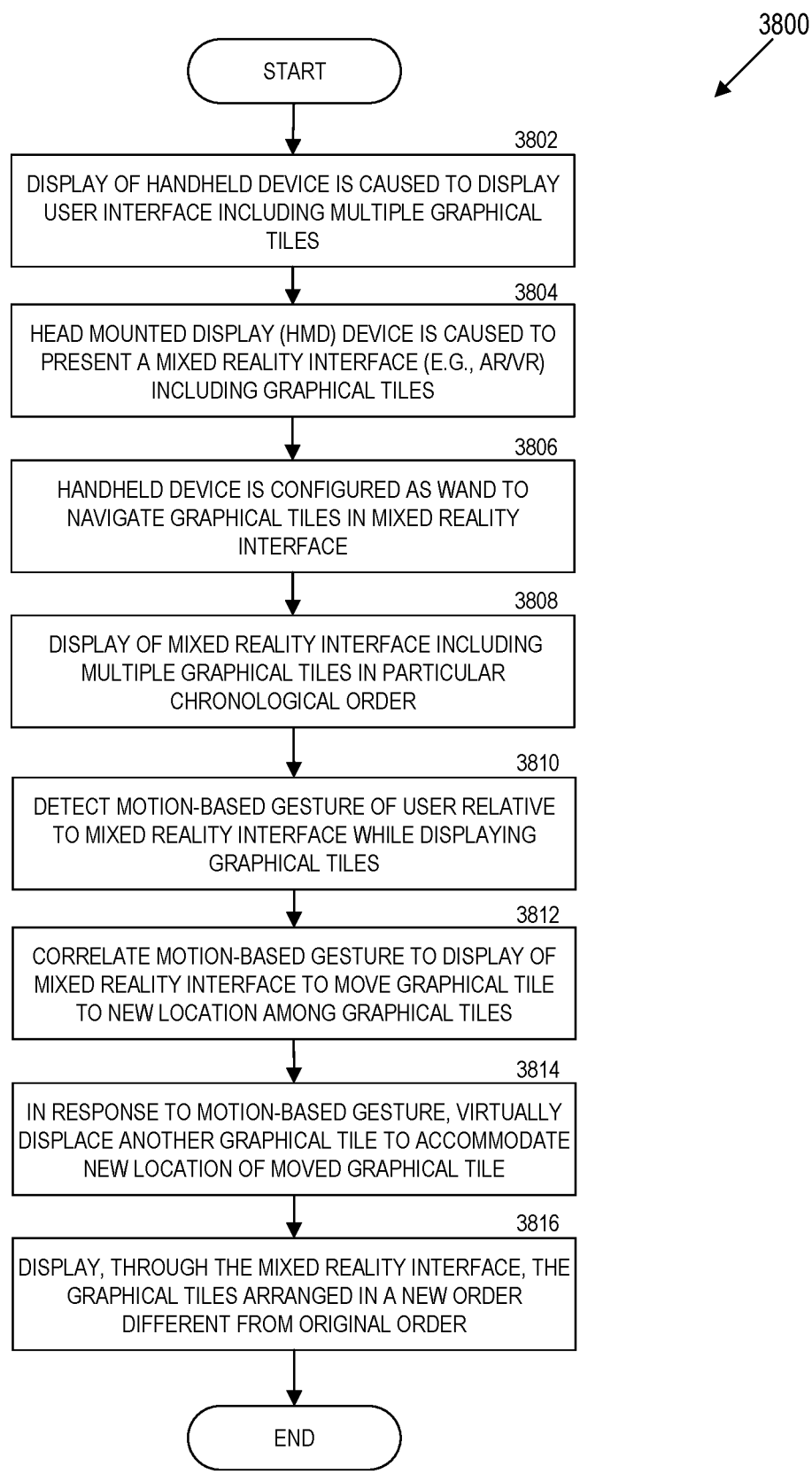
FIG. 38 is a flowchart that illustrates a process performed by a system to generate a mixed reality interface for immersive message management, according to one embodiment.

FIG. 38 is a flowchart that illustrates a process 3800 performed by a system to generate a mixed reality interface for immersive message management. The system can include components that are worn or operated by a user including handheld devices, wearables, and an HMD device as described earlier.

At 3802, a display of a handheld device is caused to present a user interface including multiple graphical tiles. The graphical tiles (e.g., one or a group of graphical tiles) can be selectively movable to change the order displayed on the user interface. The handheld device can communicatively couple to other components of the system including, for example, an HMD device and/or wearables.

At 3804, the HMD device is caused to present a mixed reality interface including the graphical tiles. For example, the handheld device can run instructions and wirelessly communicate commands for projecting the graphical tiles of the mixed reality interface through the HMD device. In another example, the system can detect machine-generated electronic messages and human-generated electronic messages and prioritize the human-generated electronic messages over the machine-generated electronic messages. The system can cause display, on the mixed reality interface, of the graphical tiles in priority order where graphical tiles of the human-generated electronic messages are prioritized over graphical tiles of the machine-generated electronic messages.

At 3806, the handheld device is reconfigured as a wand that can navigate the graphical tiles in the mixed reality interface. For example, the handheld device can wirelessly communicate motion-based gestures to the HMD device. A motion-based gesture can be based on a movement or orientation of the handheld device. Additional examples include directional movement of the handheld device as a wand in relation to the mixed reality interface, directional movement of a head of the user wearing the HMD device, directional eye movement detected by the HMD device, directional movement of a wearable device worn by a user, or the like.

At 3808, the system can cause display of the mixed reality interface including multiple graphical tiles in a particular chronological order. In one example, each graphical tile represents an electronic message, and one or more graphical tiles are selectively movable among the multiple graphical tiles based on the user's motion. In another example, the system can cause display, on the mixed reality interface, of one group of multiple groups of graphical tiles. A group can be associated with a different time period such that each of the multiple groups is displayed one at a time.

In one example, the mixed reality interface presented by the HMD device can display an electronic message associated with a selected graphical tile. The HMD device can detect a motion-based gesture based on a handheld device such as movement in either a first direction or a second direction opposite of the first direction. In response to detecting the movement in the first direction, the display can be changed to present a next electronic message timestamped after the electronic message. In response to detecting the movement in the second direction, the display can be changed to present a previous electronic message timestamped before the electronic message.

At 3810, the system can detect a motion-based gesture of the user relative to the mixed reality interface while displaying the graphical tiles. In one example, the system can wirelessly control content presented by the HMD device and translate spatial movement of the handheld device into virtual movement that moves a graphical tile to the new location among the graphical tiles. In one example, the mixed reality interface includes multiple groups of graphical tiles that are displayed one group at a time. As such, each group is scrollable to display additional graphical tiles of the group on the mixed reality interface without displaying graphical tiles of other groups.

At 3812, the system can correlate the motion-based gesture of the user to the display of the mixed reality interface to move a particular graphical tile to a new location among the multiple graphical tiles. The system can animate moving the particular graphical tile in a direction of the motion-based gesture. In another example, the system can present a virtual keyboard via the mixed reality interface and animate and focus a cursor onto a field presented on the display.

In one example, the system can detect a motion-based gesture relative to the mixed-reality interface and, in response to the motion-based gesture, perform a message management function to delete an electronic message of a selected graphical tile, add an electronic message of a selected graphical tile in a folder, mark an electronic message of a selected graphical tile, reply to an electronic message of a selected graphical tile, forward an electronic message of a selected graphical tile, or rearrange an order of a set of graphical tiles. In another example, the system can detect a motion-based gesture relative to the mixed reality interface and, in response, perform an undo function that reverses a message management function to restore an electronic message of a selected graphical tile, remove an electronic message of a selected graphical tile in a folder, unmark an electronic message of a selected graphical tile, or restore an order of the graphical tiles.

At 3814, the system can, in response to the motion-based gesture, virtually displace another graphical tile of the multiple graphical tiles to accommodate the new location of the particular graphical tile. In one example, the system selects a graphical tile and animates moving the particular graphical tile to the new location among the multiple graphical tiles. In another example, the system detects a motion-based gesture including movement of an HMD device in either a first direction or a second direction opposite of the first direction. The HMD device projects the mixed reality interface to a user wearing the HMD device. In response to detecting the movement in the first direction, the graphical tiles are scrolled forward to later-timestamped graphical tiles. In response to detecting the movement in the second direction, the graphical tiles are scrolled backward to earlier-timestamped graphical tiles.

At 3816, the system can cause display, through the mixed reality interface, of the multiple graphical tiles arranged in a new order different from the particular order. In one example, the new order includes a particular graphical tile or a group of tiles in the new location among the graphical tiles. The groups can be presented one group at a time. For example, each group can be associated with a different time period and includes graphical tiles arranged in chronological time order. The graphical tiles of any one group are re-orderable among that one group.

In one example, the motion-based gesture is a first motion-based gesture to select an electronic message on the handheld device. The system detects a second motion-based gesture associated with the electronic message of the graphical tiles and, in response, provides a preview of the electronic message on the mixed reality interface. In another example, the system can detect a motion-based gesture of the user in a first direction or in a second direction different from the first direction. In response to detecting the motion-based gesture in the first direction, the system can animate and shift to a beginning of the multiple graphical tiles relative to the chronological time order. In response to detecting the motion-based gesture in the second direction, the system can animate and shift to an end of the multiple graphical tiles relative to the chronological time order.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A computer-readable storage medium, excluding transitory signals and carrying instructions, which, when executed by at least one data processor of a system, cause the system to:
   cause display of a mixed reality interface including multiple graphical tiles in a particular chronological order,
      wherein each graphical tile represents an electronic message, and
      wherein one or more graphical tiles are selectively movable among the multiple graphical tiles based on a user's motion;
   detect a motion-based gesture of the user relative to the mixed reality interface while displaying the multiple graphical tiles;
   correlate the motion-based gesture of the user to the display of the mixed reality interface to move a particular graphical tile to a new location among the multiple graphical tiles;
   in response to the motion-based gesture:
      select the particular graphical tile,
      animate moving the particular graphical tile to the new location among the multiple graphical tiles, and
      virtually displace another graphical tile of the multiple graphical tiles to accommodate the new location of the particular graphical tile; and
      cause display, through the mixed reality interface, of the multiple graphical tiles arranged in a new order different from the particular order,
         wherein the new order includes the particular graphical tile in the new location among the multiple graphical tiles.

2. The computer-readable storage medium of claim 1, wherein the system is further caused to, prior to the mixed reality interface being displayed:
   cause display, on a display of a handheld device, of a user interface including the multiple graphical tiles;
   communicatively couple the handheld device and a head-mounted display (HMD) device;
   cause the HMD device to present the mixed reality interface including the multiple graphical tiles; and
   reconfigure the handheld device as a wand configured to navigate the multiple graphical tiles of the mixed reality interface.

3. The computer-readable storage medium of claim 2, wherein the system is further caused to, prior to the mixed reality interface being displayed:
   cause the handheld device to run instructions and wirelessly communicate commands for presenting the multiple graphical tiles in the mixed reality interface through the HMD device.

4. The computer-readable storage medium of claim 2, wherein the system is further caused to, prior to the mixed reality interface being displayed:
   cause the handheld device to wirelessly communicate the motion-based gesture to the HMD device,
      wherein the motion-based gesture is based on a movement or orientation of the handheld device.

5. The computer-readable storage medium of claim 1, wherein to cause display of the mixed reality interface comprises causing the system to:
   cause a head-mounted display (HMD) device worn by the user to present the mixed reality interface including the multiple graphical tiles in an augmented reality or virtual reality projection.

6. The computer-readable storage medium of claim 5, wherein to detect the motion-based gesture comprises causing the system to:
   translate spatial movement of a handheld device into virtual movement that moves the particular graphical tile to the new location among the multiple graphical tiles,
      wherein the handheld device is wirelessly coupled to the HMD device, and
      wherein the handheld device controls content to the HMD device including the multiple graphical tiles.

7. The computer-readable storage medium of claim 5, wherein the motion-based gesture includes directional movement of:
   a handheld device operable as a wand in relation to the mixed-reality interface,
   a head of a user wearing the HMD device,
   eye movement detected by the HMD device, or
   a wearable device worn by a user of the HMD device.

8. The computer-readable storage medium of claim 1, wherein the system is configured to:
   cause display, through the mixed reality interface, of multiple groups of graphical tiles one group at a time,
      wherein each group is associated with a different time period and includes graphical tiles arranged in chronological time order, and
      wherein graphical tiles of any one group are re-orderable among that one group.

9. The computer-readable storage medium of claim 1, wherein the system is further caused to:
   cause display, on the mixed reality interface, of an electronic message associated with a selected graphical tile;
   detect that the motion-based gesture of a handheld device is coupled to a head-mounted display (HMD) device,
      wherein the HMD device presents the mixed-reality interface, and
      wherein the motion-based gesture includes movement of the handheld device in either a first direction or a second direction opposite of the first direction;
   in response to detecting the movement in the first direction, change the display in the mixed reality interface to present a next electronic message timestamped after the electronic message; and in response to detecting the movement in the second direction, change the display in the mixed reality interface to present a previous electronic message timestamped before the electronic message.

10. The computer-readable storage medium of claim 1, wherein the system is further caused to:
   detect that the motion-based gesture includes movement of a head-mounted display (HMD) device in either a first direction or a second direction opposite of the first direction,
      wherein the HMD device projects the mixed reality interface to the user wearing the HMD device;
   in response to detecting the movement in the first direction, scroll the multiple graphical tiles forward to later timestamped graphical tiles; and
   in response to detecting the movement in the second direction, scroll the multiple graphical tiles backward to earlier timestamped graphical tiles.

11. The computer-readable storage medium of claim 1, wherein, in response to the motion-based gesture, the system is caused to:
   animate moving the particular graphical tile in a direction of the motion-based gesture.

12. The computer-readable storage medium of claim 1, wherein in response to the motion-based gesture, the system is caused to:
   present a virtual keyboard via the mixed reality interface; and
   animate and focus a cursor into a field presented on the display of the mixed reality interface.

13. The computer-readable storage medium of claim 1, wherein the system is further caused to:
   detect a motion-based gesture of the user of the system in a first direction or in a second direction different from the first direction;
   in response to detecting the motion-based gesture in the first direction, animate and shift to a beginning of the multiple graphical tiles relative to the chronological time order; and
   in response to detecting the motion-based gesture in the second direction, animate and shift to an end of the multiple graphical tiles relative to the chronological time order.

14. The computer-readable storage medium of claim 1, wherein the motion-based gesture is a first motion-based gesture on a screen of a handheld device, the system being further caused to:
   detect a second motion-based gesture associated with an electronic message of the multiple graphical tiles; and
   in response to the second motion-based gesture, provide a preview of the electronic message on the mixed-reality interface without opening the electronic message.

15. The computer-readable storage medium of claim 5, wherein to detect the motion-based gesture comprises causing the system to:
   detect, by one or more sensors remotely located from the user, spatial movement of a finger of the user; and
   translate the spatial movement of the finger into virtual movement that moves the particular graphical tile to the new location among the multiple graphical tiles.

16. A mixed reality system comprising:
   a head-mounted display (HMD) device;
   a data processor; and
   a memory storing instructions that, when executed by the data processor, cause the mixed reality system to:
      cause the HMD device to render a mixed reality interface including a first group of graphical tiles projected in chronological time order to a user wearing the HMD device,
         wherein each group is one of multiple groups that are each constrained by a time period, and
         wherein the mixed reality system is configured to project, via the HMD device, the multiple groups one group at a time;
      detect a motion-based gesture based on a body movement of the user relative to the mixed reality interface while projecting the first group of graphical tiles,
         wherein the motion-based gesture includes directional movement of:
            a handheld device operable as a wand in relation to the mixed-reality interface,
            a head of a user wearing the HMD device,
            eye movement detected by the HMD device, or
            a wearable device worn by a user of the HMD device, and
         wherein the motion-based gesture includes an indication to change display of the first group of graphical tiles to a second group of graphical tiles; and
      in response to the gesture, cause the mixed reality interface to change from the first group to the second group of graphical tiles.

17. The mixed reality system of claim 16, wherein the graphical tiles of any one group are re-orderable among that one group.

18. A method performed by a virtual reality system, the method comprising:
   causing display of multiple graphical tiles presented in a particular order on a virtual reality interface of a virtual reality system,
      wherein groups of the multiple graphical tiles are individually movable among the multiple graphical tiles to change the current order of the multiple graphical tiles;
   detecting a motion-based gesture relative to the virtual reality interface while displaying the multiple graphical tiles,
      wherein the motion-based gesture includes an indication to move a particular graphical tile among the multiple graphical tiles; and
   in response to the motion-based gesture:
      automatically moving another graphical tile of the multiple graphical tiles to accommodate a new location of the particular graphical tile; and
      causing display, via the virtual reality interface, of the multiple graphical tiles arranged in a new order different from the particular order,
         wherein the new order includes the particular graphical tile in the new location among the multiple graphical tiles.

19. The method of claim 18, wherein, in response to the motion-based gesture, the system is caused to:
   when detecting a movement of a user, wearing the HMD device, in a first direction, scroll the multiple graphical tiles in a first scrolling direction; and
   when detecting a movement in a second direction opposite of the first direction, scroll the multiple graphical tiles in a second scrolling direction opposite of the first scrolling direction.

20. The method of claim 18, wherein in response to the motion-based gesture, the system is caused to:
   select the particular graphical tile; and animate moving the particular graphical tile to the new location among the multiple graphical tiles.

21. The method of claim 18, wherein in response to the motion-based gesture, the system is caused to:
animate moving the particular graphical tile in a direction of the motion-based gesture.

* * * * *